(12) United States Patent
Sugizaki

(10) Patent No.: US 11,870,961 B2
(45) Date of Patent: Jan. 9, 2024

(54) IMAGE-READING APPARATUS AND IMAGE-FORMING SYSTEM

(71) Applicant: FUJIFILM BUSINESS INNOVATION CORP., Tokyo (JP)

(72) Inventor: Tadashi Sugizaki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/945,521

(22) Filed: Sep. 15, 2022

(65) Prior Publication Data

US 2023/0308578 A1 Sep. 28, 2023

(30) Foreign Application Priority Data

Mar. 28, 2022 (JP) ................................. 2022-052658

(51) Int. Cl.
*H04N 1/10* (2006.01)
*H04N 1/193* (2006.01)

(52) U.S. Cl.
CPC ......... *H04N 1/1937* (2013.01); *H04N 1/1017* (2013.01)

(58) Field of Classification Search
CPC ............................ H04N 1/1937; H04N 1/1017
See application file for complete search history.

(56) References Cited

U.S. PATENT DOCUMENTS

| 5,027,424 A * | 6/1991 | Yamazaki | H04N 1/03 359/861 |
| 6,831,759 B1 * | 12/2004 | Witte | H04N 1/0305 358/475 |
| 8,300,278 B2 * | 10/2012 | Uchida | H04N 1/03 358/487 |
| 11,108,930 B2 * | 8/2021 | Otake | H04N 1/1937 |
| 11,128,761 B2 * | 9/2021 | Hosoi | H04N 1/00037 |
| 11,330,135 B2 * | 5/2022 | Otake | H04N 1/00559 |
| 2003/0038228 A1 * | 2/2003 | Fujibayashi | G02B 17/086 250/208.1 |
| 2004/0036935 A1 * | 2/2004 | Muramatsu | H04N 1/0303 359/196.1 |
| 2004/0223205 A1 * | 11/2004 | Aoyama | H04N 1/0303 235/454 |
| 2005/0219651 A1 * | 10/2005 | Uchida | H04N 1/03 358/487 |
| 2006/0077479 A1 * | 4/2006 | Itou | H04N 1/0411 358/474 |
| 2007/0177223 A1 * | 8/2007 | Kim | H04N 1/1013 358/474 |

(Continued)

FOREIGN PATENT DOCUMENTS

| JP | 3104107 B2 * | 10/2000 |
| JP | 3104107 B2 | 10/2000 |

(Continued)

*Primary Examiner* — Ted W Barnes
(74) *Attorney, Agent, or Firm* — Oliff PLC

(57) ABSTRACT

An image-reading apparatus includes: a light-receiving unit that receives reflected light from a recording material on which an image is formed; and multiple light-reflecting members that reflect the reflected light from the recording material toward the light-receiving unit. At least one light-reflecting member of the multiple light-reflecting members reflect the reflected light multiple times.

10 Claims, 29 Drawing Sheets

(56) References Cited

U.S. PATENT DOCUMENTS

| | | | | |
|---|---|---|---|---|
| 2011/0122457 A1* | 5/2011 | Sugiyama | ............ | H04N 1/0305 |
| | | | | 358/448 |
| 2014/0226191 A1* | 8/2014 | Enomoto | ........... | H04N 1/00615 |
| | | | | 358/496 |
| 2018/0149861 A1* | 5/2018 | Ouchi | ................. | H04N 1/3876 |
| 2018/0205845 A1* | 7/2018 | Wilsher | ................ | H04N 1/122 |
| 2019/0230241 A1* | 7/2019 | Ouchi | .................... | G02B 7/008 |
| 2020/0296250 A1* | 9/2020 | Otake | ................. | H04N 1/1938 |
| 2020/0322487 A1* | 10/2020 | Hosoi | ................ | H04N 1/00015 |

FOREIGN PATENT DOCUMENTS

| | | | | |
|---|---|---|---|---|
| JP | 2003-344956 A | | 12/2003 | |
| JP | 2003344956 A | * | 12/2003 | |
| JP | 3746806 B2 | * | 2/2006 | ............... H04N 1/03 |
| JP | 2018093286 A | * | 6/2018 | ........... G02B 17/002 |
| JP | 2019033334 A | * | 2/2019 | ........ H04N 1/00795 |

\* cited by examiner

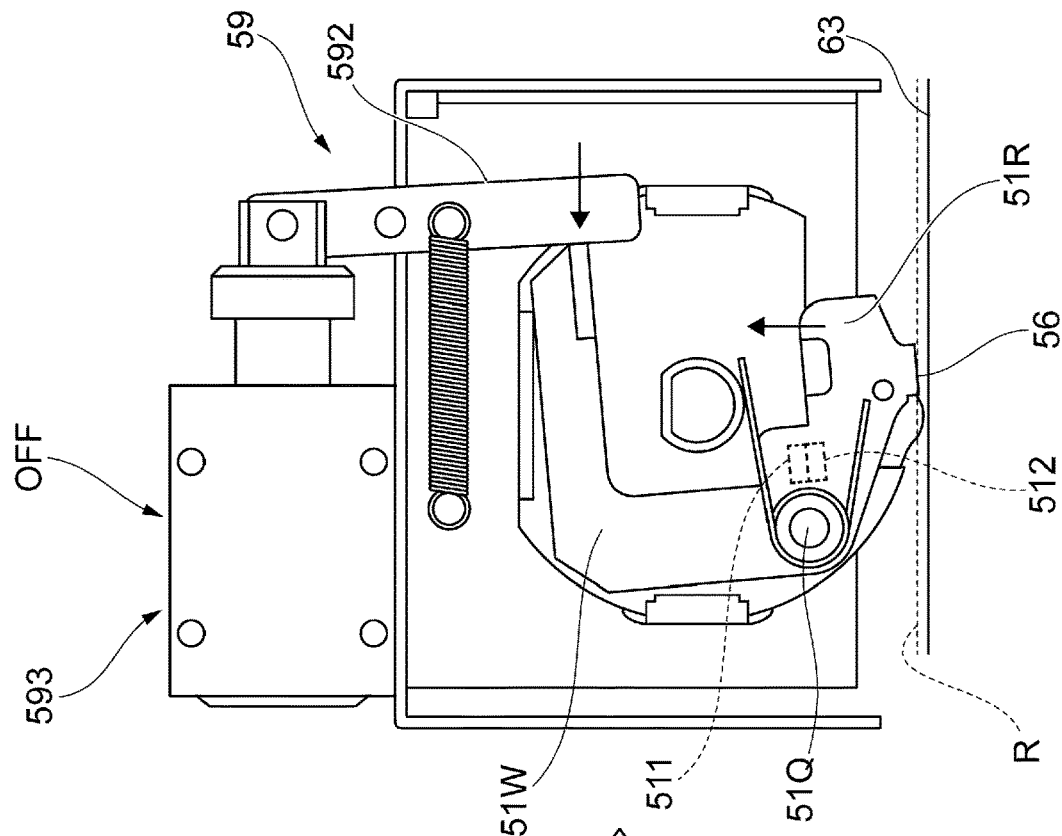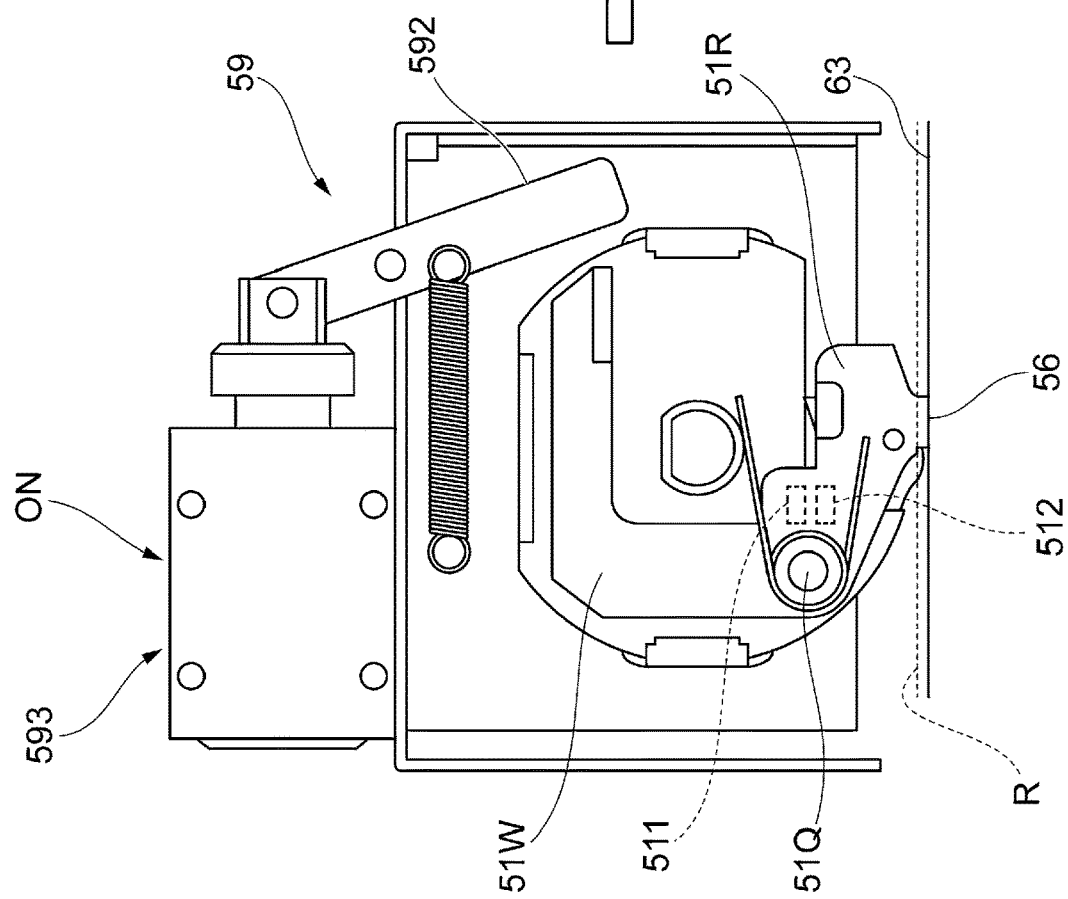

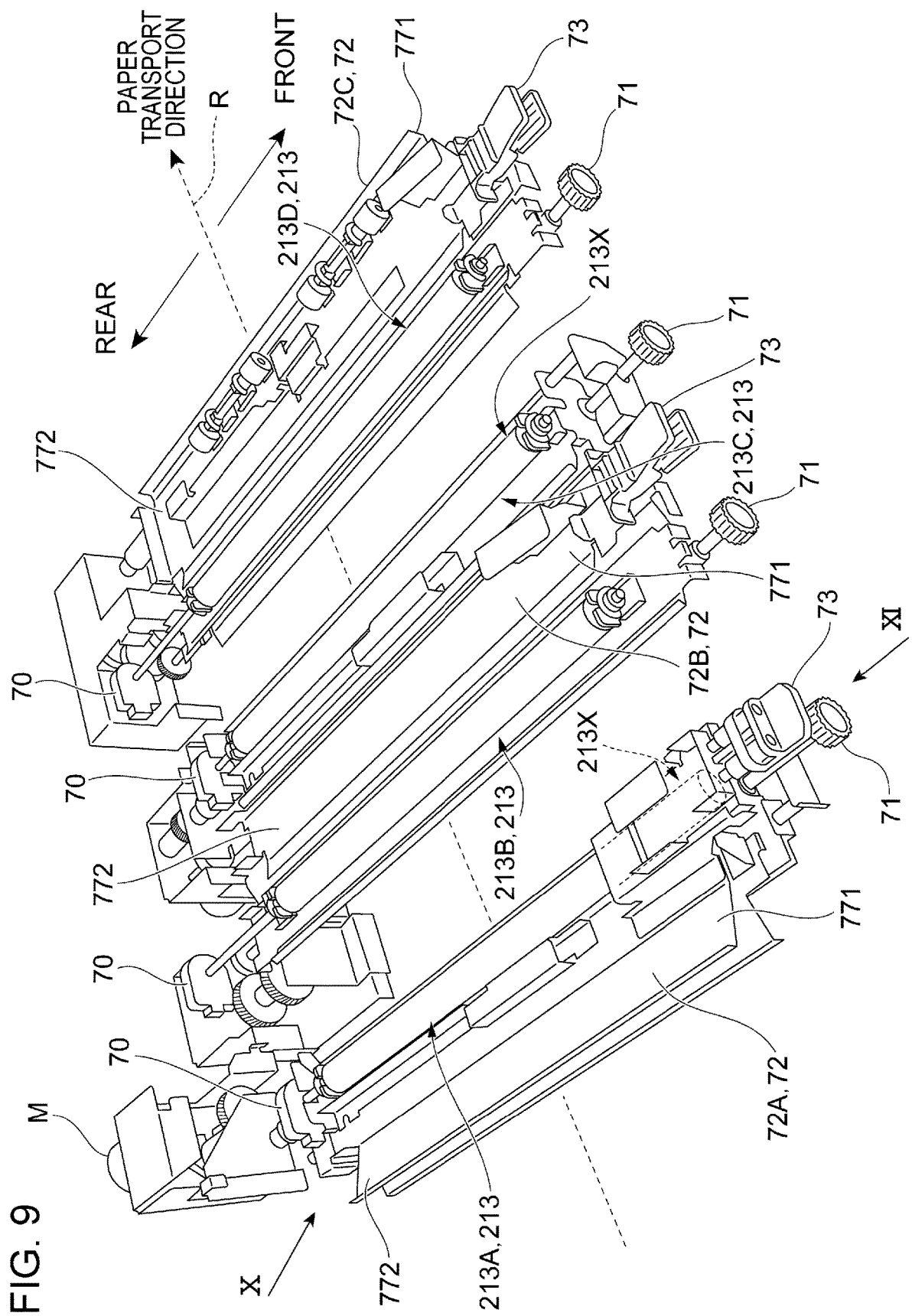

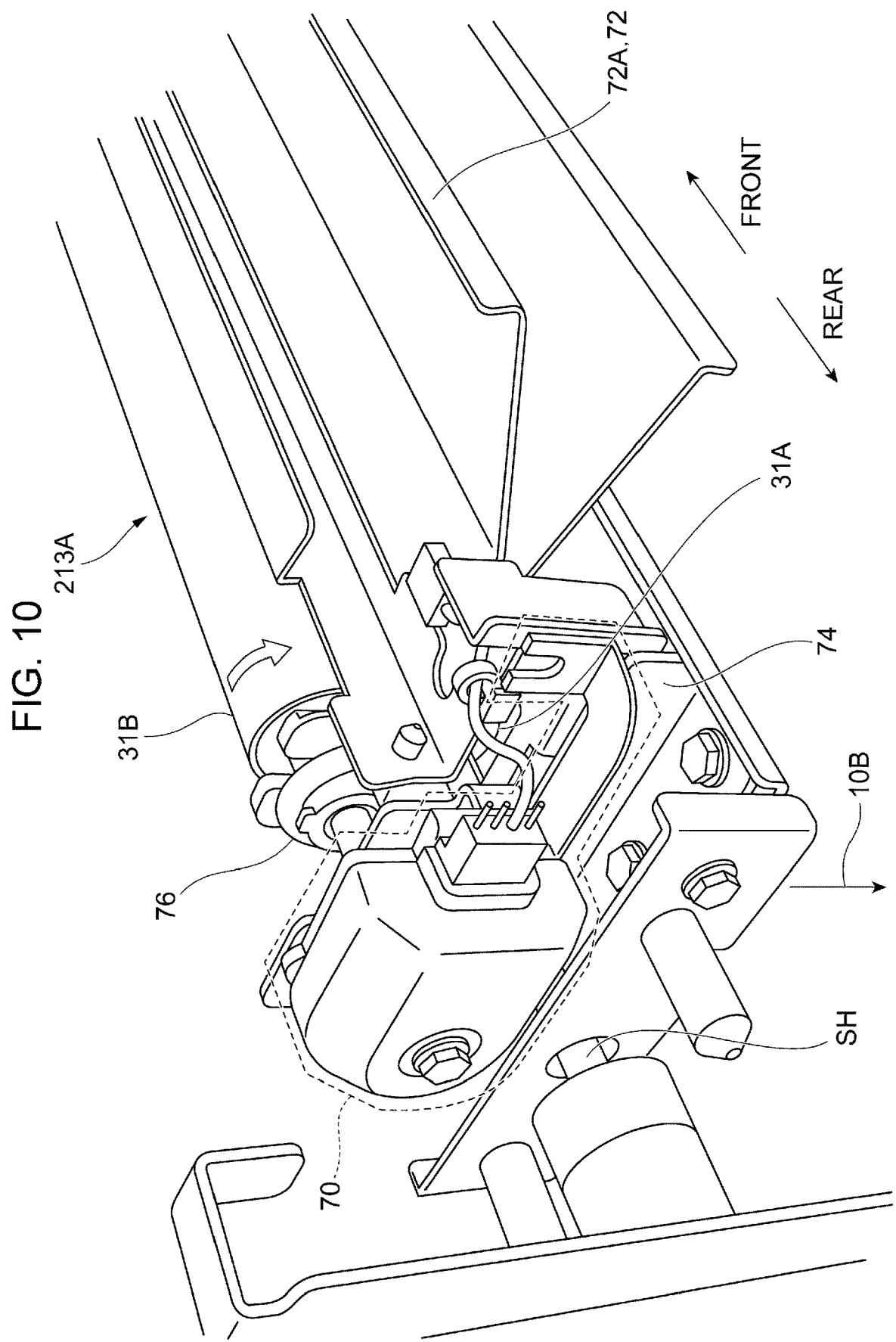

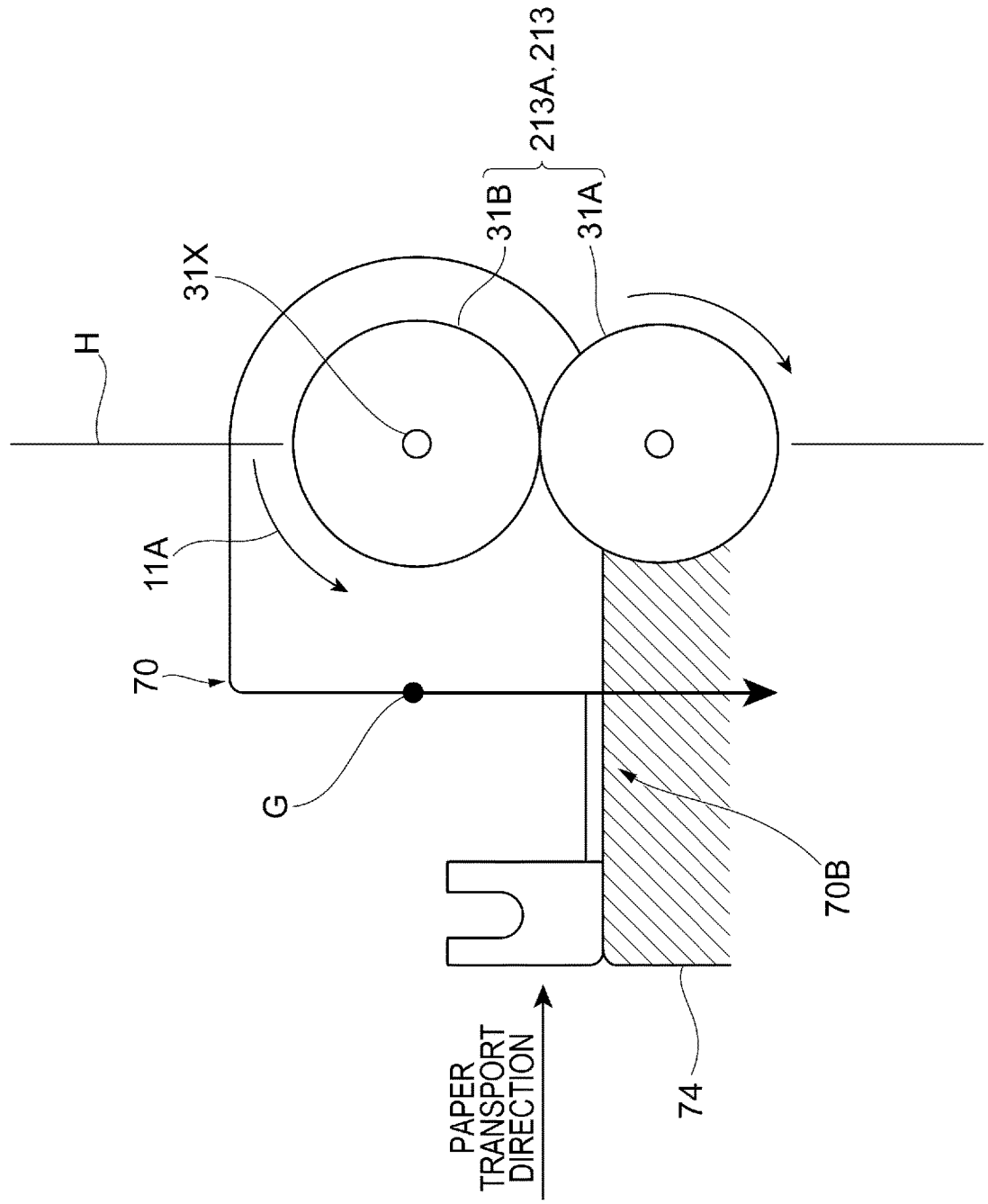

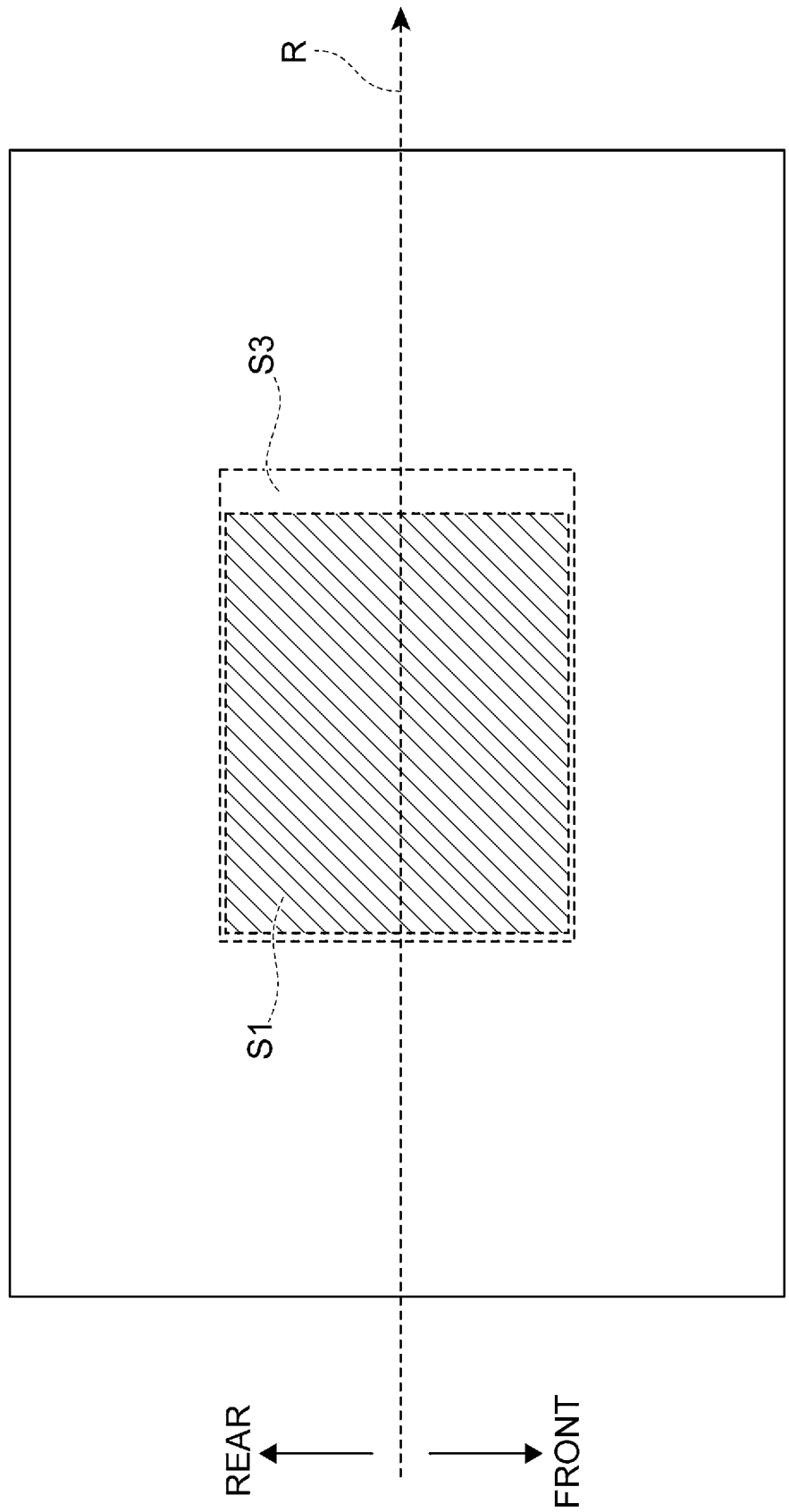

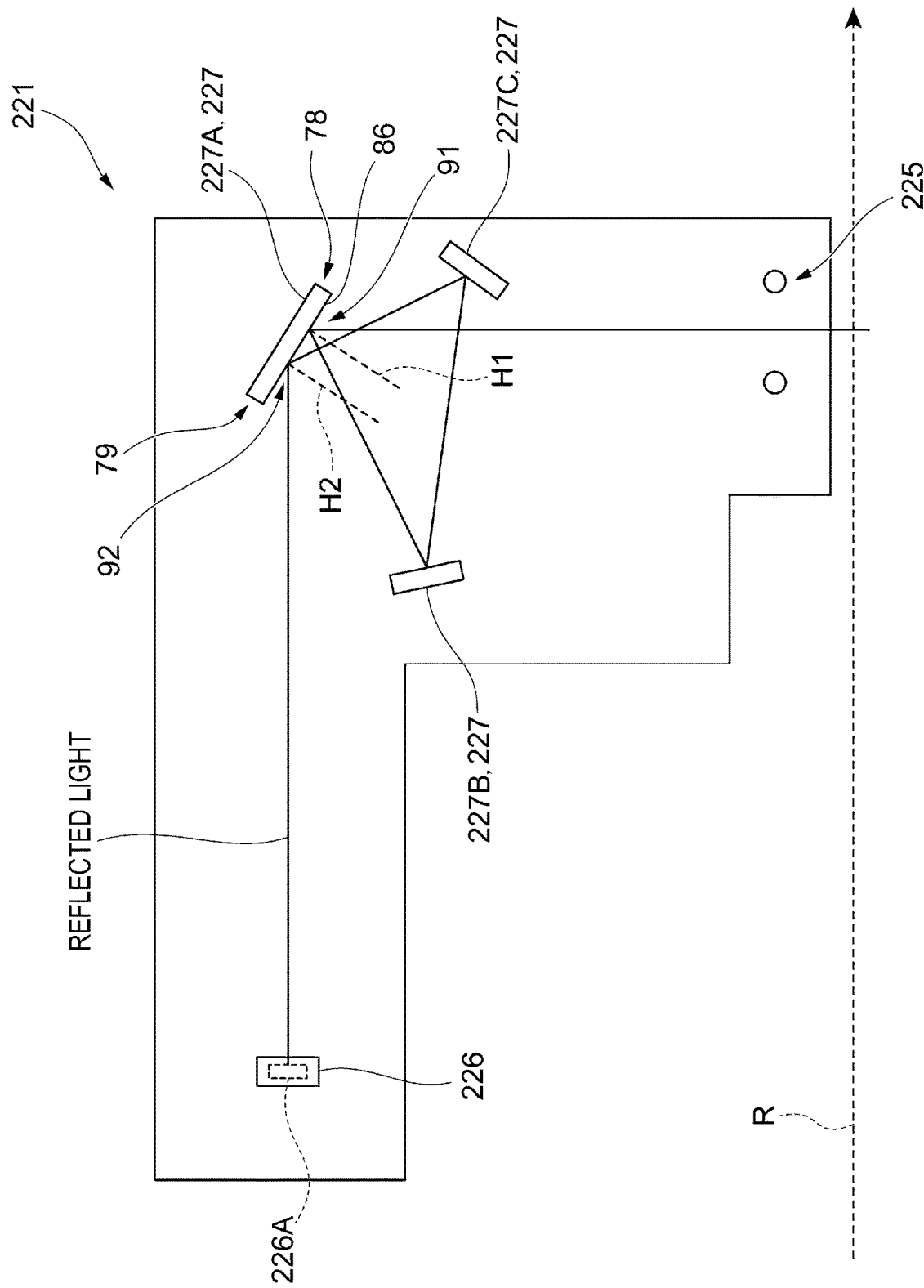

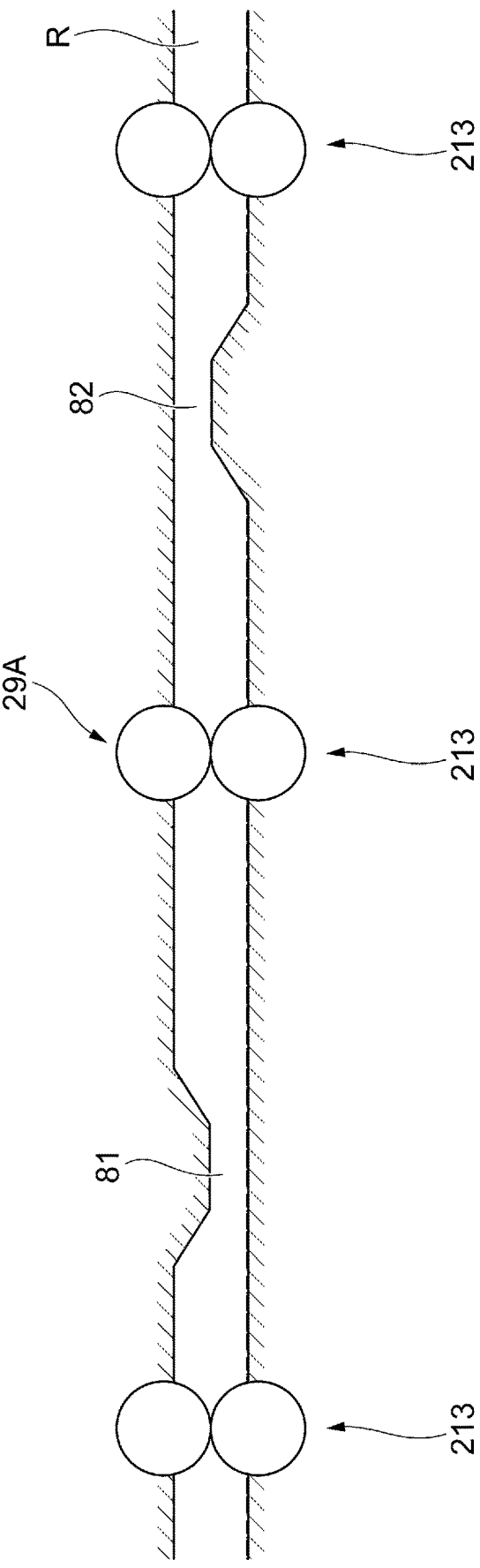

IMAGE-READING APPARATUS AND IMAGE-FORMING SYSTEM

CROSS-REFERENCE TO RELATED APPLICATIONS

This application is based on and claims priority under 35 USC 119 from Japanese Patent Application No. 2022-052658 filed Mar. 28, 2022.

BACKGROUND

(i) Technical Field

The present disclosure relates to an image-reading apparatus and an image-forming system.

(ii) Related Art

Japanese Patent No. 3104107 discloses an image-reading unit that contains a light source that radiates light to a document that is placed on platen glass, multiple reflection mirrors that reflect the light that is reflected from the document, an imaging lens that images the light that is reflected from a reflection mirror of the multiple reflection mirrors that is located at the final step, and an imaging member that is disposed at an imaging portion of the imaging lens.

SUMMARY

An apparatus that has a function of reading an image on a recording material includes a light-receiving unit that receives reflected light from a recording material and also includes light-reflecting members that guide the reflected light toward the light-receiving unit in some cases.

The number of the light-reflecting members affects the size of the apparatus. The size of the apparatus increases depending on the number of the light-reflecting members.

Aspects of non-limiting embodiments of the present disclosure relate to an apparatus that has a function of reading an image on a recording material and that has a size smaller than that of an apparatus in which each of light-reflecting members once reflects reflected light from a document.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image-reading apparatus including: a light-receiving unit that receives reflected light from a recording material on which an image is formed; and a plurality of light-reflecting members that reflects the reflected light from the recording material toward the light-receiving unit, wherein at least one light-reflecting member of the plurality of light-reflecting members reflects the reflected light a plurality of times.

BRIEF DESCRIPTION OF THE DRAWINGS

Exemplary embodiments of the present disclosure will be described in detail based on the following figures, wherein:

FIG. 8A and FIG. 8B illustrate movement of an advancing-and-retreating mechanism;

FIG. 9 illustrates an upstream transport roller, a first intermediate transport roller, a second intermediate transport roller, a downstream transport roller, and so on from above and in front of the inspection apparatus;

FIG. 10 illustrates the upstream transport roller and so on in a direction illustrated by using an arrow X in FIG. 9;

FIG. 11 illustrates the upstream transport roller and so on in a direction illustrated by using an arrow XI in FIG. 9;

FIG. 20 illustrates a plane viewed from above;

FIG. 21 illustrates an inner structure of the upper image-reading member;

FIG. 29 illustrate another example of the structure of the paper transport path.

DETAILED DESCRIPTION

An exemplary embodiment of the present disclosure will hereinafter be described in detail with reference to the drawings.

Figure 1:
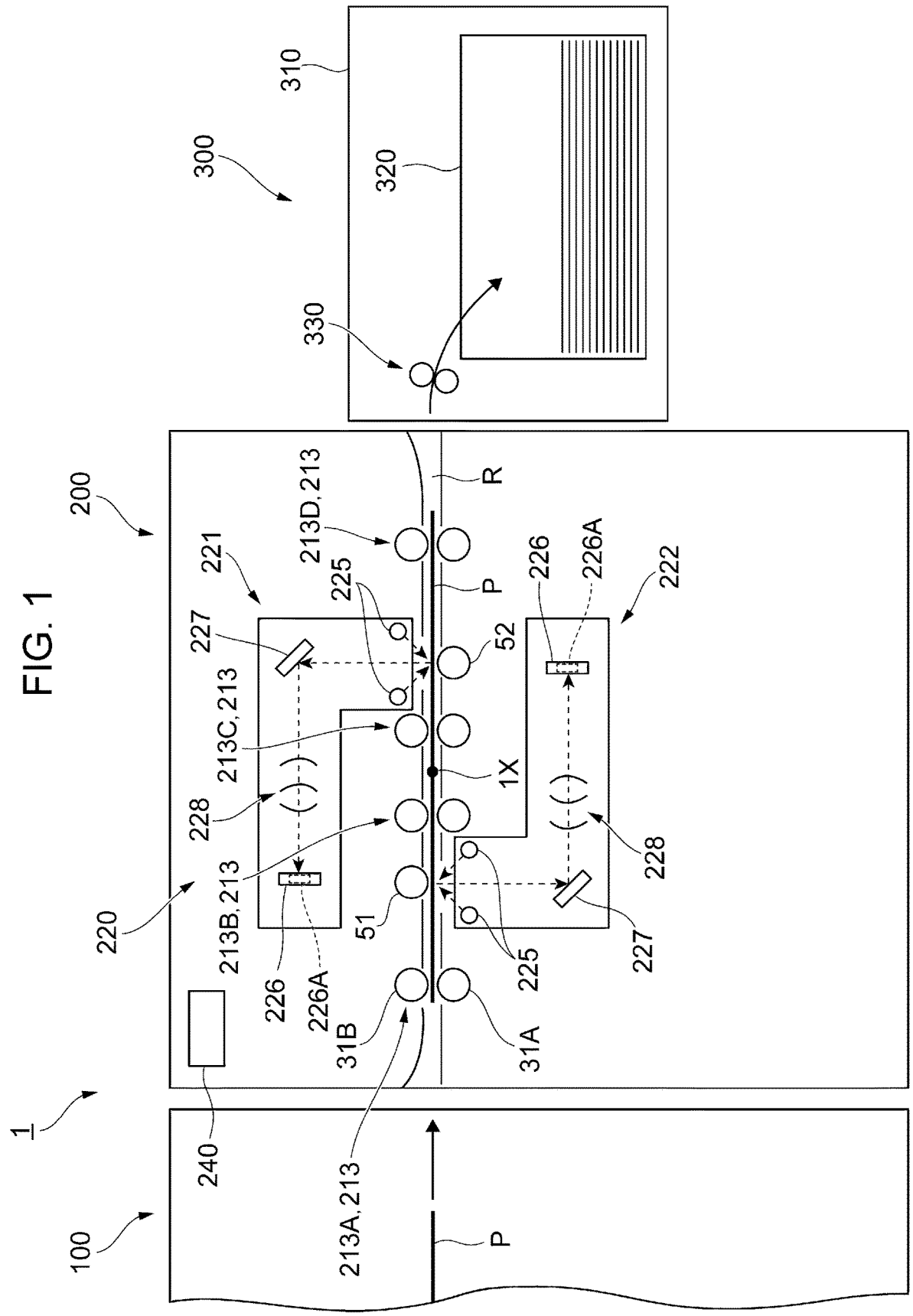
FIG. 1 illustrates the entire configuration of an image-forming system.

FIG. 1 illustrates the entire configuration of an image-forming system 1 according to the present exemplary embodiment.

The image-forming system 1 according to the present exemplary embodiment includes an image forming apparatus 100 that forms an image on paper P that is an example of a recording material, an inspection apparatus 200 that inspects the image that is formed on the paper P by using the image forming apparatus 100, and a paper container apparatus 300 that contains the paper P that is discharged from the inspection apparatus 200.

The image-forming system 1 has a function of inspecting the image that is formed on the paper P and is also referred to as an image inspection system.

The inspection apparatus 200 has a function of transporting the paper P that is an example of the recording material and is also referred to as a recording-material-transporting apparatus. The inspection apparatus 200 has a function of reading the image that is formed on the paper P and is also referred to as an image-reading apparatus.

The image forming apparatus 100 that functions as an image-forming unit acquires image data on which the image to be formed is based from, for example, a personal computer (PC) not illustrated.

The image forming apparatus 100 forms the image on the paper P by using a material such as toner, based on the acquired image data.

A mechanism for forming the image on the paper P is not particularly limited. The image is formed on the paper P by using, for example, an electrophotographic system or an ink-jet system.

The inspection apparatus 200 has a paper transport path R that is an example of a transport path along which the paper P that is discharged from the image forming apparatus 100 is transported.

The inspection apparatus 200 includes multiple transport rollers 213 that are examples of a transport unit that transports the paper P along the paper transport path R. According to the present exemplary embodiment, the multiple transport rollers 213 transport the paper P to a downstream position.

According to the present exemplary embodiment, an upstream transport roller 213A of the transport rollers 213 is disposed at the most upstream position in the transport direction of the paper P. A downstream transport roller 213D is disposed at the most downstream position in the transport direction of the paper P.

A first intermediate transport roller 213B and a second intermediate transport roller 213C that is located downstream of the first intermediate transport roller 213B are disposed between the upstream transport roller 213A and the downstream transport roller 213D.

The transport rollers 213 include respective drive rollers 31A that are rotationally driven and respective driven rollers 31B that are pressed against the drive rollers 31A and that rotate by receiving driving force from the drive rollers 31A.

The driven rollers 31B receive the driving force from the drive rollers 31A at contact portions at which the drive rollers 31A and the driven rollers 31B are in contact with each other. The driven rollers 31B rotate by receiving the driving force from the drive rollers 31A as the drive rollers 31A rotate.

The inspection apparatus 200 also includes image-reading members 220 that are examples of an image-reading unit that reads the image that is formed on the paper P.

According to the present exemplary embodiment, an upper image-reading member 221 and a lower image-reading member 222 are provided as the image-reading members 220.

The upper image-reading member 221 is disposed above the paper transport path R. The upper image-reading member 221 reads an image that is formed on an upper surface that is an example of a first surface of two surfaces that the paper P has.

The lower image-reading member 222 is disposed below the paper transport path R. The lower image-reading member 222 reads an image that is formed on a lower surface that is an example of a second surface of the two surfaces that the paper P has.

The inspection apparatus 200 also includes a controller 240. The controller 240 controls components that are included in the inspection apparatus 200.

The upper image-reading member 221 and the lower image-reading member 222 include respective light sources 225 that radiate light to the paper P, respective light-receiving units 226 that receive reflected light from the paper P, and respective light-reflecting members 227 that reflect the reflected light from the paper P and that guide the reflected light to the light-receiving units 226.

The light-reflecting members 227 include mirrors and have light reflection surfaces. According to the present exemplary embodiment, the multiple light-reflecting members 227 are provided as described later.

The light-receiving units 226 include multiple light-receiving elements 226A that include, for example, photodiodes. The reflected light from the paper P is received by the multiple light-receiving elements 226A.

The multiple light-receiving elements 226A are arranged in a single direction. Specifically, the multiple light-receiving elements 226A are arranged in a direction perpendicular to the sheet in FIG. 1.

In other words, the multiple light-receiving elements 226A are arranged in a direction that is perpendicular to the transport direction of the paper P and that is perpendicular to the thickness direction of the paper P that is transported in the inspection apparatus 200.

The upper image-reading member 221 and the lower image-reading member 222 include respective imaging optical systems 228 such as lenses that image the reflected light from the light-reflecting members 227 on the light-receiving units 226.

According to the present exemplary embodiment, the upper image-reading member 221 and the lower image-reading member 222 are image-reading members that include reduction optical systems.

According to the present exemplary embodiment, an upper rotator 51 that is rotatable is opposite a position at which the lower image-reading member 222 is installed with the paper transport path R interposed therebetween. A lower rotator 52 that is rotatable is opposite a position at which the upper image-reading member 221 is installed with the paper transport path R interposed therebetween.

For example, the controller 240 includes a central processing unit (CPU) that is an example of a processor that performs arithmetic processing, a non-volatile read only memory (ROM) or a hard disk drive (HDD) that stores a control program, and a random access memory (RAM) that temporarily stores data.

According to the present exemplary embodiment, the controller 240 runs the control program that is stored in, for example, the ROM to control the components of the inspection apparatus 200.

The paper container apparatus 300 includes a housing 310. The paper container apparatus 300 also includes a paper loader 320.

The paper loader 320 is installed in the housing 310. According to the present exemplary embodiment, the paper P that is sequentially discharged from the inspection apparatus 200 is loaded on the paper loader 320.

The paper container apparatus 300 also includes feed rollers 330 that feed the paper P that is discharged from the inspection apparatus 200 to the paper loader 320.

Figure 2:
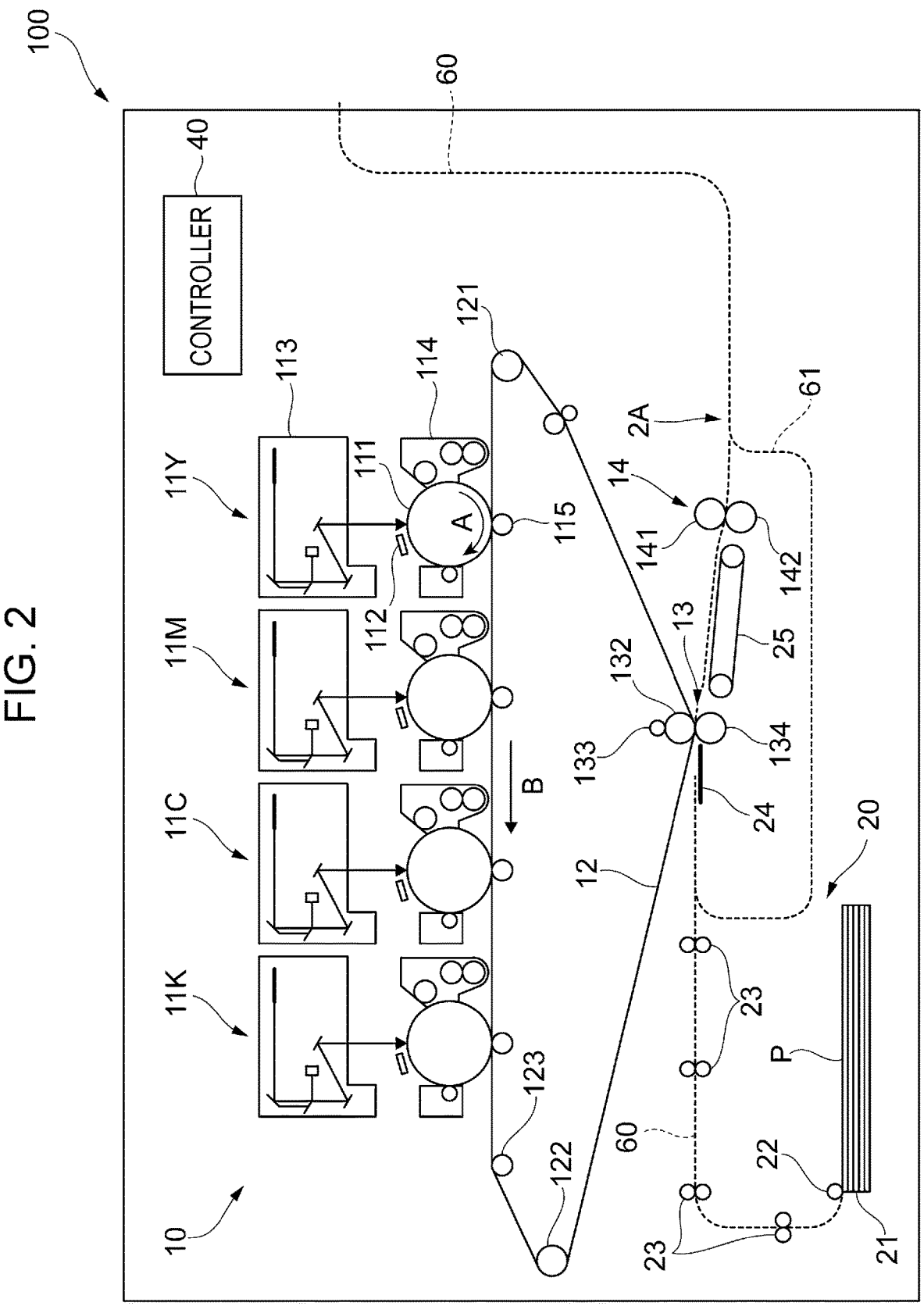
FIG. 2 illustrates an image forming apparatus.

FIG. 2 illustrates the image forming apparatus 100.

In FIG. 2, an example of the image forming apparatus 100 is illustrated. The structure of the image forming apparatus 100 is not limited to that illustrated in FIG. 2. The image forming apparatus 100 illustrated in FIG. 2 forms an image by using the electrophotographic system. However, the image forming apparatus 100 may form the image by using, for example, the ink-jet system.

The image forming apparatus 100 may form the image by using another system other than the electrophotographic system and the ink-jet system.

The image forming apparatus 100 includes an image-forming member 10, a paper transport member 20, and a controller 40.

The image-forming member 10 includes image formation units 11 (11Y, 11M, 11C, and 11K), an intermediate transfer belt 12, a second transfer portion 13, and a fixing unit 14.

According to the present exemplary embodiment, the four image formation units 11Y, 11M, 11C, and 11K for respective four colors of yellow (Y), magenta (M), cyan (C), and black (K) are provided as the image formation units 11.

The four image formation units 11Y, 11M, 11C, and 11K are arranged in a direction in which the intermediate transfer belt 12 moves and form toner images by using the electrophotographic system.

The four image formation units 11Y, 11M, 11C, and 11K include respective photoconductor drums 111, respective charging members 112, respective exposure members 113, respective developing members 114, and respective first transfer portions 115.

The four image formation units 11Y, 11M, 11C, and 11K form the toner images in the respective colors of YMCK and transfer the formed toner images to the intermediate transfer belt 12. Consequently, a toner image is formed on the intermediate transfer belt 12 by stacking the toner images in the respective colors of YMCK.

The photoconductor drums 111 rotate at a predetermined speed in the direction of an arrow A in the figure. The charging members 112 charge the circumferential surfaces of the photoconductor drums 111 so as to have a predetermined potential. The exposure members 113 radiate light to the circumferential surfaces of the photoconductor drums 111 that are charged and form electrostatic latent images on the circumferential surfaces of the photoconductor drums 111.

The developing members 114 form the toner images by applying toner to the electrostatic latent images that are formed on the circumferential surfaces of the photoconductor drums 111. The first transfer portions 115 transfer the toner images that are formed on the circumferential surfaces of the photoconductor drums 111 to the intermediate transfer belt 12.

A voltage that has polarity opposite the charge polarity of the toner is applied to the first transfer portions 115. Consequently, the toner images that are formed on the circumferential surfaces of the photoconductor drums 111 are sequentially attracted to the intermediate transfer belt 12 in an electrostatic manner. As a result, a color toner image that is stacked into a single image is formed on the intermediate transfer belt 12.

The intermediate transfer belt 12 is supported by multiple roll members. The intermediate transfer belt 12 is a belt member that circulates in the direction of an arrow B in the figure.

According to the present exemplary embodiment, a drive roller 121 that is driven by a motor not illustrated and that drives the intermediate transfer belt 12, a tension roller 122 that applies tension to the intermediate transfer belt 12, an idle roller 123 that supports the intermediate transfer belt 12, and a backup roller 132 are provided as the roll members.

The paper transport member 20 includes a paper container member 21 that contains stacked pieces of the paper P and a pickup roller 22 that feeds the paper P that is contained in the paper container member 21 and that transports the paper P.

The paper transport member 20 also includes transport rollers 23 that transport the paper P that is fed by the pickup roller 22 along a paper transport path 60 and a guide portion 24 that guides the paper P that is transported by the transport rollers 23 to the second transfer portion 13.

The paper transport member 20 also includes a transport belt 25 that transports the paper P to the fixing unit 14 after second transfer.

The second transfer portion 13 includes a second transfer roller 134 that is in contact with an outer surface of the intermediate transfer belt 12 and the backup roller 132 that is disposed inside the intermediate transfer belt 12 and that serves as a facing electrode for the second transfer roller 134.

According to the present exemplary embodiment, a power supply roller 133 that applies second transfer bias to the backup roller 132 and that is composed of metal is provided.

The toner image that is formed on the intermediate transfer belt 12 is transferred to the paper P that is transported at the second transfer portion 13.

The fixing unit 14 is located downstream of the second transfer portion 13 in the transport direction of the paper P. The fixing unit 14 includes a fixing roller 141 that includes a heating source (not illustrated) and a pressure roller 142 that faces the fixing roller 141 and that presses the fixing roller.

According to the present exemplary embodiment, the paper P that passes through the second transfer portion 13 is transported to a position between the fixing roller 141 and the pressure roller 142, and the toner image that is formed on the paper P and that is not fixed is melted and is fixed to the paper P. Consequently, an image is formed on the paper P from the toner image.

According to the present exemplary embodiment, the image forming apparatus 100 is capable of forming images on both surfaces of the paper P and has a reverse transport path 61 that is used to form the images on both surfaces of the paper P.

The reverse transport path 61 is split from the paper transport path 60 at a position downstream of the fixing unit 14. In the case where the reverse transport path 61 starts at a joint 2A to the paper transport path 60, the reverse transport path 61 extends toward the left-hand direction in the figure and joins the paper transport path 60 at a position upstream of the second transfer portion 13.

In the case where the images are formed on both surfaces of the paper P, the paper P after an image is formed on the first surface is once transported to a position downstream of the joint 2A. Subsequently, the transport direction of the paper P is reversed, and the paper P is fed to the reverse transport path 61 with a trailing edge of the paper P in the transport direction facing forward.

The paper P is supplied to the second transfer portion 13 again via the reverse transport path 61.

Consequently, a toner image is transferred to the second surface of the paper P at the second transfer portion 13. Subsequently, the paper P moves toward the fixing unit 14, and the fixing unit 14 fixes the toner image to the paper P. The images are formed on both surfaces of the paper P by performing this processing.

Aspect of forming the images on both surfaces of the paper P is not limited thereto. For example, image-forming members may be provided for the first surface and the second surface of the paper P, and the images may be formed on both surfaces of the paper P by using the image-forming members that are provided for the respective surfaces of the paper P.

Figure 3:
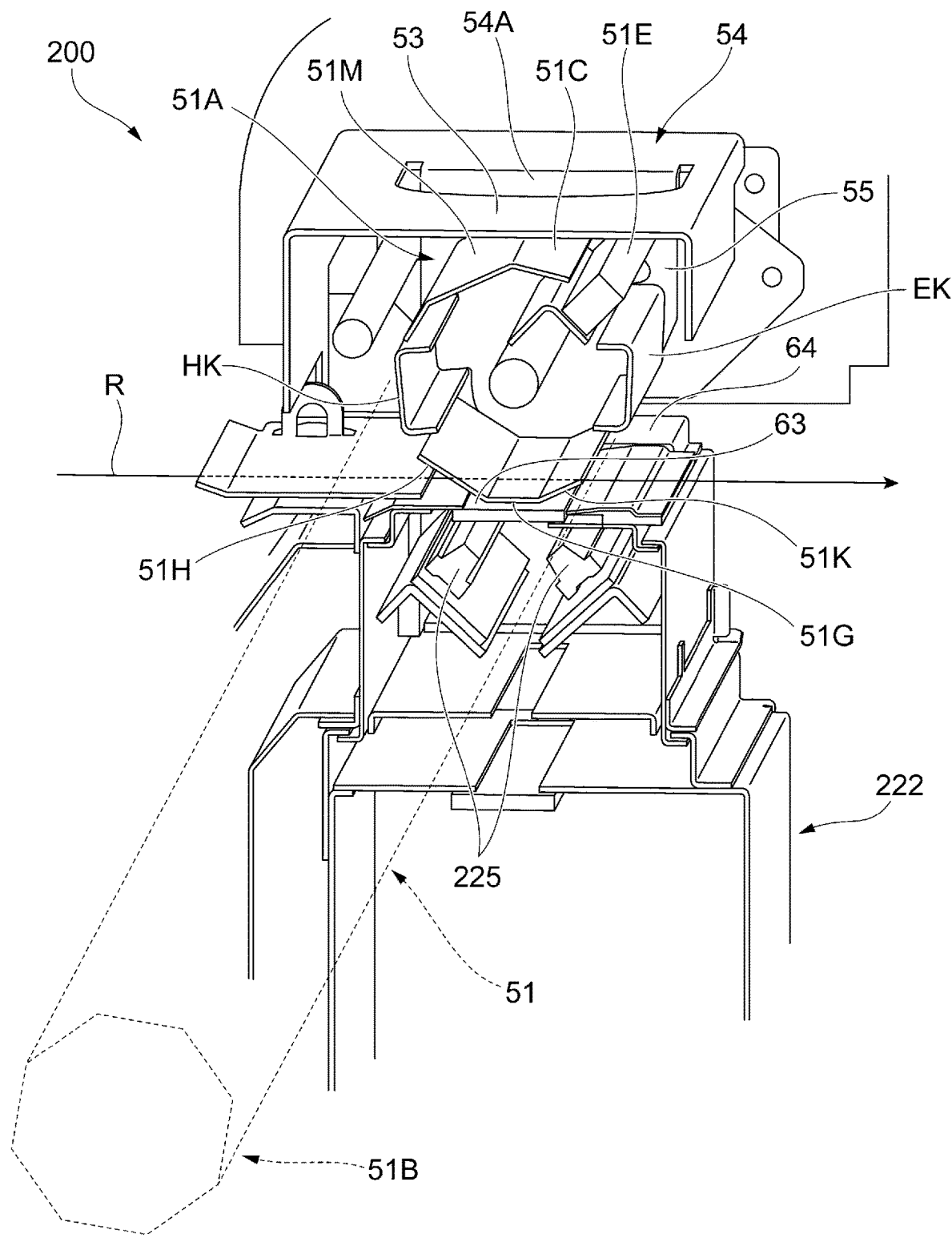
FIG. 3 illustrates a longitudinal sectional view of an inspection apparatus at a position at which an upper rotator is installed.

FIG. 3 illustrates a longitudinal sectional view of the inspection apparatus 200 at a position at which the upper rotator 51 is installed.

More specifically, FIG. 3 illustrates a sectional view of the inspection apparatus 200 that is perpendicular to the axial direction of the upper rotator 51 and that passes through a position near a first end portion 51A of the upper rotator 51.

According to the present exemplary embodiment, the upper rotator 51 includes the first end portion 51A and a second end portion 51B that are located at different positions in the axial direction. FIG. 3 illustrates a section of the inspection apparatus 200 along the vertical plane at the position near the first end portion 51A.

The upper rotator 51 will be described with reference to FIG. 3 and FIG. 4 described later. The lower rotator 52 has the same structure as that of the upper rotator 51.

According to the present exemplary embodiment, the lower image-reading member 222 is disposed at a position below the paper transport path R corresponding to a position away from the paper transport path R in a first direction. The lower image-reading member 222 reads the image that is formed on the first surface of the paper P that is transported along the paper transport path R.

The lower image-reading member 222 includes an optically transparent portion 63 that is disposed at a position below the paper transport path R corresponding to a position away from the paper transport path R in the first direction, and the reflected light from the paper P passes therethrough. The optically transparent portion 63 is composed of, for example, glass. The optically transparent portion 63 may be composed of another material other than glass, provided that light passes through the optically transparent portion 63.

The lower image-reading member 222 also includes an arrangement member 64 that is disposed around the optically transparent portion 63. According to the present exemplary embodiment, the arrangement member 64 supports the optically transparent portion 63.

According to the present exemplary embodiment, the upper rotator 51 is opposite the position at which the lower image-reading member 222 is installed with the paper transport path R interposed therebetween.

The upper rotator 51 has a polygonal shape. Outer surfaces of the upper rotator 51 include multiple flat surfaces 51C that are arranged in the circumferential direction of the upper rotator 51.

According to the present exemplary embodiment, a white reference plate HK is provided as an example of a correction member so as to face a flat surface 51C of the multiple flat surfaces 51C. According to the present exemplary embodiment, a color correction plate EK is provided as an example of the correction member so as to face another flat surface 51C.

The white reference plate HK and the color correction plate EK have an elongated shape and extend in the axial direction of the upper rotator 51. For example, as for the color correction plate EK, multiple color patches in different colors are arranged in the axial direction of the upper rotator 51.

According to the present exemplary embodiment, the white reference plate HK and the color correction plate EK face the lower image-reading member 222 while the paper P is not transported. The lower image-reading member 222 reads the white reference plate HK and the color correction plate EK.

According to the present exemplary embodiment, the lower image-reading member 222 is corrected based on the result of reading with the lower image-reading member 222.

Specifically, for example, a correction parameter that is used to correct image data that is acquired by reading with the lower image-reading member 222 is generated, or a reading condition when the lower image-reading member 222 reads an image is changed, based on the result of reading.

According to the present exemplary embodiment, a cleaning member 51E that cleans the optically transparent portion 63 is provided so as to face another flat surface 51C of the upper rotator 51.

According to the present exemplary embodiment, a paper guide portion 51G that guides the paper P that is transported is disposed on an outer surface of the upper rotator 51. The paper guide portion 51G is defined by a single flat surface 51C of the outer surfaces of the upper rotator 51.

According to the present exemplary embodiment, when the lower image-reading member 222 reads the image, the paper guide portion 51G is located so as to face the lower image-reading member 222. More specifically, the paper guide portion 51G is located so as to face the optically transparent portion 63.

When the lower image-reading member 222 reads the image, the paper guide portion 51G is located so as to be parallel to the optically transparent portion 63.

According to the present exemplary embodiment, when the lower image-reading member 222 reads the image, the paper P passes through a position between the paper guide portion 51G and the optically transparent portion 63.

At this time, the paper guide portion 51G guides the paper P. According to the present exemplary embodiment, when the paper P passes through the position between the paper guide portion 51G and the optically transparent portion 63, the lower image-reading member 222 reads the image that is formed on the paper P.

According to the present exemplary embodiment, the upper rotator 51 includes an upstream guide portion 51H and a downstream guide portion 51K. The upstream guide portion 51H and the downstream guide portion 51K are defined by the flat surfaces 51C of the upper rotator 51.

When the paper guide portion 51G faces the optically transparent portion 63, the upstream guide portion 51H is located upstream of the paper guide portion 51G. When the paper guide portion 51G faces the optically transparent portion 63, the upstream guide portion 51H inclines with respect to the transport direction of the paper P.

When the paper guide portion 51G faces the optically transparent portion 63, the upstream guide portion 51H approaches the optically transparent portion 63 as the position thereof is nearer to the most downstream position in the transport direction of the paper P.

When the paper guide portion 51G faces the optically transparent portion 63, the downstream guide portion 51K is located downstream of the paper guide portion 51G. When the paper guide portion 51G faces the optically transparent portion 63, the downstream guide portion 51K inclines with respect to the transport direction of the paper P.

When the paper guide portion 51G faces the optically transparent portion 63, the downstream guide portion 51K is gradually separated from the optically transparent portion 63 as the position thereof is nearer to the most downstream position in the transport direction of the paper P.

According to the present exemplary embodiment, the paper guide portion 51G, the upstream guide portion 51H, and the downstream guide portion 51K are formed by bending a single metal plate. According to the present exemplary embodiment, the paper guide portion 51G, the upstream guide portion 51H, and the downstream guide portion 51K are integrally formed.

According to the present exemplary embodiment, a facing portion 51M is defined by another flat surface 51C of the upper rotator 51. According to the present exemplary embodiment, in the case where the lower image-reading member 222 reads no image, and the paper P passes through the position between the optically transparent portion 63 and the upper rotator 51, the facing portion 51M is located so as to face the optically transparent portion 63.

According to the present exemplary embodiment, the distance between the facing portion 51M and the optically transparent portion 63 with the facing portion 51M facing the optically transparent portion 63 is longer than the distance between the paper guide portion 51G and the optically transparent portion 63 with the paper guide portion 51G facing the optically transparent portion 63.

According to the present exemplary embodiment, a retractation portion 53 that is retractable from the paper transport path R is provided. The retractation portion 53 is disposed above the paper transport path R. According to the present exemplary embodiment, the retractation portion 53 is movable upward. The retractation portion 53 extends in the axial direction of the upper rotator 51.

The retractation portion 53 corresponds to a part of a metal housing 54 that is formed by bending a metal plate. According to the present exemplary embodiment, the upper rotator 51 is rotatably supported by the housing 54.

According to the present exemplary embodiment, a rotator support 55 that supports the upper rotator 51 is provided. According to the present exemplary embodiment, the rotator support 55 corresponds to a part of the housing 54.

The rotator support 55 has a plate shape and extends in the vertical direction in the figure. The rotator support 55 is provided so as to protrude from a position away from the paper transport path R toward the paper transport path R.

According to the present exemplary embodiment, the first end portion 51A of the upper rotator 51 is supported by the retractation portion 53 with the rotator support 55 interposed therebetween.

According to the present exemplary embodiment, the rotator support 55 is in contact with the arrangement member 64 that is disposed around the optically transparent portion 63. In other words, according to the present exemplary embodiment, the rotator support 55 that supports the upper rotator 51 is in contact with the lower image-reading member 222.

According to the present exemplary embodiment, the retractation portion 53 and the rotator support 55 are integrally formed. More specifically, according to the present exemplary embodiment, the retractation portion 53 and the rotator support 55 are composed of a metal plate, and the rotator support 55 is formed by bending the metal plate.

According to the present exemplary embodiment, the metal plate is bent, a bent portion 54A is consequently provided, and the retractation portion 53 and the rotator support 55 are connected to each other at the bent portion 54A.

The retractation portion 53 and the rotator support 55 are composed of a metal plate. The retractation portion 53 and the rotator supports 55 are integrally formed.

Figure 4:
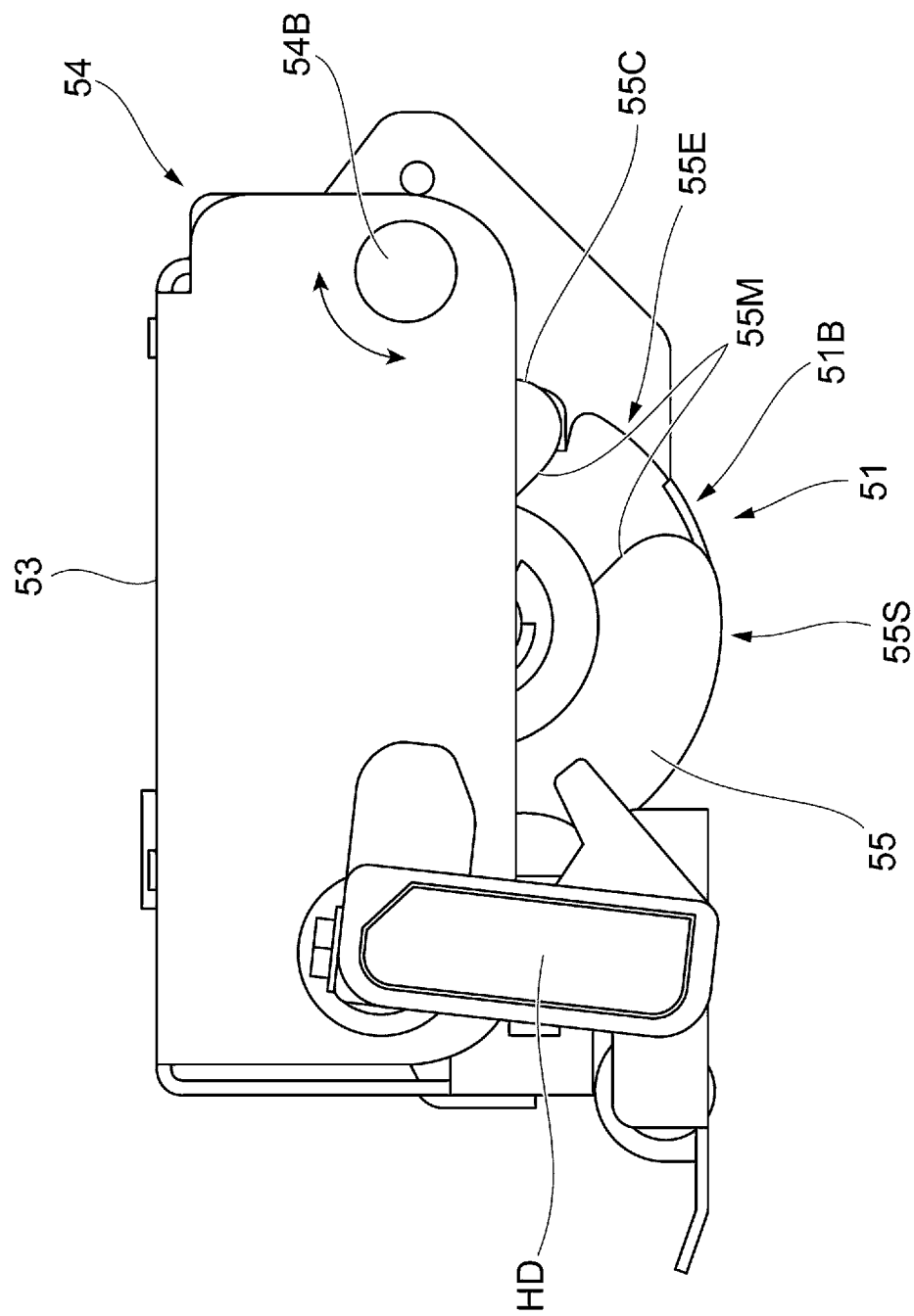
FIG. 4 illustrates a front view of the upper rotator and a housing viewed in front of the inspection apparatus.

FIG. 4 illustrates a front view of the upper rotator 51 and the housing 54 viewed in front of the inspection apparatus 200.

According to the present exemplary embodiment, another rotator support 55 that supports the upper rotator 51 is disposed at the front of the inspection apparatus 200. According to the present exemplary embodiment, the second end portion 51B of the upper rotator 51 is supported by the other rotator support 55 illustrated in FIG. 4.

According to the present exemplary embodiment, the rotator supports 55 are disposed at the front and rear of the inspection apparatus 200. According to the present exemplary embodiment, the rotator supports 55 support both ends of the upper rotator 51 in the axial direction.

According to the present exemplary embodiment, the housing 54 is rotatable about a rotation axis 54B that extends in the depth direction of the inspection apparatus 200. With the result that the housing 54 is rotated clockwise in the figure about the rotation axis 54B, the retractation portion 53 is retracted from the paper transport path R (see FIG. 3).

More specifically, according to the present exemplary embodiment, a user operates a handle HD such that a portion of the handle HD moves upward when the retractation portion 53 is retracted.

The upper rotator 51 is retracted from the paper transport path R in conjunction with the retraction of the retractation portion 53.

According to the present exemplary embodiment, the rotator supports 55 are disposed above the paper transport path R (see FIG. 3).

The rotator supports 55 are provided so as to protrude toward the lower image-reading member 222 (see FIG. 3) that is disposed below the paper transport path R.

As illustrated in FIG. 4, the rotator supports 55 have respective grooves 55M in which parts of the upper rotator 51 are inserted. The grooves 55M are formed so as to extend from outer circumferential edges 55C of the rotator supports 55 into the rotator supports 55.

Opening portions 55E of the grooves 55M are formed along the outer circumferential edges 55C of the rotator supports 55. The opening portions 55E are formed at positions away from end portions 55S in a direction in which the rotator supports 55 protrude.

Consequently, as for the rotator supports 55 according to the present exemplary embodiment, only the end portions 55S of the rotator supports 55 are in contact with the lower image-reading member 222 (see FIG. 3).

Figure 5:
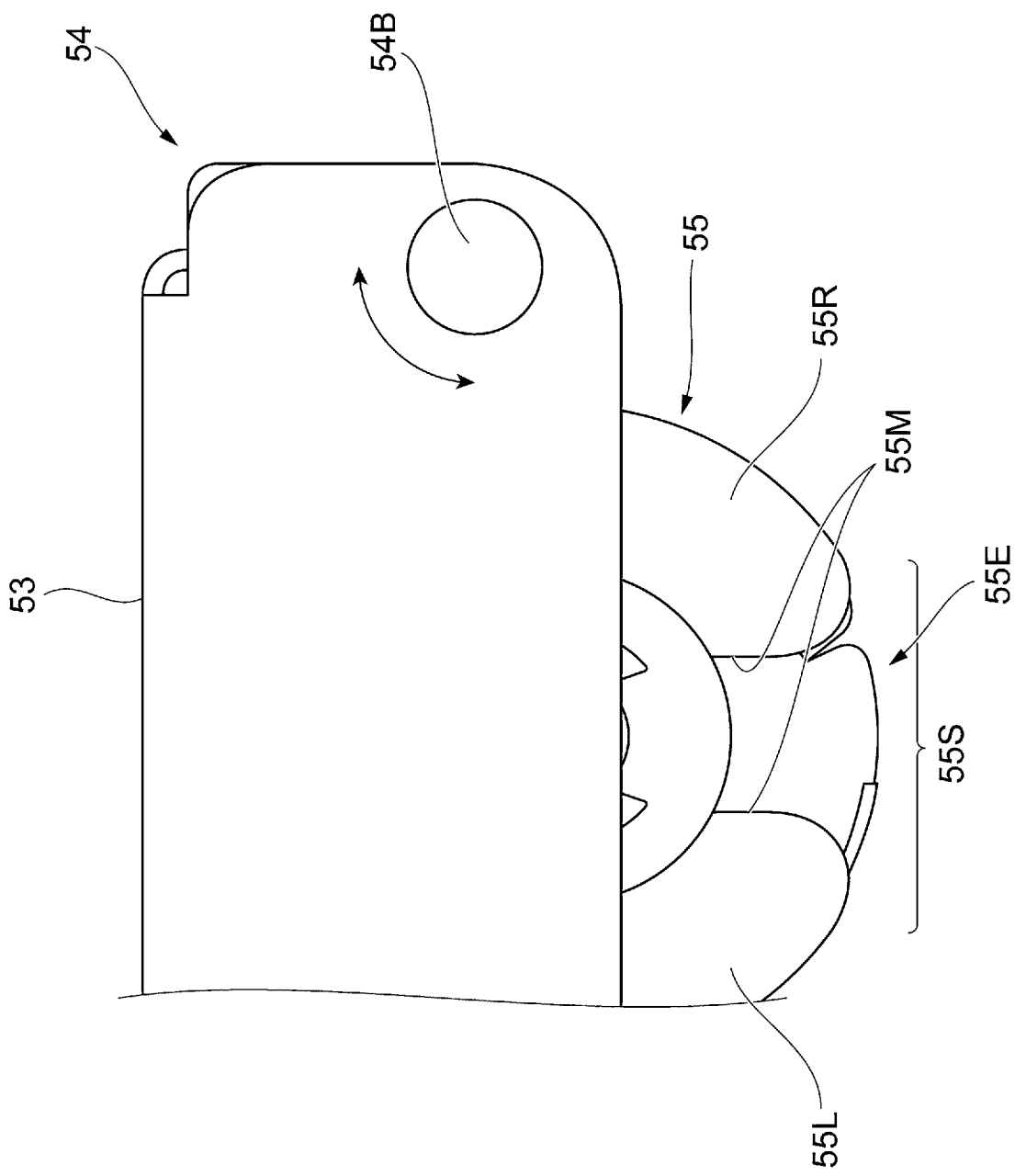
FIG. 5 illustrates another example of the structure of a rotator support.

For example, as illustrated in FIG. 5 (illustrating another example of the structure of each rotator support 55), it is supposed that the opening portions 55E of the grooves 55M are formed at the end portions 55S of the rotator supports 55.

In this case, there is a possibility that first portions 55L that are adjacent to the grooves 55M in a direction are in contact with the lower image-reading member 222 (see FIG. 3), or second portions 55R that are adjacent to the grooves 55M in the opposite direction are in contact with the lower image-reading member 222 due to, for example, the dimensional tolerance of the rotator supports 55.

In this case, the lower image-reading member 222 unstably supports the rotator supports 55, and precision with which the position of the upper rotator 51 is adjusted with respect to the lower image-reading member 222 decreases.

According to the present exemplary embodiment, however, the opening portions 55E of the grooves 55M are away from the end portions 55S of the rotator supports 55, and only the end portions 55S of the rotator supports 55 are in contact with the lower image-reading member 222.

In this way, the precision with which the position of the upper rotator 51 is adjusted with respect to the lower image-reading member 222 may be inhibited from decreasing.

According to the present exemplary embodiment, the upper rotator 51 that is supported by the rotator supports 55 (see FIG. 4) is not in contact with the lower image-reading member 222.

According to the present exemplary embodiment, the rotator supports 55 are in contact with the lower image-reading member 222, but the upper rotator 51 is not in contact with the lower image-reading member 222.

According to the present exemplary embodiment, the rotator supports 55 are in contact with the lower image-reading member 222, and the position of the upper rotator 51 is consequently adjusted with respect to the lower image-reading member 222.

Figure 6:
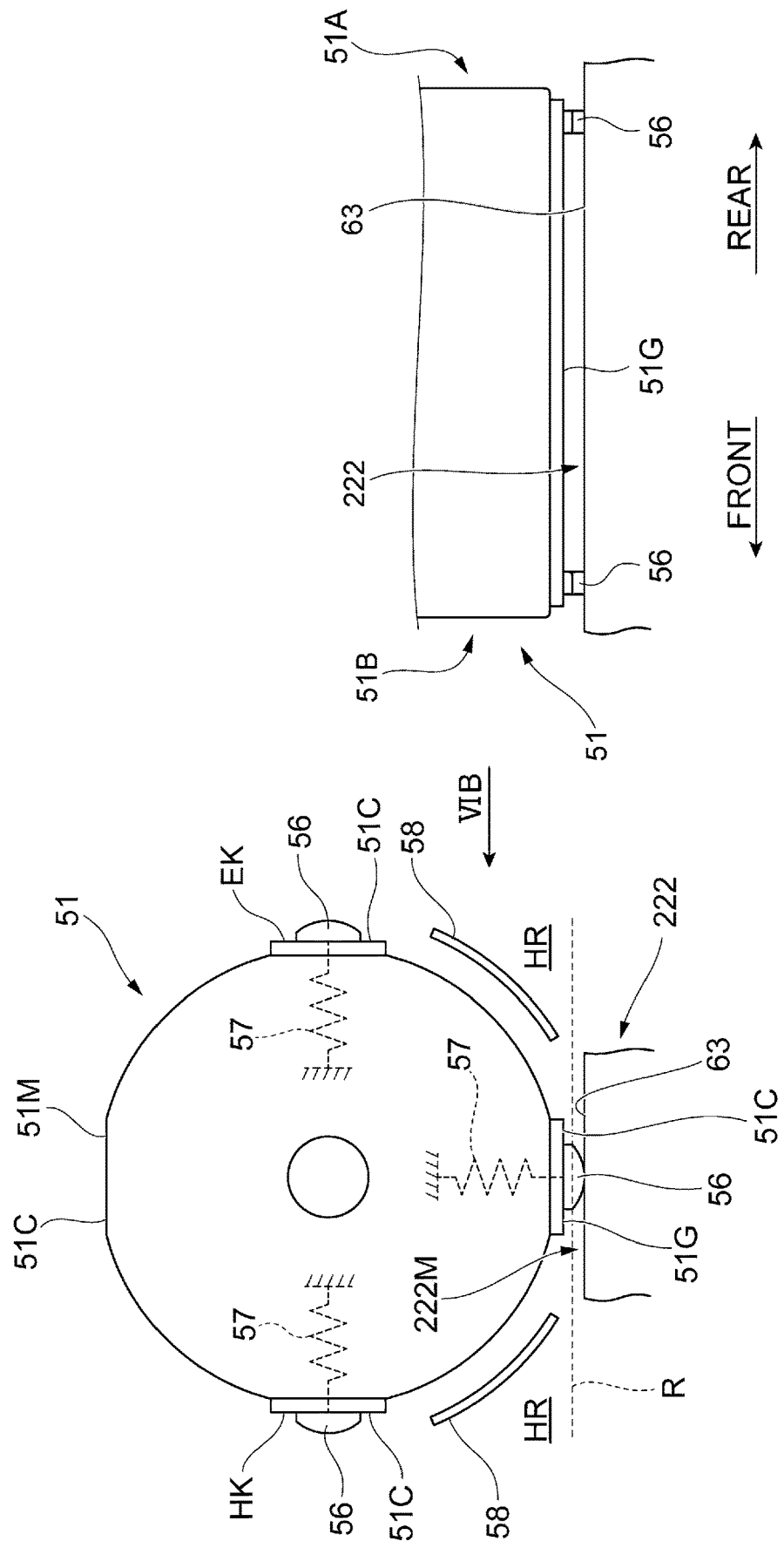
FIG. 6A and FIG. 6B illustrate another example of the structure of the upper rotator.

FIG. 6A and FIG. 6B illustrate another example of the structure of the upper rotator 51. FIG. 6A illustrates a state when the upper rotator 51 is viewed from a position on an extension line from the central axis of the upper rotator 51. FIG. 6B illustrates a state when the upper rotator 51 is viewed in a direction illustrated by using an arrow VIB in FIG. 6A.

In the example of the structure illustrated in FIG. 6A and FIG. 6B, parts of the upper rotator 51 are in contact with the lower image-reading member 222.

Specifically, in the example of the structure illustrated in FIG. 6A and FIG. 6B, the upper rotator 51 includes contact portions 56 that are in contact with the lower image-reading member 222. The contact portions 56 that are the parts of the upper rotator 51 are in contact with the lower image-reading member 222.

In the example of the structure, the rotator supports 55 that support the first end portion 51A and the second end portion 51B in the axial direction of the upper rotator 51 are provided as in the above description although this is not illustrated. The rotator supports 55 are supported by the retractation portion 53 that is connected to the rotator supports 55 as in the above description.

The rotator supports 55 (not illustrated) that support the upper rotator 51 illustrated in FIG. 6A and FIG. 6B are not in contact with the lower image-reading member 222. As for the upper rotator 51 illustrated in FIG. 6A and FIG. 6B, the rotator supports 55 are not in contact with the lower image-reading member 222, but the contact portions 56 that are the parts of the upper rotator 51 are in contact with the lower image-reading member 222.

In the example of the structure illustrated in FIG. 6A and FIG. 6B, the upper rotator 51 includes the multiple contact portions 56 that are in contact with the lower image-reading member 222.

In the example of the structure, the contact portions 56 are in contact with the optically transparent portion 63. This is not a limitation. The contact portions 56 may be in contact with the arrangement member 64 (see FIG. 3).

As illustrated in FIG. 6A, the multiple contact portions 56 are disposed at different positions in the circumferential direction of the upper rotator 51.

As illustrated in FIG. 6B, the multiple contact portions 56 are disposed at different positions in the axial direction of the upper rotator 51.

More specifically, the contact portions 56 are disposed at the first end portion 51A and the second end portion 51B in the longitudinal direction of the upper rotator 51.

As illustrated in FIG. 6A, the upper rotator 51 includes the paper guide portion 51G that guides the paper P that is transported along the paper transport path R as in the above description. According to the present exemplary embodiment, when the paper guide portion 51G faces the paper transport path R, some of the contact portions 56 are in contact with the lower image-reading member 222.

According to the present exemplary embodiment, the contact portions 56 are disposed at the first end portion and the second end portion in the longitudinal direction of the flat surface 51C that functions as the paper guide portion 51G among the multiple flat surfaces 51C of the upper rotator 51.

According to the present exemplary embodiment, when the flat surface 51C that functions as the paper guide portion 51G faces the paper transport path R, the contact portions 56 that are disposed on the flat surface 51C are in contact with the lower image-reading member 222.

In the example of the structure illustrated in FIG. 6A and FIG. 6B, the upstream guide portion 51H (see FIG. 3) is located upstream of the paper guide portion 51G, and the downstream guide portion 51K is located downstream of the paper guide portion 51G as in the above description although this is not illustrated.

In the example of the structure illustrated in FIG. 6A and FIG. 6B, as illustrated in FIG. 6A, the white reference plate HK and the color correction plate EK that are examples of the correction member that is used to correct the lower image-reading member 222 are mounted on the upper rotator 51 as in the above description.

According to the present exemplary embodiment, when the white reference plate HK faces the paper transport path R, some of the contact portions 56 of the upper rotator 51 are in contact with the lower image-reading member 222.

According to the present exemplary embodiment, when the color correction plate EK faces the paper transport path R, some of the contact portions 56 of the upper rotator 51 are in contact with the lower image-reading member 222.

In the example of the structure, some of the contact portions 56 are disposed on the flat surfaces 51C on which the white reference plate HK and the color correction plate EK are disposed among the multiple flat surfaces 51C of the upper rotator 51.

For this reason, in the example of the structure, when the white reference plate HK faces the paper transport path R and when the color correction plate EK faces the paper transport path R, these contact portions 56 of the upper rotator 51 are in contact with the lower image-reading member 222.

In the example of the structure, as illustrated in FIG. 6A, the upper rotator 51 includes urging members 57 that urge the contact portions 56 that are included in the upper rotator 51 toward the lower image-reading member 222.

The urging members 57 are composed of an elastic material such as a spring.

According to the present exemplary embodiment, the contact portions 56 that are included in the upper rotator 51 are configured to be urged by the urging members 57 toward the optically transparent portion 63 and are pressed against the optically transparent portion 63.

In the example of the structure, the paper guide portion 51G moves in conjunction with the contact portions 56 that are urged by the urging members 57 and that move.

For this reason, in the example of the structure, the contact portions 56 are pressed against the optically transparent portion 63, the positions of the contact portions 56 are adjusted with respect to the optically transparent portion 63, and the position of the paper guide portion 51G is consequently adjusted with respect to the optically transparent portion 63.

More specifically, in the example of the structure, the paper guide portion 51G and the two contact portions 56 that faces the flat surface 51C that functions as the paper guide portion 51G are integrally formed into a unit. The two contact portions 56 are pressed against the optically transparent portion 63, the positions thereof are adjusted, and the position of the paper guide portion 51G is consequently adjusted with respect to the optically transparent portion 63.

In the example of the structure, the white reference plate HK and the color correction plate EK move in conjunction with the contact portions 56 that are urged by the urging members 57 and that move.

In the example of the structure, the white reference plate HK and the two contact portions 56 that face the white reference plate HK are integrally formed into a unit. The two contact portions 56 are pressed against the optically transparent portion 63, the positions thereof are adjusted, and the position of the white reference plate HK is consequently adjusted with respect to the optically transparent portion 63.

In the example of the structure, the color correction plate EK and the two contact portions 56 that face the color correction plate EK are integrally formed into a unit. The two contact portions 56 are pressed against the optically transparent portion 63, the positions thereof are adjusted, and the position of the color correction plate EK is consequently adjusted with respect to the optically transparent portion 63.

In the example of the structure illustrated in FIG. 6A, restriction portions 58 that restrict movement of the contact portions 56 that are included in the upper rotator 51 are provided.

The restriction portions 58 restrict movement of the contact portions 56 that are urged by the urging members 57 toward directions other than the direction toward the lower image-reading member 222.

The lower image-reading member 222 includes a facing portion 222M that faces the upper rotator 51. The restriction portions 58 restrict movement of the contact portions 56 in directions other than the direction toward the facing portion 222M.

More specifically, the restriction portions 58 are disposed at positions away from a portion that the facing portion 222M that is included in the lower image-reading member 222 faces so as to be along the outer circumferential surface of the upper rotator 51.

According to the present exemplary embodiment, the contact portions 56 that are included in the upper rotator 51 are in contact with the restriction portions 58 when being located at the positions away from the portion that the facing portion 222M faces.

This restricts movement of the contact portions 56 toward opposite regions HR that are opposite regions of the restriction portions 58 from the position of the upper rotator 51.

In the opposite regions HR, various kinds of members are provided in some cases. The restriction portions 58 avoids interference between the contact portions 56 and the various kinds of members.

In the example of the structure, the restriction portions 58 cause the contact portions 56 to advance and retract.

When the contact portions 56 face the restriction portions 58, the contact portions 56 are pressed by the restriction portions 58 and retract toward the upper rotator 51. When the contact portions 56 are located at positions away from portions that the restriction portions 58 faces, the contact portions 56 move toward the optically transparent portion 63 that is disposed at the facing portion 222M.

Figure 7:
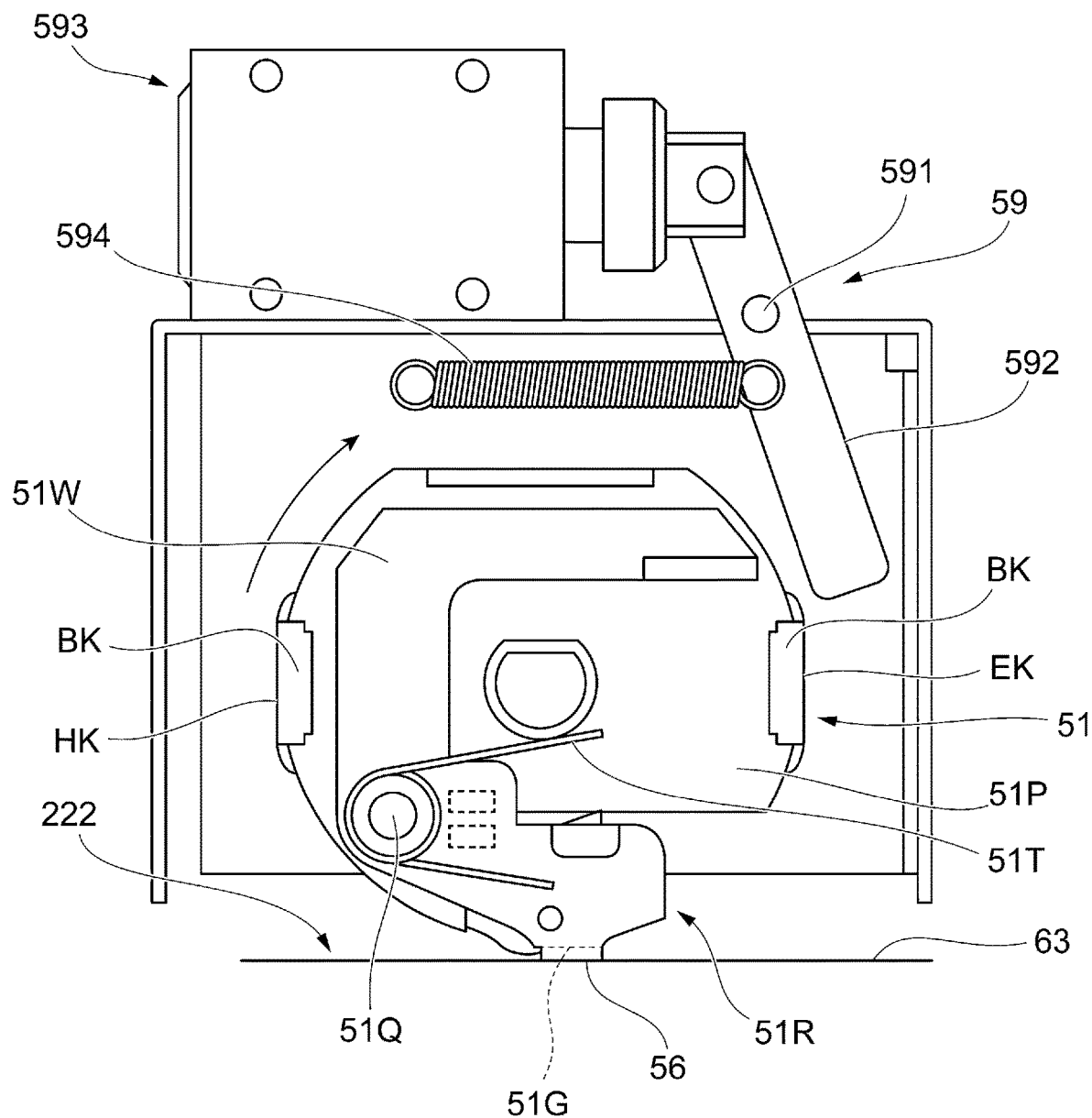
FIG. 7 illustrates another example of the structure of the upper rotator.

FIG. 7 illustrates another example of the structure of the upper rotator 51.

In the example of the structure, the upper rotator 51 includes an upper rotator body 51P and a movable portion 51R that is supported by the upper rotator body 51P, that rotates about a rotation axis 51Q, and that moves.

In the example of the structure, the movable portion 51R includes the contact portion 56 of the upper rotator 51. In the example of the structure, the movable portion 51R includes the paper guide portion 51G. In FIG. 7, the paper guide portion 51G is located behind the contact portion 56 in the direction perpendicular to the sheet in FIG. 7.

The rotation axis 51Q is located downstream of the contact portion 56 that is included in the movable portion 51R in the direction of rotation of the upper rotator 51.

In the example of the structure, the upper rotator 51 includes a torsion spring 51T that is an example of an urging unit that urges the movable portion 51R toward the lower image-reading member 222.

In the example of the structure, an interlocking portion 51W is provided so as to be rotatable about the rotation axis 51Q and moves in conjunction with the movable portion 51R.

In the example of the structure, an advancing-and-retreating mechanism 59 that causes the contact portion 56 to advance toward and retract from the lower image-reading member 222.

In the example of the structure, the white reference plate HK and the color correction plate EK are supported by the upper rotator body 51P with metal plates BK interposed therebetween. According to the present exemplary embodiment, the metal plates BK are fixed to the upper rotator body 51P by welding.

In the example of the structure, when the paper guide portion 51G faces the optically transparent portion 63, the torsion spring 51T urges the movable portion 51R toward the optically transparent portion 63. Consequently, the contact portion 56 that is included in the movable portion 51R is pressed against the optically transparent portion 63.

In this case, the position of the contact portion 56 is adjusted with respect to the optically transparent portion 63, and the position of the paper guide portion 51G is adjusted with respect to the optically transparent portion 63 as in the above description.

In the example of the structure, the movable portion 51R is provided for only the paper guide portion 51G but is not limited thereto. The movable portion 51R may be provided for both of the white reference plate HK and the color correction plate EK.

In the example of the structure, the advancing-and-retreating mechanism 59 is driven depending on an instruction from the user or automatically in the case where the paper P is jammed, and the paper P stops between the paper guide portion 51G and the optically transparent portion 63.

Consequently, as illustrated in FIG. 8A and FIG. 8B (illustrating movement of the advancing-and-retreating mechanism 59), the paper guide portion 51G (not illustrated in FIG. 8A and FIG. 8B) and the contact portion 56 is separated from the optically transparent portion 63, and the paper P is readily removed.

Specifically, the advancing-and-retreating mechanism 59 is driven, the interlocking portion 51W consequently rotates counterclockwise about the rotation axis 51Q as illustrated in FIG. 8A and FIG. 8B, and the movable portion 51R rotates counterclockwise about the rotation axis 51Q in conjunction with this.

More specifically, the interlocking portion 51W includes a pressing portion 512 that presses a portion 511 to be pressed that is included in the movable portion 51R from below. According to the present exemplary embodiment, the interlocking portion 51W rotates counterclockwise about the rotation axis 51Q, and the portion 511 to be pressed that is included in the movable portion 51R is consequently pressed by the pressing portion 512 from below. Consequently, the movable portion 51R rotates counterclockwise about the rotation axis 51Q.

Consequently, as illustrated in FIG. 8A and FIG. 8B, the paper guide portion 51G (not illustrated in FIG. 8A and FIG. 8B) and the contact portion 56 for the paper guide portion 51G are separated from the optically transparent portion 63, and the paper P is readily removed.

As illustrated in FIG. 7, the advancing-and-retreating mechanism 59 includes a rotation member 592 that rotates about a rotation axis 591, a solenoid 593 that is connected to a first end portion of the rotation member 592 in the longitudinal direction, and a coil spring 594 that is an example of an urging member that is connected to a second end portion of the rotation member 592 in the longitudinal direction.

The coil spring 594 is connected to the second end portion of the rotation member 592 in the longitudinal direction and urges the rotation member 592 such that the second end portion of the rotation member 592 moves toward the interlocking portion 51W.

According to the present exemplary embodiment, in the case where the movable portion 51R rotates counterclockwise about the rotation axis 51Q, as illustrated in FIG. 8B, the solenoid 593 is turned off. Consequently, the second end portion of the rotation member 592 in the longitudinal direction moves toward the interlocking portion 51W. Consequently, an end portion of the interlocking portion 51W is urged in an upward and leftward direction in the figure, and the end portion of the interlocking portion 51W moves in the upward and leftward direction in the figure.

In this case, the interlocking portion 51W rotates counterclockwise about the rotation axis 51Q, and the movable portion 51R rotates counterclockwise about the rotation axis 51Q in conjunction with this.

In this case, the contact portion 56 for the paper guide portion 51G and the paper guide portion 51G are separated from the optically transparent portion 63 as described above.

A change mechanism that changes the position of each contact portion 56 by causing the contact portion 56 illustrated in FIG. 6A, FIG. 6B, and FIG. 7 to advance and retract may be additionally provided.

In the case where the change mechanism is provided, the contact portion 56 does not move in conjunction with the paper guide portion 51G, the white reference plate HK, and the color correction plate EK. In the case where the change mechanism is provided, the contact portion 56 advances towards and retract from the optically transparent portion 63 with the paper guide portion 51G, the white reference plate HK, and the color correction plate EK fixed to the upper rotator body 51P that is the body of the upper rotator 51.

In this way, the distance between the paper guide portion 51G and the optically transparent portion 63, the distance between the white reference plate HK and the optically transparent portion 63, and the distance between the color correction plate EK and the optically transparent portion 63 may be changed.

The change mechanism that changes the position of the contact portion 56 may be a mechanism that uses a known technique. For example, a component such as a motor, a solenoid, a sensor, a clutch, or a gear may be used.

FIG. 9 illustrates the upstream transport roller 213A, the first intermediate transport roller 213B, the second intermediate transport roller 213C, the downstream transport roller 213D, and so on from above and in front of the inspection apparatus 200.

FIG. 10 illustrates the upstream transport roller 213A and so on in a direction illustrated by using an arrow X in FIG. 9. FIG. 11 illustrates the upstream transport roller 213A and so on in a direction illustrated by using an arrow XI in FIG. 9.

According to the present exemplary embodiment, as illustrated in FIG. 9, the upstream transport roller 213A, the first intermediate transport roller 213B, the second intermediate transport roller 213C, and the downstream transport roller 213D are provided as the transport rollers 213.

According to the present exemplary embodiment, rotation-number-information acquiring members 70 that acquire information about the number of rotation of the transport rollers 213 are provided for the respective transport rollers 213.

According to the present exemplary embodiment, operation-receiving members 71 that are rotatable and that receive an operation from the user are provided for the upstream transport roller 213A, the first intermediate transport roller 213B, the second intermediate transport roller 213C, and the downstream transport roller 213D.

According to the present exemplary embodiment, the operation-receiving members 71 rotate, and the transport rollers 213 for the respective operation-receiving members 71 consequently rotate. According to the present exemplary embodiment, the paper P that is jammed and that stops at the transport rollers 213 is consequently fed toward a position downstream or upstream of the transport rollers 213.

In other words, according to the present exemplary embodiment, the paper P that stops may be manually fed toward the position downstream or upstream of the transport rollers 213.

According to the present exemplary embodiment, multiple guide members 72 that guide the paper P that is transported along the paper transport path R are disposed above the paper transport path R.

According to the present exemplary embodiment, an upstream guide member 72A, an intermediate guide member 72B, and a downstream guide member 72C are provided as the multiple guide members 72.

According to the present exemplary embodiment, the guide members 72 are arranged in the order of the upstream guide member 72A, the intermediate guide member 72B, and the downstream guide member 72C from an upstream position to a downstream position in the transport direction of the paper P.

The guide members 72 are movable upward in the figure and are retractable from the paper transport path R.

More specifically, according to the present exemplary embodiment, handles 73 are provided for the respective guide members 72, and the guide members 72 are retracted from the paper transport path R in a manner in which the user holds and moves the handles 73 upward.

Each guide member 72 includes a first end portion 771 and a second end portion 772 that are located at different positions in the direction perpendicular to the transport direction of the paper P. The user holds and moves the handle 73 upward, and the first end portion 771 of the guide member 72 moves so as to be separated from the paper transport path R.

According to the present exemplary embodiment, the second end portion 772 of each guide member 72 is fixed to the body of the inspection apparatus 200. According to the present exemplary embodiment, the user holds the handle 73 and moves the guide member 72 upward, and the guide member 72 consequently rotates with the second end portion 772 centered. Consequently, the first end portion 771 of the guide member 72 moves so as to be separated from the paper transport path R.

As illustrated in FIG. 10, the upstream transport roller 213A that is an example of the transport unit includes the drive roller 31A that is an example of a drive rotator that is rotationally driven and the driven roller 31B that is an example of a driven rotator that rotates by receiving driving force from the drive roller 31A.

Similarly, the other transport rollers 213 other than the upstream transport roller 213A include the drive rollers 31A and the driven rollers 31B that rotate by receiving the driving force from the drive rollers 31A.

According to the present exemplary embodiment, the paper P that is transported from an upstream position is supplied between the drive rollers 31A and the driven rollers 31B and is transported to a downstream position by using the drive rollers 31A that are rotationally driven and the driven rollers 31B.

According to the present exemplary embodiment, a drive motor M (see FIG. 9) for driving the drive rollers 31A is provided. According to the present exemplary embodiment, driving force from the drive motor M is transmitted to the drive rollers 31A via a transmission shaft SH illustrated in FIG. 10. Consequently, the drive rollers 31A rotate.

According to the present exemplary embodiment, as illustrated in FIG. 10, the rotation-number-information acquiring members 70 are disposed at the rear of the inspection apparatus 200.

As illustrated in FIG. 9, the rotation-number-information acquiring members 70 are provided so as to face the upstream transport roller 213A, the first intermediate transport roller 213B, the second intermediate transport roller 213C, and the downstream transport roller 213D. The rotation-number-information acquiring members 70 include encoders.

According to the present exemplary embodiment, as illustrated in FIG. 10, the rotation-number-information acquiring members 70 are connected to the driven rollers 31B and acquire information about the number of rotation of the driven rollers 31B.

According to the present exemplary embodiment, restriction portions 74 that restrict movement of the rotation-number-information acquiring members 70 are provided. According to the present exemplary embodiment, the rotation-number-information acquiring members 70 are pressed against the restriction portions 74, and movement of the rotation-number-information acquiring members 70 is restricted.

According to the present exemplary embodiment, the rotation-number-information acquiring members 70 are pressed against the restriction portions 74. Consequently, the rotation-number-information acquiring members 70 are unlikely to move. In this way, in which the rotation-number-information acquiring members 70 are unlikely to move, precision with which the rotation-number-information acquiring members 70 acquire the information about the number of rotation may be improved.

According to the present exemplary embodiment, the rotation-number-information acquiring members 70 are placed on the restriction portions 74, the gravity acts on the rotation-number-information acquiring members 70, and the rotation-number-information acquiring members 70 are pressed against the restriction portions 74.

According to the present exemplary embodiment, as illustrated in FIG. 11, each restriction portion 74 is disposed below the center of gravity G of the rotation-number-information acquiring member 70. In other words, according to the present exemplary embodiment, the restriction portion 74 is located on a vertical line that passes through the center of gravity G of the rotation-number-information acquiring member 70.

It is supposed that a plane H is along the axial center 31X of the driven roller 31B, passes through the axial center 31X, and extends in the vertical direction as illustrated in FIG. 11. In this case, according to the present exemplary embodiment, the center of gravity G of the rotation-number-information acquiring member 70 is away from the plane H.

According to the present exemplary embodiment, each restriction portion 74 is located below the center of gravity G that is away from the plane H.

According to the present exemplary embodiment, each rotation-number-information acquiring member 70 is placed on the restriction portion 74, and the rotation-number-information acquiring member 70 is pressed from above against the restriction portion 74 that is located below the rotation-number-information acquiring member 70.

According to the present exemplary embodiment, the rotation-number-information acquiring members 70 are pressed against the restriction portions 74 by using the driving force from the drive rollers 31A.

More specifically, according to the present exemplary embodiment, the rotation-number-information acquiring members 70 are pressed against the restriction portions 74 by using the driving force that is transmitted from the drive rollers 31A to the rotation-number-information acquiring members 70 via the driven rollers 31B.

According to the present exemplary embodiment, as illustrated in FIG. 11, the driving force is applied to the rotation-number-information acquiring members 70 from the driven rollers 31B that rotate such that the rotation-number-information acquiring members 70 are rotated in a direction illustrated by using an arrow 11A. According to the present exemplary embodiment, the rotation-number-information acquiring members 70 are pressed against the restriction portions 74 by using the driving force that is applied such that the rotation-number-information acquiring members 70 are rotated.

According to the present exemplary embodiment, the rotation-number-information acquiring members 70 are pressed against the restriction portions 74 by using both of the gravity that acts on the rotation-number-information acquiring members 70 and the driving force that is transmitted to the rotation-number-information acquiring members 70 described above.

The rotation-number-information acquiring members 70 may be pressed against the restriction portions 74 by using either the gravity or the driving force instead of both of the gravity and the driving force.

According to the present exemplary embodiment, the rotation-number-information acquiring members 70 are urged in a single direction illustrated by using an arrow 10B in FIG. 10 and are pressed against the restriction portions 74.

According to the present exemplary embodiment, the rotation-number-information acquiring members 70 are movable in the direction opposite the single direction.

Specifically, according to the present exemplary embodiment, the rotation-number-information acquiring members 70 are provided with the rotation-number-information acquiring members 70 being movable upward in the figure.

Consequently, according to the present exemplary embodiment, the driven rollers 31B move so as to be separated from the drive rollers 31A in the case where the paper P that is transported is thick. Accordingly, the paper P is transportable by using the drive rollers 31A and the driven rollers 31B also in the case where the paper P that is transported is thick.

According to the present exemplary embodiment, as illustrated in FIG. 10, pressing members 76 that press the driven rollers 31B are provided. The pressing members 76 include springs and are movable upward from the driven rollers 31B in the figure according to the present exemplary embodiment.

Consequently, according to the present exemplary embodiment, the paper P is transportable by using the drive rollers 31A and the driven rollers 31B in the case where the paper P that is transported is thick as described above.

As illustrated in FIG. 11, the rotation-number-information acquiring members 70 include respective downstream portions 70B that are located downstream of the driven rollers 31B in the direction of rotation. According to the present exemplary embodiment, the downstream portions 70B of the rotation-number-information acquiring members 70 are pressed against the restriction portions 74.

The downstream portions 70B of the rotation-number-information acquiring members 70 are located as lower portions of the rotation-number-information acquiring members 70. According to the present exemplary embodiment, the restriction portions 74 are located below the downstream portions 70B that are located as the lower portions of the rotation-number-information acquiring members 70, and the downstream portions 70B are pressed against the restriction portions 74.

According to the present exemplary embodiment, the driven rollers 31B are disposed above the drive rollers 31A. According to the present exemplary embodiment, as illustrated in FIG. 11, the center of gravity G of each rotation-number-information acquiring member 70 is located away from the plane H and upstream of the plane H in the transport direction of the paper P.

According to the present exemplary embodiment, the restriction portions 74 are located below the rotation-number-information acquiring members 70 as described above.

In this case, the rotation-number-information acquiring members 70 are pressed against the restriction portions 74 by using both of the gravity that acts on the rotation-number-information acquiring members 70 and the driving force that is transmitted to the rotation-number-information acquiring members 70 as described above.

Figure 12:
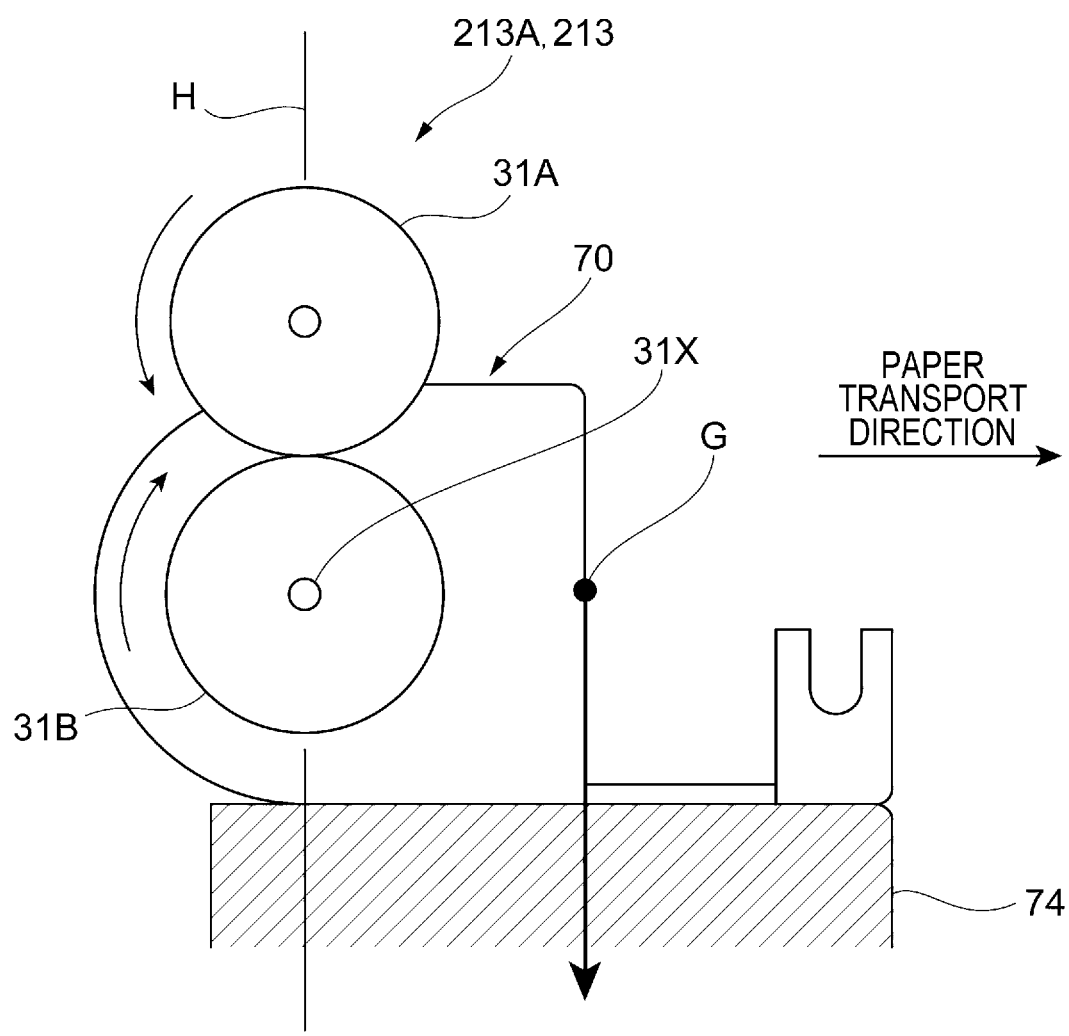
FIG. 12 illustrates another example of the structure.

FIG. 12 illustrates another example of the structure. FIG. 12 illustrates a state when the upstream transport roller 213A and the rotation-number-information acquiring member 70 are viewed in front of the inspection apparatus 200 as in FIG. 11.

In the example of the structure illustrated in FIG. 12, the driven roller 31B is located below the drive roller 31A. Also, in the example of the structure, the center of gravity G of the rotation-number-information acquiring member 70 is away from the plane H that passes through the axial center 31X of the driven roller 31B.

In the example of the structure, the center of gravity G of the rotation-number-information acquiring member 70 is located downstream of the plane H in the transport direction of the paper P. Also, in the example of the structure, the restriction portion 74 is located below the center of gravity G of the rotation-number-information acquiring member 70.

Also, in the example of the structure, the rotation-number-information acquiring member 70 is pressed against the restriction portion 74 by using both of the gravity that acts on the rotation-number-information acquiring member 70 and the driving force that is transmitted to the rotation-number-information acquiring member 70 as in the above description.

The driven roller 31B is not limited by a position above the drive roller 31A and may be located below the drive roller 31A as illustrated in FIG. 12.

In this case, as illustrated in FIG. 12, the center of gravity G of the rotation-number-information acquiring member 70 is located downstream of the plane H. In this way, the rotation-number-information acquiring member 70 may be pressed against the restriction portion 74 by using both of the gravity and the driving force.

Figure 13:
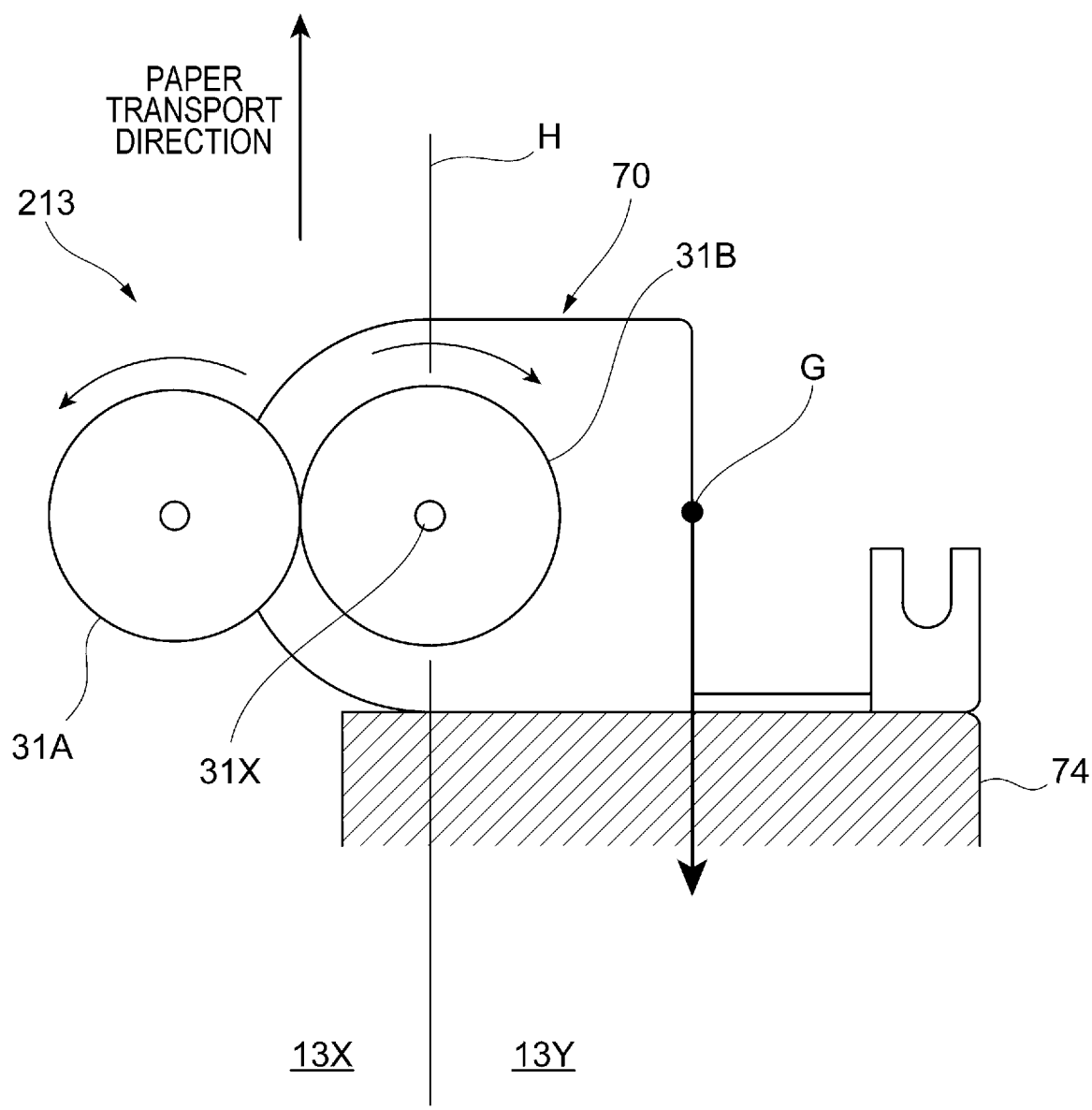
FIG. 13 illustrates another example of the structure.

FIG. 13 illustrates another example of the structure.

In the example of the structure, the position of the drive roller 31A in the horizontal direction differs from the position of the driven roller 31B in the horizontal direction. In the example of the structure, the paper P is transported upward from below by using the transport rollers 213.

As for an apparatus that has a function of transporting the paper P such as the inspection apparatus 200, the paper P is transported in the vertical direction in some cases. In these cases, for example, as illustrated in FIG. 13, the position of the drive roller 31A in the horizontal direction differs from the position of the driven roller 31B in the horizontal direction.

The meaning of the phrase "the position of the drive roller 31A in the horizontal direction differs from the position of the driven roller 31B in the horizontal direction" is not limited to the meaning of the phrase "the drive roller 31A and the driven roller 31B are located on a single straight line that extends in the horizontal direction".

Even when either the drive roller 31A or the driven roller 31B is away from the single straight line, the position of the drive roller 31A in the horizontal direction differs from the position of the driven roller 31B in the horizontal direction, provided that the positions in the horizontal direction differ from each other.

In the example of the structure illustrated in FIG. 13, the drive roller 31A is located in a first region 13X of two regions facing each other with the plane H that passes through the axial center 31X of the driven roller 31B interposed therebetween, and the center of gravity G of the rotation-number-information acquiring member 70 is located in a second region 13Y of the two regions.

Also, in the example of the structure, the restriction portion 74 is located below the rotation-number-information acquiring member 70. More specifically, the restriction portion 74 is located below the center of gravity G of the rotation-number-information acquiring member 70.

Also, in the example of the structure, the rotation-number-information acquiring member 70 is pressed against the restriction portion 74 by using both of the gravity that acts on the rotation-number-information acquiring member 70 and the driving force that is transmitted to the rotation-number-information acquiring member 70 as in the above description.

As illustrated in FIG. 13, in the case where the driven roller 31B and the drive roller 31A are arranged in the horizontal direction, the center of gravity G of the rotation-number-information acquiring member 70 is located opposite the drive roller 31A with the plane H interposed therebetween.

In this way, the rotation-number-information acquiring member 70 may be pressed against the restriction portion 74 by using both of the gravity and the driving force also in this case.

Figure 14:
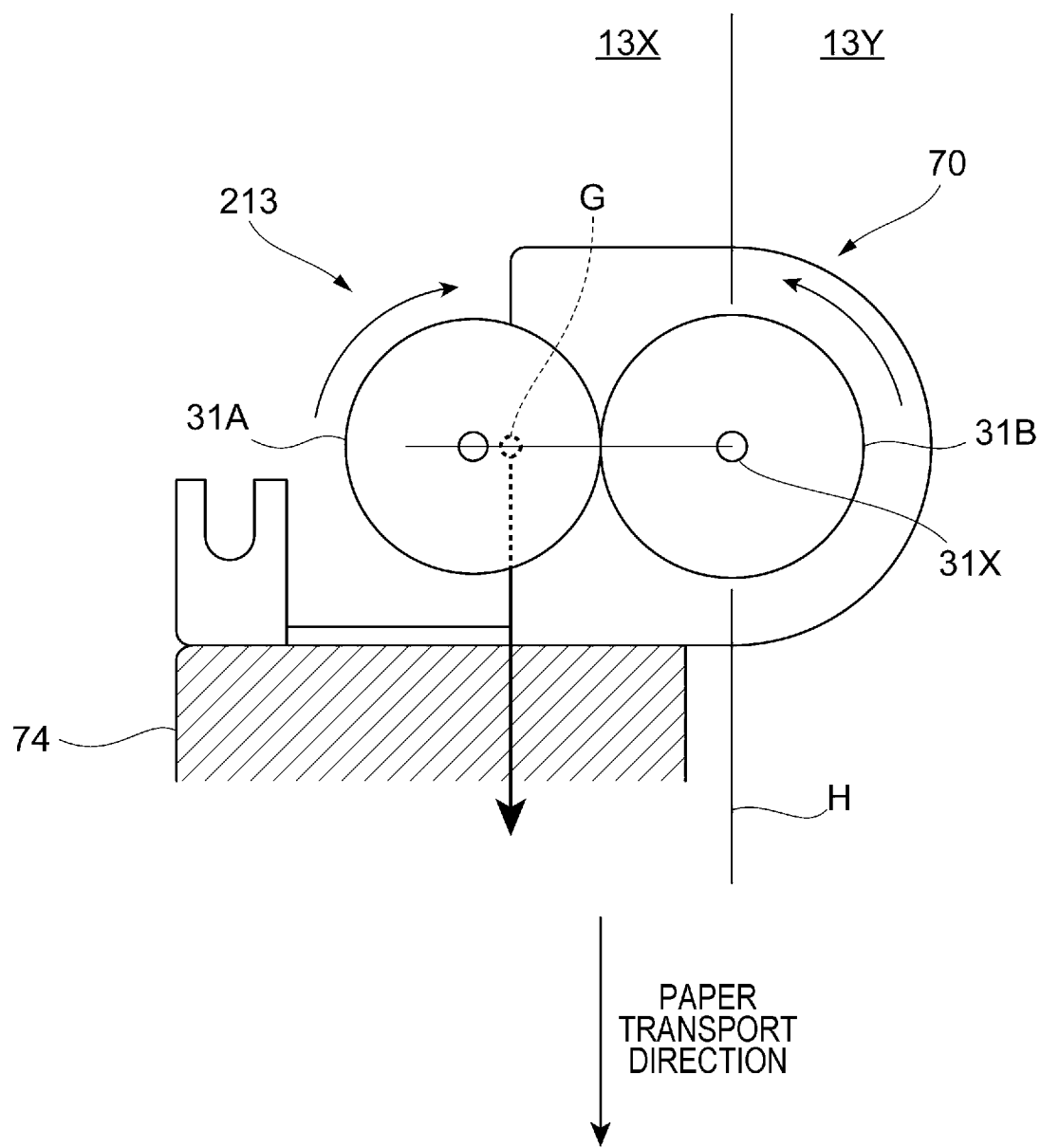
FIG. 14 illustrates another example of the structure.

FIG. 14 illustrates another example of the structure.

Also, in the example of the structure, the position of the drive roller 31A in the horizontal direction differs from the position of the driven roller 31B in the horizontal direction as in the above description. In the example of the structure, the transport rollers 213 transport the paper P downward from above.

Also, in the example of the structure, the drive roller 31A is located in the first region 13X of the two regions facing each other with the plane H that passes through the axial center 31X of the driven roller 31B interposed therebetween. In the example of the structure, the center of gravity G of the rotation-number-information acquiring member 70 is located in the first region 13X of the two regions.

Also, in the example of the structure, the rotation-number-information acquiring member 70 is pressed against the restriction portion 74 by using both of the gravity that acts on the rotation-number-information acquiring member 70 and the driving force that is transmitted to the rotation-number-information acquiring member 70 as in the above description.

In the case where the driven roller 31B and the drive roller 31A are arranged in the horizontal direction, and the paper P is transported downward from above, as illustrated in FIG. 14, the center of gravity G of the rotation-number-information acquiring member 70 is nearer than the plane H to the drive roller 31A.

In this way, the rotation-number-information acquiring member 70 may be pressed against the restriction portion 74 by using both of the gravity and the driving force also in this case.

Figure 15:
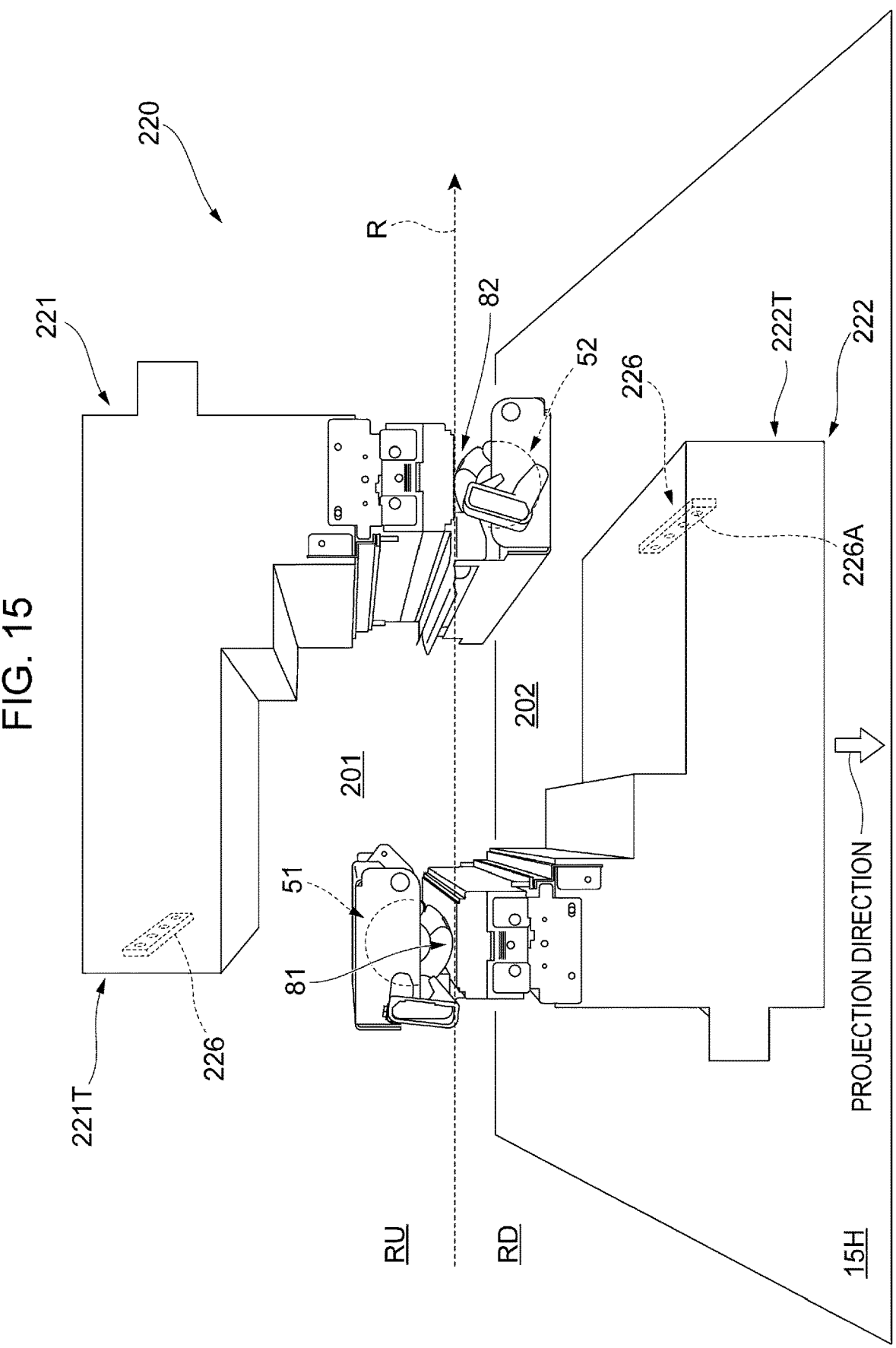
FIG. 15 illustrates an upper image-reading member and a lower image-reading member in front of the inspection apparatus.

FIG. 15 illustrates the upper image-reading member 221 and the lower image-reading member 222 in front of the inspection apparatus 200.

According to the present exemplary embodiment, the multiple transport rollers 213 (see FIG. 9) that function as the transport unit transport the paper P as described above.

The paper P that is transported passes through an upstream location 81 illustrated in FIG. 15 and a downstream location 82 that is located downstream of the upstream location 81 in the transport direction of the paper P.

According to the present exemplary embodiment, the upstream location 81 faces the optically transparent portion 63 (see FIG. 3) that is included in the lower image-reading member 222, and the downstream location 82 faces the optically transparent portion 63 (not illustrated) that is included in the upper image-reading member 221.

According to the present exemplary embodiment, the lower image-reading member 222 reads the image at the upstream location 81, and the upper image-reading member 221 reads the image at the downstream location 82. However, the arrangement of the image-reading members 220 is not limited thereto.

The top and the bottom may be reversed with the paper transport path R interposed therebetween, the upper image-reading member 221 may read the image at the upstream location 81, and the lower image-reading member 222 may read the image at the downstream location 82.

The lower image-reading member 222 that is an example of an upstream image-reading member includes the light-receiving unit 226 that receives the reflected light from the paper P as described above. The light-receiving unit 226 includes the multiple light-receiving elements 226A that are arranged in the direction perpendicular to the transport direction of the paper P.

The lower image-reading member 222 reads the image that is formed on the first surface of the paper P when the paper P is located at the upstream location 81.

The upper image-reading member 221 that is an example of a downstream image-reading member includes the light-receiving unit 226 that receives the reflected light from the paper P.

The upper image-reading member 221 reads the image that is formed on the second surface of the paper P when the paper P is located at the downstream location 82.

According to the present exemplary embodiment, the light-receiving unit 226 of the lower image-reading member 222 is located downstream of the upstream location 81 in the transport direction of the paper P.

The light-receiving unit 226 of the upper image-reading member 221 is located upstream of the downstream location 82 in the transport direction of the paper P.

Figure 16:
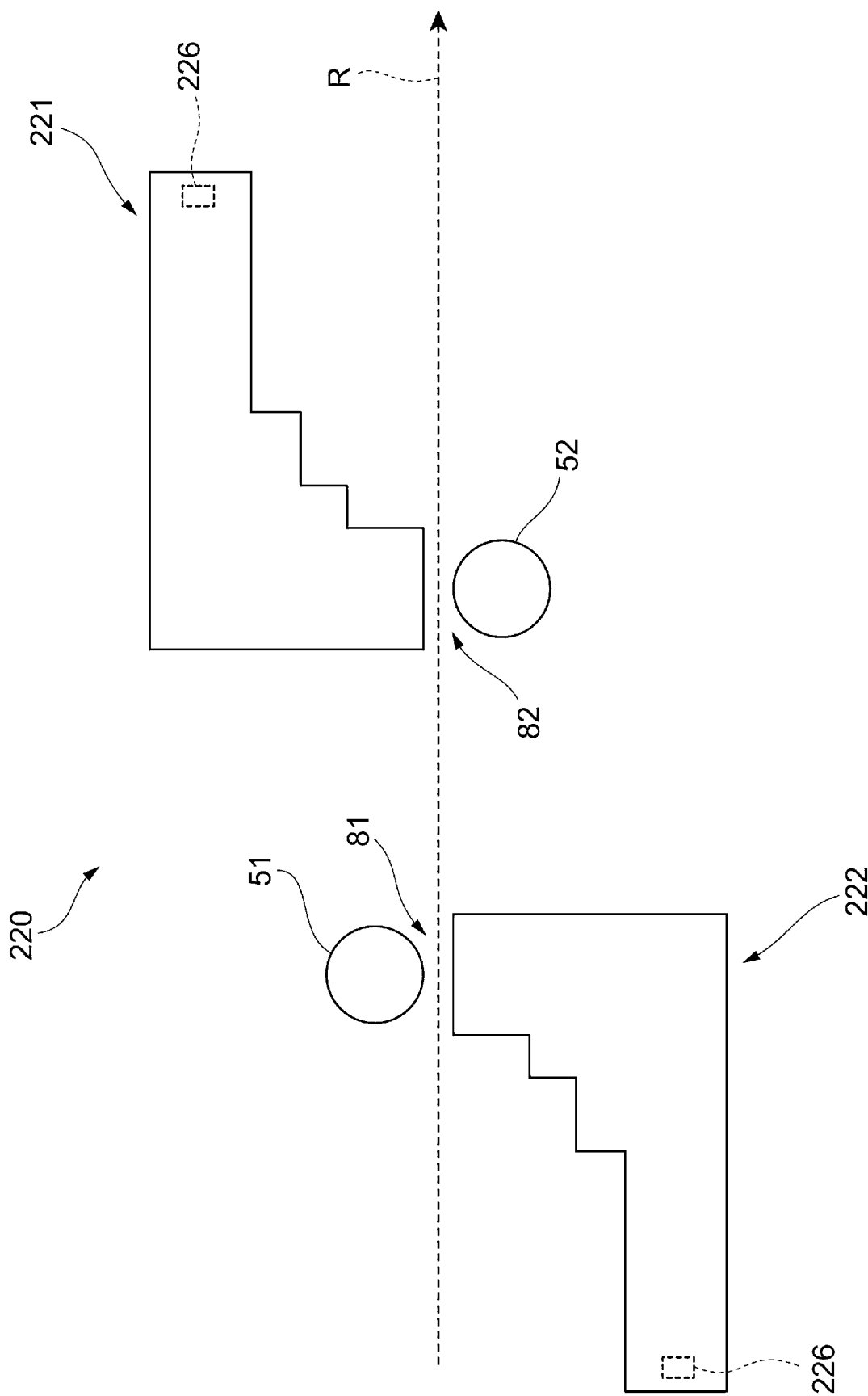
FIG. 16 illustrates another example of the arrangement of the upper image-reading member and the lower image-reading member.

For example, as illustrated in FIG. 16 (illustrating another example of the arrangement of the upper image-reading member 221 and the lower image-reading member 222), it is supposed that the light-receiving unit 226 of the lower image-reading member 222 is located upstream of the upstream location 81 in the transport direction of the paper P, and the light-receiving unit 226 of the upper image-reading member 221 is located downstream of the downstream location 82 in the transport direction of the paper P.

In this case, a volume that is occupied by the image-reading members 220 that include the upper image-reading member 221 and the lower image-reading member 222 substantially increases, and the size of the inspection apparatus 200 consequently increases.

According to the present exemplary embodiment, as illustrated in FIG. 15, the light-receiving unit 226 of the lower image-reading member 222 is located downstream of the upstream location 81 in the transport direction of the paper P, and the light-receiving unit 226 of the upper image-reading member 221 is located upstream of the downstream location 82 in the transport direction of the paper P.

Figure 17:
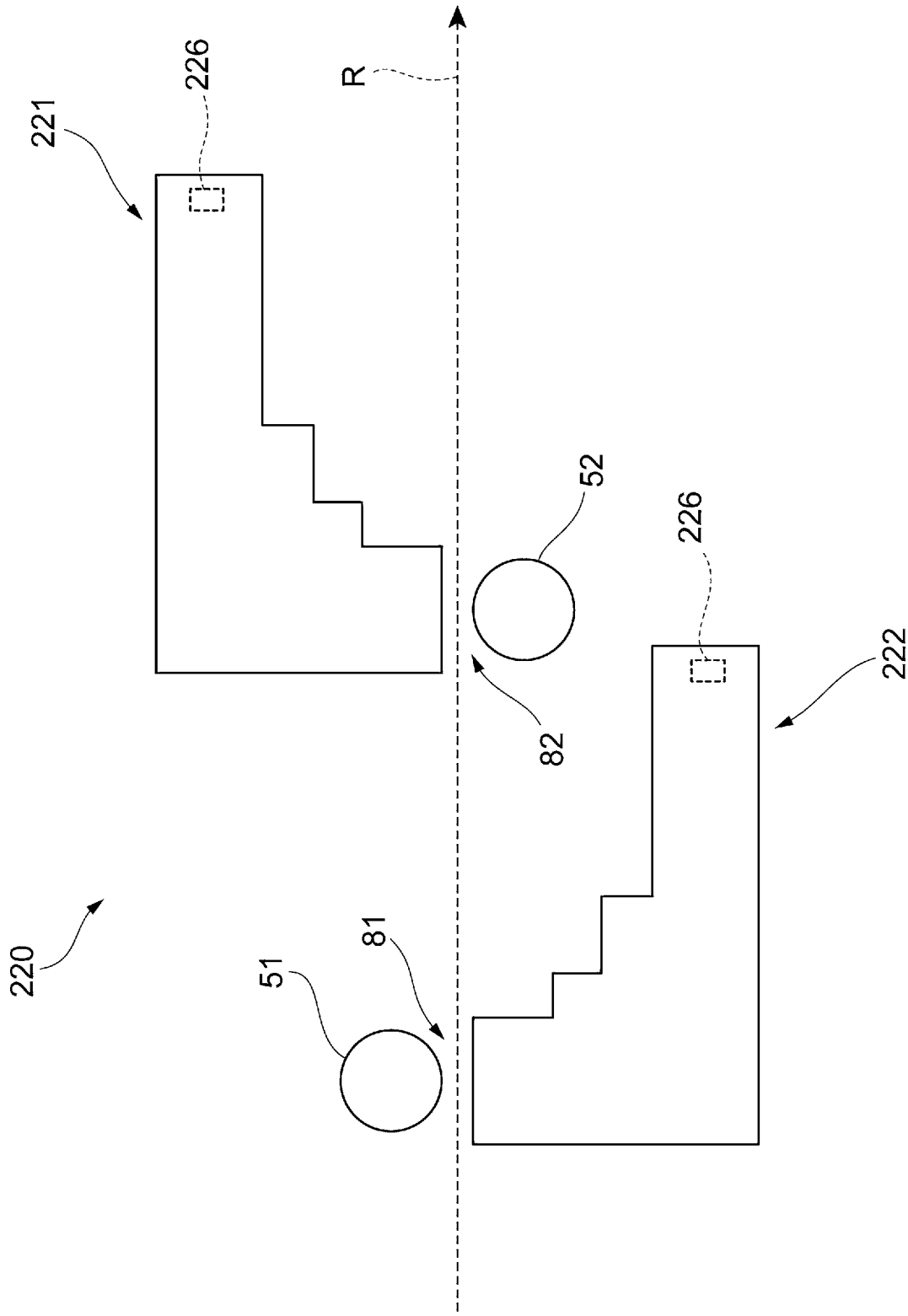
FIG. 17 illustrates another example of the arrangement of the upper image-reading member and the lower image-reading member.

Another exemplary embodiment is illustrated in, for example, FIG. 17 (illustrating another example of the arrangement of the upper image-reading member 221 and the lower image-reading member 222).

According to the exemplary embodiment illustrated in FIG. 17, the light-receiving unit 226 of the lower image-reading member 222 is located downstream of the upstream location 81 in the transport direction of the paper P, and the light-receiving unit 226 of the upper image-reading member 221 is located downstream of the downstream location 82 in the transport direction of the paper P.

Figure 18:
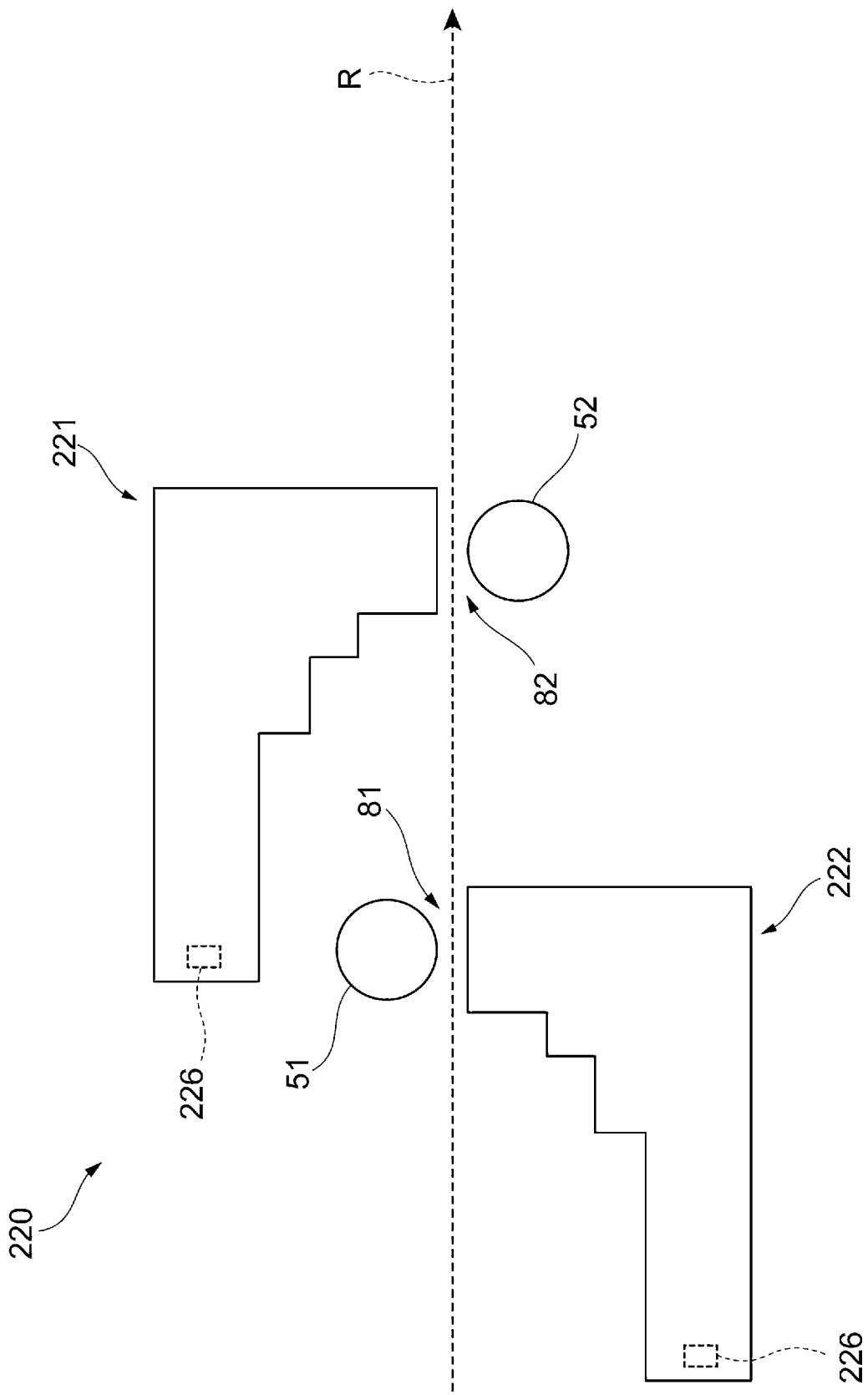
FIG. 18 illustrates another example of the arrangement of the upper image-reading member and the lower image-reading member.

For example, a structure illustrated in FIG. 18 (illustrating another example of the arrangement of the upper image-reading member 221 and the lower image-reading member 222) may be used.

In the example of the structure illustrated in FIG. 18, the light-receiving unit 226 of the upper image-reading member 221 is located upstream of the downstream location 82 in the transport direction of the paper P, and the light-receiving unit 226 of the lower image-reading member 222 is located upstream of the upstream location 81 in the transport direction of the paper P.

FIG. 15 is referred again for the following description.

According to the present exemplary embodiment, as illustrated in FIG. 15, the light-receiving unit 226 of the lower image-reading member 222 is located downstream of the light-receiving unit 226 of the upper image-reading member 221 in the transport direction of the paper P.

According to the present exemplary embodiment, the light-receiving unit 226 of the upper image-reading member 221 is located upstream of the light-receiving unit 226 of the lower image-reading member 222 in the transport direction of the paper P.

According to the present exemplary embodiment, an end portion 222T of the lower image-reading member 222 that is located at the most downstream position in the transport direction of the paper P is located downstream of the downstream location 82 in the transport direction of the paper P.

According to the present exemplary embodiment, an end portion 221T of the upper image-reading member 221 that is located at the most upstream position in the transport direction of the paper P is located upstream of the upstream location 81 in the transport direction of the paper P.

According to the present exemplary embodiment, the upper rotator 51 is disposed at the upstream location 81. The upper rotator 51 is opposite the position at which the lower image-reading member 222 is installed with the paper transport path R interposed therebetween.

The upper rotator 51 is disposed in a gap (referred to below as an "upper gap 201") between the lower image-reading member 222 and the upper image-reading member 221 above the paper transport path R.

The case where the upper rotator 51 is located in the upper gap 201 includes the case where a part of the upper rotator 51 is located in the upper gap 201.

According to the present exemplary embodiment, the lower rotator 52 is disposed at the downstream location 82. The lower rotator 52 is opposite the position at which the upper image-reading member 221 is installed with the paper transport path R interposed therebetween.

The lower rotator 52 is disposed in a gap (referred to below as a "lower gap 202") between the upper image-reading member 221 and the lower image-reading member 222 below the paper transport path R.

The case where the lower rotator 52 is located in the lower gap 202 includes the case where a part of the lower rotator 52 is located in the lower gap 202 as in the above description.

According to the present exemplary embodiment, the lower image-reading member 222 and the upper image-reading member 221 are arranged such that the lower image-reading member 222 and the upper image-reading member 221 overlap in the case where the lower image-reading member 222 and the upper image-reading member 221 are projected on an imaginary plane 15H parallel to the transport path R.

The imaginary plane 15H described herein is a plane along the paper P in the case where the paper P is along the paper transport path R and is located on the paper transport path R.

Figure 19:
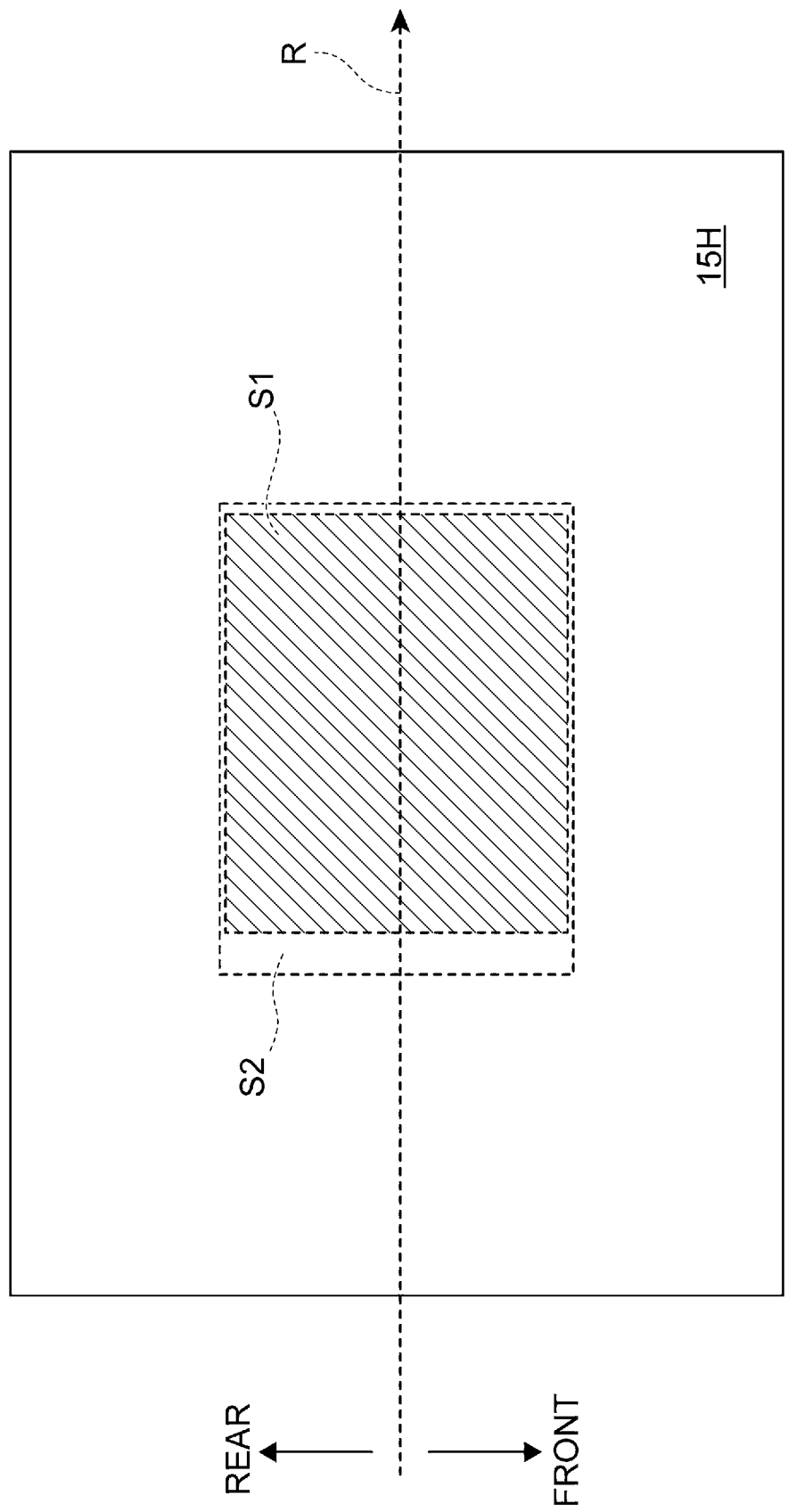
FIG. 19 illustrates a plane viewed from above.

FIG. 19 and FIG. 20 illustrate the plane 15H viewed from above. In other words, FIG. 19 illustrates the plane 15H viewed from an upstream position in a projection direction as described above.

According to the present exemplary embodiment, as illustrated in FIG. 19, the area S1 of a portion at which the lower image-reading member 222 and the upper image-reading member 221 overlap on the plane 15H is equal to or more than 80% of the projection area S2 of the lower image-reading member 222 in the case where the lower image-reading member 222 is projected on the plane 15H.

According to the present exemplary embodiment, as illustrated in FIG. 20, the area S1 of the portion at which the lower image-reading member 222 and the upper image-reading member 221 overlap on the plane 15H is equal to or more than 80% of the projection area S3 of the upper image-reading member 221 in the case where the upper image-reading member 221 is projected on the plane 15H.

The area S1 of the portion at which the lower image-reading member 222 and the upper image-reading member 221 overlap is not limited to an area of 80% or more described above.

For example, the area S1 of the portion at which the lower image-reading member 222 and the upper image-reading member 221 overlap may be equal to or more than 50% of the projection area S2 in the case where the lower image-reading member 222 is projected on the plane 15H and may be equal to or more than 50% of the projection area S3 in the case where the upper image-reading member 221 is projected on the plane 15H.

The image-reading members are thus provided such that the lower image-reading member 222 and the upper image-reading member 221 overlap.

FIG. 21 illustrates an inner structure of the upper image-reading member 221. The lower image-reading member 222 has the same structure as that of the upper image-reading member 221. Accordingly, the lower image-reading member 222 is not described.

According to the present exemplary embodiment, the upper image-reading member 221 includes the light source 225 as described above. The light source 225 radiates light to a portion of the paper P that is located at the downstream location 82 (see FIG. 15).

The upper image-reading member 221 also includes the light-receiving unit 226 that receives reflected light from the portion of the paper P that is located at the downstream location 82.

The upper image-reading member 221 includes the multiple light-reflecting members 227 that reflect the reflected light from the paper P and that guides the reflected light to the light-receiving unit 226.

According to the present exemplary embodiment, a first light-reflecting member 227A, a second light-reflecting member 227B, and a third light-reflecting member 227C are provided as the multiple light-reflecting members 227.

According to the present exemplary embodiment, the light-reflecting members 227 are arranged in the order of the first light-reflecting member 227A, the second light-reflecting member 227B, and the third light-reflecting member 227C in the direction in which the reflected light travels.

According to the present exemplary embodiment, at least a light-reflecting member 227 of the multiple light-reflecting members 227 reflects the reflected light multiple times. Specifically, according to the present exemplary embodiment, the first light-reflecting member 227A reflects the reflected light two times.

In the case described according to the present exemplary embodiment by way of example, the first light-reflecting member 227A reflects the reflected light multiple times. However, the light-reflecting member 227 that reflects the reflected light multiple times may be another light-reflecting member 227 such as the second light-reflecting member 227B or the third light-reflecting member 227C.

According to the present exemplary embodiment, the first light-reflecting member 227A reflects the reflected light at a first reflection location 91 on the first light-reflecting member 227A for the first time. The first light-reflecting member 227A reflects the reflected light at a second reflection location 92 on the first light-reflecting member 227A for the second time.

According to the present exemplary embodiment, the position of the first reflection location 91 at which the first light-reflecting member 227A reflects the reflected light for the first time differs from the position of the second reflection location 92 at which the first light-reflecting member 227A reflects the reflected light for the second time.

According to the present exemplary embodiment, the single light-reflecting member 227 reflects the reflected light multiple times.

Figure 22A:
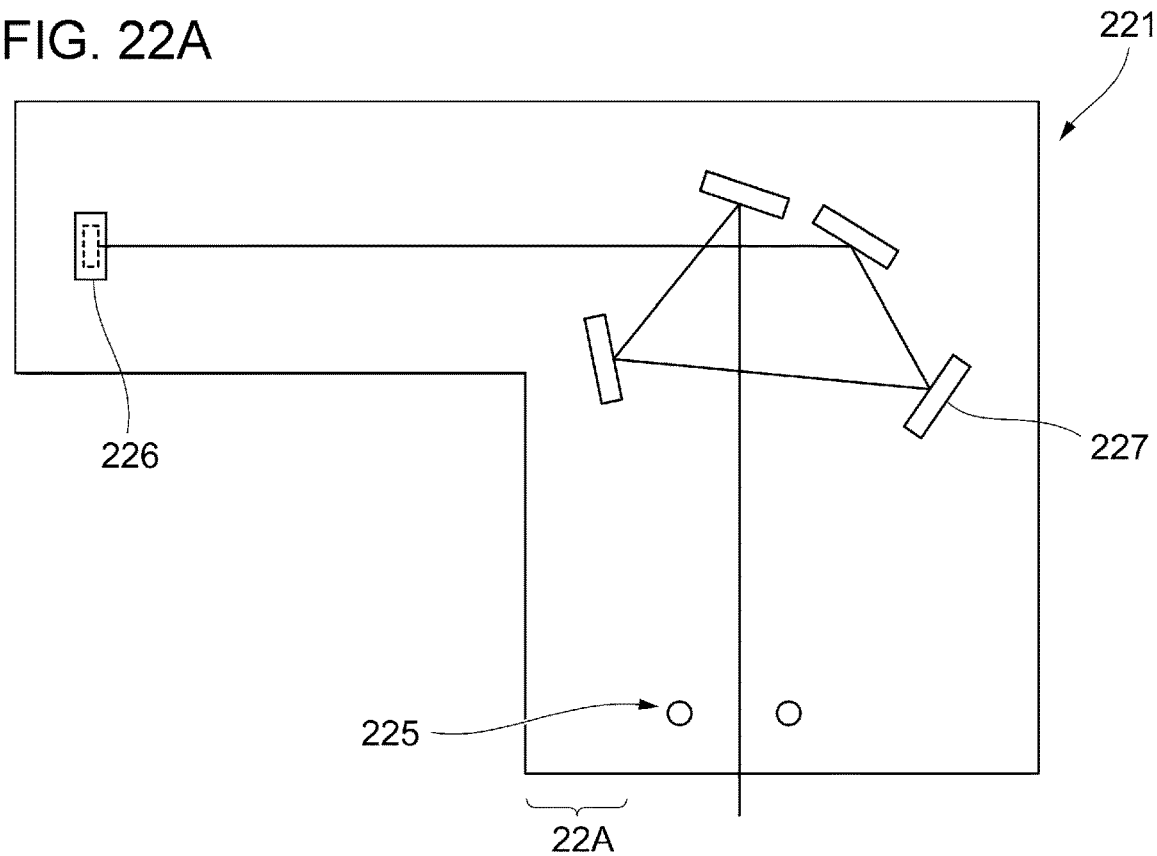
FIG. 22A and FIG. 22B illustrate an example in which each of light-reflecting members once reflects reflected light.
Figure 22B:
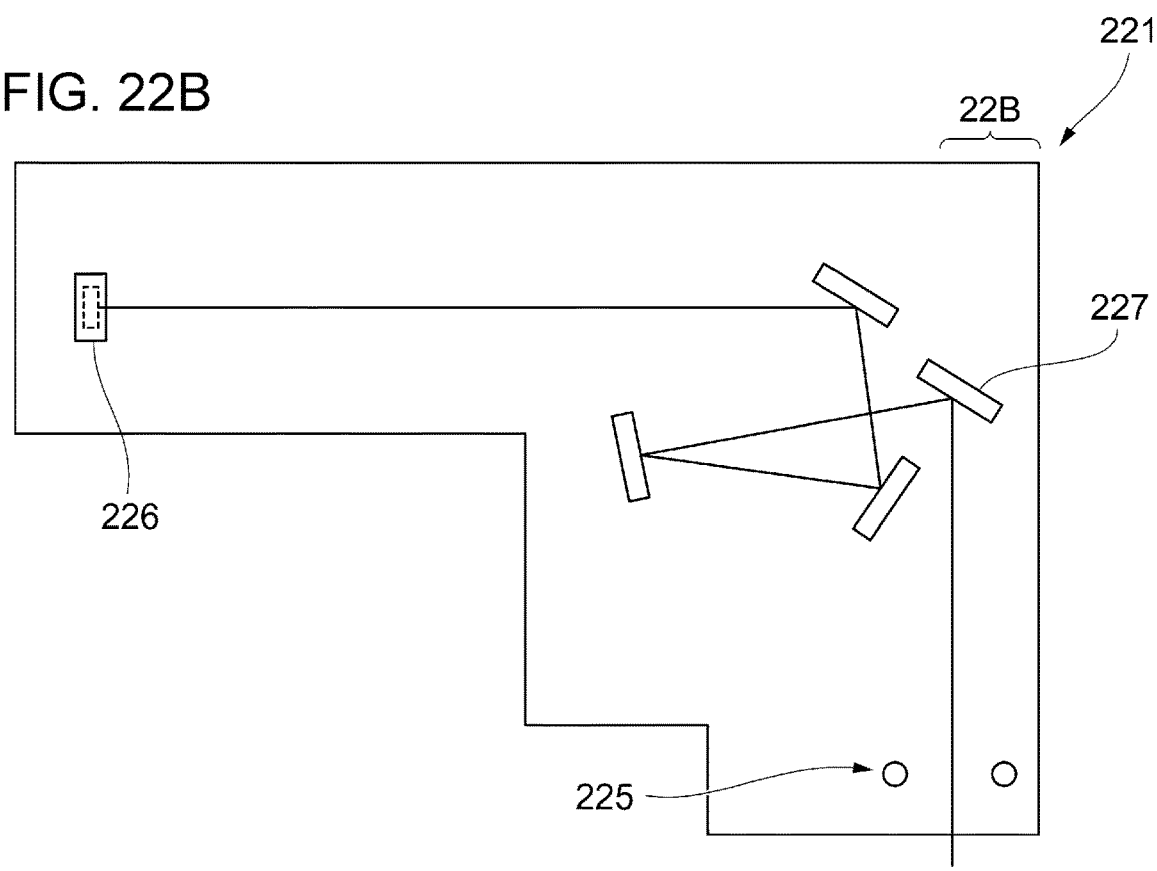

FIG. 22A and FIG. 22B illustrate an example of the structure in which each light-reflecting member 227 once reflects the reflected light.

In the case where each light-reflecting member 227 once reflects the reflected light as illustrated in FIG. 22A and FIG. 22B, four light-reflecting members 227 are provided. In this case, the size of the upper image-reading member 221 increases.

Specifically, in the example of the structure illustrated in FIG. 22A, a portion illustrated as reference characters 22A extends unlike the structure according to the present exemplary embodiment illustrated in FIG. 21. In the example of the structure illustrated in FIG. 22B, a portion illustrated as reference characters 22B extends unlike the structure according to the present exemplary embodiment illustrated in FIG. 21. In the examples of the structure illustrated in FIG. 22A and FIG. 22B, the size of the upper image-reading member 221 increases.

According to the present exemplary embodiment, however, the light-reflecting member 227 reflects the reflected light multiple times.

The light-receiving unit 226 (see FIG. 21) includes the multiple light-receiving elements 226A that are arranged in the single direction as described above. Specifically, the multiple light-receiving elements 226A are arranged in the direction perpendicular to the sheet in FIG. 21.

According to the present exemplary embodiment, the multiple light-reflecting members 227 extend in the single direction. Specifically, the multiple light-reflecting members 227 extend in the direction perpendicular to the sheet in FIG. 21.

In other words, the multiple light-reflecting members 227 extend in the direction perpendicular to the transport direction of the paper P that is transported in the inspection apparatus 200 and perpendicular to the thickness direction of the paper P that is transported.

The first light-reflecting member 227A includes a first end portion 78 and a second end portion 79.

In comparison in the position of the first light-reflecting member 227A in the direction intersecting (perpendicular to) the thickness direction and the single direction described above, according to the present exemplary embodiment, the position of the first end portion 78 differs from the position of the second end portion 79.

In other words, in comparison in the position of the first light-reflecting member 227A in the transverse direction, according to the present exemplary embodiment, the position of the first end portion 78 differs from the position of the second end portion 79.

According to the present exemplary embodiment, when the first light-reflecting member 227A reflects the reflected light for the first time, the reflected light is incident on the first light-reflecting member 227A from the paper P (not illustrated in FIG. 21) on the paper transport path R.

According to the present exemplary embodiment, when the first light-reflecting member 227A reflects the reflected light for the second time, the reflected light is incident on the first light-reflecting member 227A from the third light-reflecting member 227C that is an example of another light-reflecting member.

In other words, when the first light-reflecting member 227A reflects the reflected light for the second time, the reflected light is incident on the first light-reflecting member 227A from the third light-reflecting member 227C that is located adjacent to and upstream of the first light-reflecting member 227A in the direction in which the reflected light travels.

According to the present exemplary embodiment, the reflected light from the paper P is incident on the first light-reflecting member 227A from a position away from a normal H1 to a light reflection surface 86 of the first light-reflecting member 227A toward the first end portion 78, and the normal H1 passes through the first reflection location 91.

According to the present exemplary embodiment, the reflected light from the third light-reflecting member 227C is incident on the first light-reflecting member 227A from a position away from a normal H2 to the light reflection surface 86 toward the first end portion 78, and the normal H2 passes through the second reflection location 92.

Figure 23:
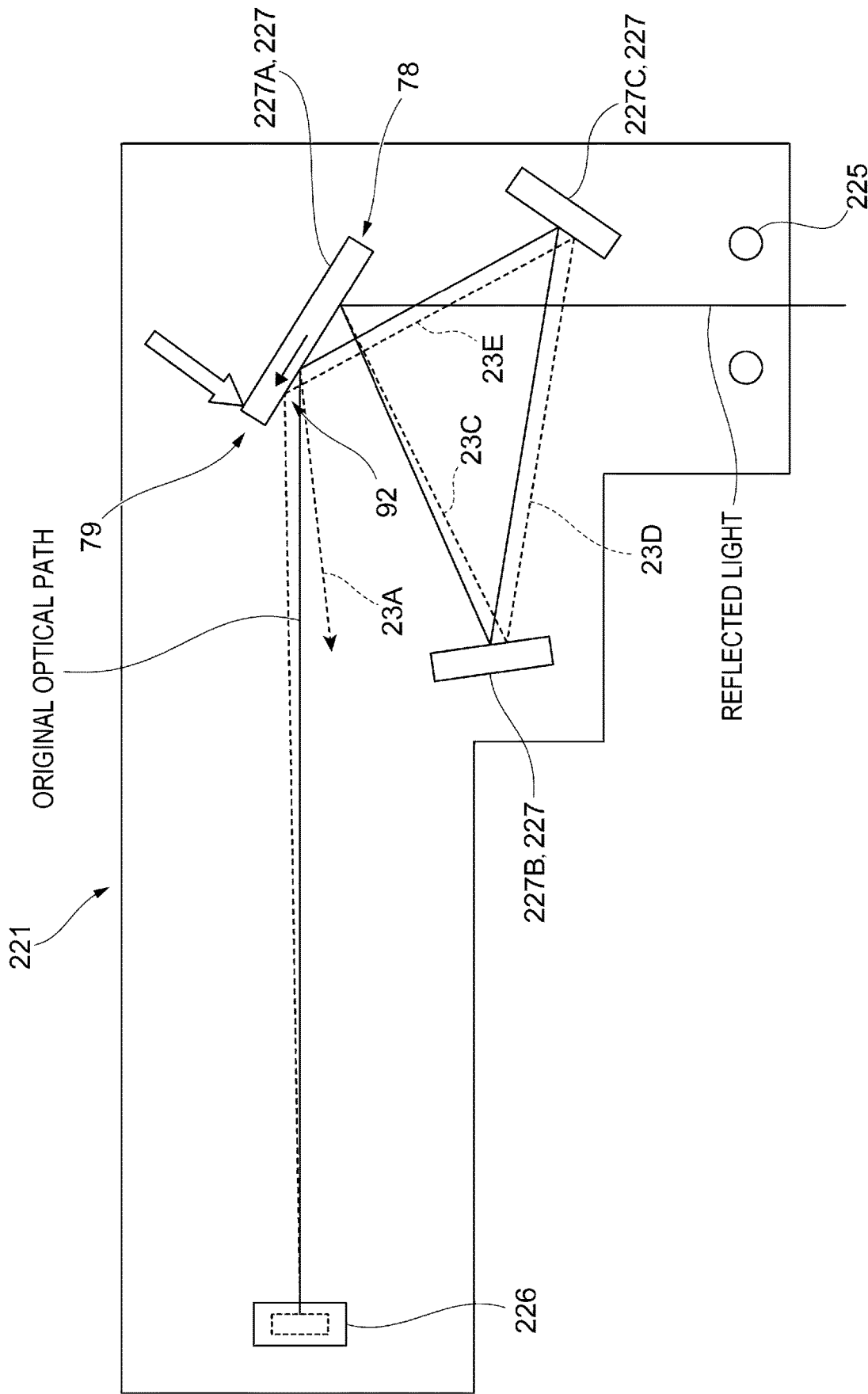
FIG. 23 illustrates a state in which the inclination angle of a first light-reflecting member changes.

FIG. 23 illustrates a state in which the inclination angle of the first light-reflecting member 227A changes.

According to the present exemplary embodiment, as illustrated in FIG. 23, the multiple light-reflecting members 227 are installed such that the position of the second reflection location 92 changes in the case where the inclination angle of the first light-reflecting member 227A changes.

More specifically, according to the present exemplary embodiment, as illustrated in FIG. 23, the multiple light-reflecting members 227 are installed such that the second reflection location 92 moves toward the second end portion 79 in the case where the first light-reflecting member 227A inclines such that the second end portion 79 approaches the third light-reflecting member 227C relative to the first end portion 78.

In other words, according to the present exemplary embodiment, the multiple light-reflecting members 227 are installed such that the second reflection location 92 moves toward the second end portion 79 in the case where the first light-reflecting member 227A inclines such that the second end portion 79 approaches a portion on which the reflected light is incident relative to the first end portion 78.

Examples of an aspect in which the second end portion 79 approaches the third light-reflecting member 227C relative to the first end portion 78 include an aspect in which only the second end portion 79 moves toward the third light-reflecting member 227C, an aspect in which only the first end portion 78 recedes from the third light-reflecting member 227C, and an aspect in which the second end portion 79 moves toward the third light-reflecting member 227C, and the first end portion 78 recedes from the third light-reflecting member 227C.

Figure 24:
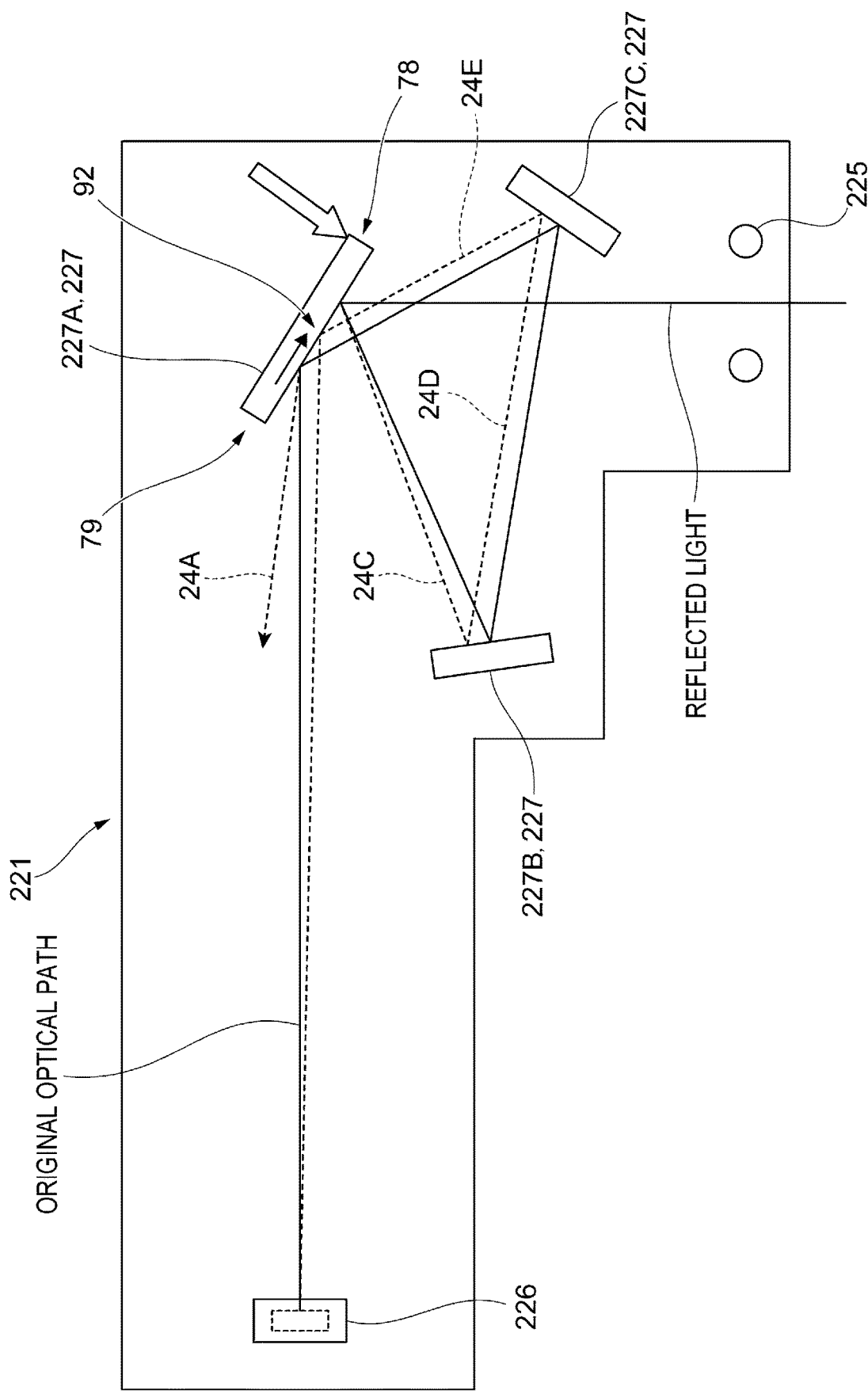
FIG. 24 illustrates another state in which the inclination angle of the first light-reflecting member changes.

According to the present exemplary embodiment, as illustrated in FIG. 24 (illustrating another state in which the inclination angle of the first light-reflecting member 227A changes), the multiple light-reflecting members 227 are installed such that the second reflection location 92 moves toward the first end portion 78 in the case where the first light-reflecting member 227A inclines such that the first end portion 78 approaches the third light-reflecting member 227C relative to the second end portion 79.

In other words, according to the present exemplary embodiment, the multiple light-reflecting members 227 are installed such that the second reflection location 92 moves toward the first end portion 78 in the case where the first light-reflecting member 227A inclines such that the first end portion 78 approaches the portion on which the reflected light is incident relative to the second end portion 79.

Examples of an aspect in which the first end portion 78 approaches the third light-reflecting member 227C relative to the second end portion 79 include an aspect in which only the first end portion 78 moves toward the third light-reflecting member 227C, an aspect in which only the second end portion 79 recedes from the third light-reflecting member 227C, and an aspect in which the first end portion 78 moves toward the third light-reflecting member 227C, and the second end portion 79 recedes from the third light-reflecting member 227C.

According to the present exemplary embodiment, the multiple light-reflecting members 227 are installed such that the second reflection location 92 moves toward the second end portion 79 or the first end portion 78. In this way, the reflected light may be inhibited from being deviated from the light-receiving unit 226, and precision with which the image is read may be improved unlike the case where the second reflection location 92 does not move.

As illustrated in FIG. 23, if the second reflection location 92 does not move in the case where the first light-reflecting member 227A inclines such that the second end portion 79 approaches the third light-reflecting member 227C relative to the first end portion 78, the reflected light travels in a direction illustrated by using an arrow 23A in FIG. 23.

As illustrated in FIG. 24, if the second reflection location 92 does not move in the case where the first light-reflecting member 227A inclines such that the first end portion 78 approaches the third light-reflecting member 227C relative to the second end portion 79, the reflected light travels in a direction illustrated by using an arrow 24A in FIG. 24.

In these cases, the reflected light deviates from the light-receiving unit 226, and the precision with which the image is read decreases.

According to the present exemplary embodiment in which the second reflection location 92 moves, however, the degree of the deviation of the reflected light from the light-receiving unit 226 is small even when the first light-reflecting member 227A inclines, and in this way, the precision with which the image is read may be improved.

According to the present exemplary embodiment, as illustrated in FIG. 23, the other light-reflecting members 227 other than the first light-reflecting member 227A reflect the reflected light after the first light-reflecting member 227A reflects the reflected light until the first light-reflecting member 227A reflects the reflected light next.

In other words, according to the present exemplary embodiment, the other light-reflecting members 227 other than the first light-reflecting member 227A reflect the reflected light multiple times after the first light-reflecting member 227A reflects the reflected light until the first light-reflecting member 227A reflects the reflected light next.

More specifically, according to the present exemplary embodiment, an even number of the other light-reflecting members 227 reflect the reflected light after the first light-reflecting member 227A reflects the reflected light until the first light-reflecting member 227A reflects the reflected light next.

In other words, according to the present exemplary embodiment, the other light-reflecting members 227 reflect the reflected light an even number of times after the first light-reflecting member 227A reflects the reflected light until the first light-reflecting member 227A reflects the reflected light next.

More specifically, according to the present exemplary embodiment, an even number of the other light-reflecting members 227 reflect the reflected light an even number of times such that the second light-reflecting member 227B reflects the reflected light, and the third light-reflecting member 227C reflects the reflected light after the first light-reflecting member 227A reflects the reflected light until the first light-reflecting member 227A reflects the reflected light next.

According to the present exemplary embodiment, the reflected light is thus reflected multiple times. In this way, the degree of the deviation of the reflected light from the light-receiving unit 226 due to the inclination of the first light-reflecting member 227A may be decreased.

More specifically, according to the present exemplary embodiment, the reflected light is reflected an even number of times. In this way, the degree of the deviation of the reflected light from the light-receiving unit 226 due to the inclination of the first light-reflecting member 227A may be decreased.

According to the present exemplary embodiment, in the case where the first light-reflecting member 227A inclines such that the second end portion 79 approaches the third light-reflecting member 227C relative to the first end portion 78 as illustrated in FIG. 23, the reflected light that is emitted from the first light-reflecting member 227A with the result that the first light-reflecting member 227A reflects the reflected light for the first time passes through the left-hand side of an original optical path as illustrated by using reference characters 23C.

In the following description, the "left-hand side" represents the left-hand side of the original optical path when the original optical path is viewed from an upstream position in the direction in which the reflected light travels, and a "right-hand side" represents the right-hand side of the original optical path when the original optical path is viewed from an upstream position in the direction in which the reflected light travels.

Subsequently, according to the present exemplary embodiment, the position of the optical path is reversed with the result that the second light-reflecting member 227B reflects the reflected light, and the optical path for the reflected light is located on the right-hand side of the original optical path as illustrated by using reference characters 23D.

According to the present exemplary embodiment, the position of the optical path is reversed again with the result that the third light-reflecting member 227C reflects the reflected light, and the optical path for the reflected light is located on the left-hand side of the original optical path as illustrated by using reference characters 23E.

In this case, the reflected light passes through the left-hand side of the original optical path and travels toward the first light-reflecting member 227A. In this case, the second reflection location 92 moves toward the second end portion 79. In this case, the reflected light that is reflected by the first light-reflecting member 227A travels toward the light-receiving unit 226. In this way, the degree of the deviation of the reflected light from the light-receiving unit 226 may be decreased.

For example, in the case where the first light-reflecting member 227A inclines such that the first end portion 78 approaches the third light-reflecting member 227C relative to the second end portion 79 as illustrated in FIG. 24, the reflected light that is emitted from the first light-reflecting member 227A with the result that the first light-reflecting member 227A reflects the reflected light for the first time passes through the right-hand side of the original optical path as illustrated by using reference characters 24C.

Subsequently, according to the present exemplary embodiment, the position of the optical path is reversed with the result that the second light-reflecting member 227B reflects the reflected light, the optical path for the reflected light is located on the left-side hand of the original optical path as illustrated by using reference characters 24D.

According to the present exemplary embodiment, the position of the optical path is reversed again with the result that the third light-reflecting member 227C reflects the reflected light, and the optical path for the reflected light is located on the right-hand side of the original optical path as illustrated by using reference characters 24E.

In this case, the reflected light passes through the right-hand side of the original optical path and travels toward the first light-reflecting member 227A. In this case, the second reflection location 92 moves toward the first end portion 78 of the first light-reflecting member 227A.

In this case, the reflected light that is reflected by the first light-reflecting member 227A travels toward the light-receiving unit 226. In this way, the degree of the deviation of the reflected light from the light-receiving unit 226 may be decreased.

According to the present exemplary embodiment, the upper image-reading member 221 (see FIG. 1) and the lower image-reading member 222 have the same structure. According to the present exemplary embodiment, sets of the light-receiving units 226 and the multiple light-reflecting members 227 are provided.

According to the present exemplary embodiment, the upper image-reading member 221 includes a first set of the light-receiving unit 226 and the multiple light-reflecting members 227, and the first set of the light-receiving unit 226 and the multiple light-reflecting members 227 is disposed at a position away from the paper transport path R in a first direction.

The lower image-reading member 222 includes a second set of the light-receiving unit 226 and the multiple light-reflecting members 227, and the second set of the light-receiving unit 226 and the multiple light-reflecting members 227 is disposed at a position away from the paper transport path R in a second direction.

In other words, according to the present exemplary embodiment, the upper image-reading member 221 that is an example of a first image-reading unit that reads the image that is formed on the first surface of the paper P includes the first set of the light-receiving unit 226 and the multiple light-reflecting members 227.

According to the present exemplary embodiment, the lower image-reading member 222 that is an example of a second image-reading unit that reads the image that is formed on the second surface of the paper P includes the second set of the light-receiving unit 226 and the multiple light-reflecting members 227.

According to the present exemplary embodiment, the lower image-reading member 222 and the upper image-reading member 221 are point-symmetrical to each other.

Specifically, according to the present exemplary embodiment, the lower image-reading member 222 and the upper image-reading member 221 are point-symmetrical to each other with respect to a position illustrated as a symmetrical center by using reference characters 1X in FIG. 1.

In other words, according to the present exemplary embodiment, when the lower image-reading member 222, for example, is rotated 180° about the symmetrical center, the lower image-reading member 222 and the upper image-reading member 221 overlap.

In other words, according to the present exemplary embodiment, the lower image-reading member 222, for example, is rotated 180° about the symmetrical center, the first set of the light-receiving unit 226 and the multiple light-reflecting members 227 described above and the second set of the light-receiving unit 226 and the multiple light-reflecting members 227 described above overlap.

Figure 25:
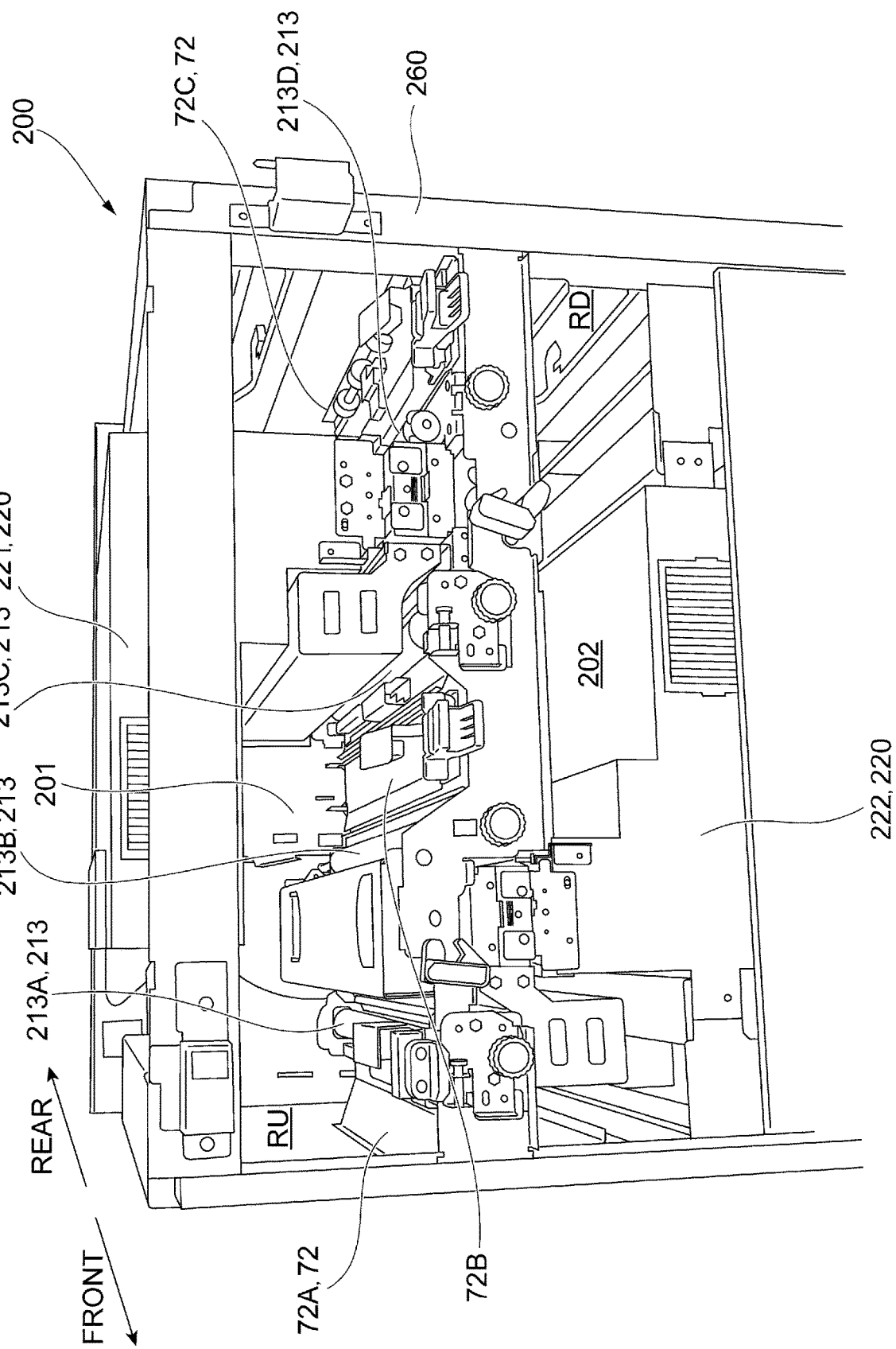
FIG. 25 illustrates an inner structure of the inspection apparatus.

FIG. 25 illustrates an inner structure of the inspection apparatus 200. FIG. 25 illustrates a state when the front of the inspection apparatus 200 is viewed.

According to the present exemplary embodiment, the inspection apparatus 200 includes a housing 260 that supports members that are included in the inspection apparatus 200.

According to the present exemplary embodiment, the upper image-reading member 221 and the lower image-reading member 222 that serve as the image-reading units and the multiple transport rollers 213 that are examples of the transport unit are supported by the housing 260 that is shared.

More specifically, according to the present exemplary embodiment, the lower image-reading member 222, the upper image-reading member 221, the upstream transport roller 213A, the first intermediate transport roller 213B, the second intermediate transport roller 213C, and the downstream transport roller 213D are supported by the housing 260 that is shared.

According to the present exemplary embodiment, the upper rotator 51 (see FIG. 1) and the lower rotator 52 are also supported by the housing 260 that is shared.

According to the present exemplary embodiment, as illustrated in FIG. 15, two regions face each other with the paper transport path R interposed therebetween.

Specifically, the two regions include an upper region RU that is located above the paper transport path R and a lower region RD that is located below the paper transport path R. According to the present exemplary embodiment, the image-reading members 220 are disposed in the upper region RU and the lower region RD.

Specifically, the upper image-reading member 221 is disposed in the upper region RU, and the lower image-reading member 222 is disposed in the lower region RD.

According to the present exemplary embodiment, the upper gap 201 is located between the paper transport path R and the upper image-reading member 221, and the lower gap 202 is located between the paper transport path R and the lower image-reading member 222 as described above.

The paper transport path R extends sideways. Of the two gaps, the upper gap 201 described above is located above the paper transport path R, and the lower gap 202 is located below the paper transport path R.

According to the present exemplary embodiment, the user is able to access the paper transport path R via the upper gap 201, and the user is able to access the paper transport path R via the lower gap 202.

The meaning of the phrase "be able to access the paper transport path R" is that the user is able to touch the paper P on the paper transport path R.

According to the present exemplary embodiment, the paper transport path R is accessible via the upper gap 201 and the lower gap 202 that are the two gaps thus provided. Consequently, the paper transport path R is accessible via the upper region RU and the lower region RD that are the two regions described above.

The paper transport path R may be is accessible via only the upper gap 201 or the lower gap 202 instead of both of the upper gap 201 and the lower gap 202.

In other words, the paper transport path R may be is accessible via only one of the two regions instead of both of the upper region RU and the lower region RD that are the two regions.

According to the present exemplary embodiment, the paper transport path R is accessible via the upper gap 201 at the position at which the upper rotator 51 is installed and a position at which the intermediate guide member 72B (see FIG. 25) is installed.

At the position at which the upper rotator 51 is installed, a gap is formed between the upper rotator 51 and the paper transport path R by moving the upper rotator 51 upward. The paper transport path R is accessible via the gap.

At the position at which the intermediate guide member 72B is installed, a gap is formed between the intermediate guide member 72B and the paper transport path R by moving the intermediate guide member 72B upward. The paper transport path R is accessible via the gap.

According to the present exemplary embodiment, the paper transport path R is accessible at positions at which the upstream guide member 72A (see FIG. 25) and the downstream guide member 72C are installed.

Specifically, in this case, gaps are formed between the guide members 72 and the paper transport path R by moving the upstream guide member 72A and the downstream guide member 72C upward, and the paper transport path R is accessible via the gaps.

The upstream guide member 72A and the downstream guide member 72C are disposed in the upper region RU. The paper transport path R is accessible from above the paper transport path R at the positions at which the upstream guide member 72A and the downstream guide member 72C are installed.

According to the present exemplary embodiment, only the lower rotator 52 is provided in the lower gap 202 (see FIG. 15) for accessibility to the paper transport path R, and the guide members 72 that are retractable from the paper transport path R are not disposed in the lower gap 202.

As for the lower gap 202, the paper transport path R is accessible at only the position at which the lower rotator 52 is installed. Specifically, as for the lower gap 202, a gap is formed by retracting the lower rotator 52 from the paper transport path R, and the paper transport path R is accessible via the gap.

According to the present exemplary embodiment, the rotators are disposed adjacent to the paper transport path R in the upper gap 201 (see FIG. 15) and the lower gap 202 that are the two gaps.

Specifically, according to the present exemplary embodiment, the upper rotator 51 is disposed adjacent to the paper transport path R in the upper gap 201, and the lower rotator 52 is disposed adjacent to the paper transport path R in the lower gap 202 as described above.

The upper rotator 51 and the lower rotator 52 are retractable from the paper transport path R as described above. Consequently, according to the present exemplary embodiment, gaps are formed between the rotators and the paper transport path R at the positions at which the two rotators are installed, and the paper transport path R is accessible via the gaps.

According to the present exemplary embodiment, in the lower gap 202, the paper transport path R is not accessible at positions other than the position at which the lower rotator 52 is installed as described above.

In the upper gap 201, however, the paper transport path R is accessible at the positions other than the position at which the upper rotator 51 is installed.

Specifically, in the upper gap 201, the paper transport path R is accessible by retracting the intermediate guide member 72B from the paper transport path R at the position at which the intermediate guide member 72B is installed as described above.

Alternatively, the paper transport path R may be accessible at only the position at which the upper rotator 51 is installed also in the upper gap 201.

Alternatively, the guide members 72 that are retractable from the paper transport path R may be disposed in the lower gap 202, and the paper transport path R may be accessible at the position at which the lower rotator 52 is installed and at the positions at which the guide members 72 are installed also in the lower gap 202.

According to the present exemplary embodiment, the paper transport path R is accessible without pulling the housing 260 (see FIG. 25) from the body of the inspection apparatus 200.

Specifically, according to the present exemplary embodiment, the three guide members 72, the upper rotator 51, and the lower rotator 52 are retractable from the paper transport path R, and the paper transport path R is accessible without pulling the housing 260 as described above.

A conceivable method of accessing the paper transport path R is to provide a housing that supports the transport unit for the paper P in addition to the housing that supports the image-reading members 220 and to pull the housing that supports the transport unit such that the paper transport path R becomes accessible.

In this case, the position of the transport unit with respect to the image-reading members 220 is likely to change, and this makes the precision with which the image on the paper P is read likely to decrease.

According to the present exemplary embodiment, however, the single housing 260 supports the image-reading members 220 and the transport unit, and the paper transport path R is accessible via the gaps that are formed by moving, for example, the guide members 72 as described above. In this way, the position of the transport unit with respect to the image-reading members 220 may be inhibited from changing, and the paper transport path R may be accessible.

Figure 26:
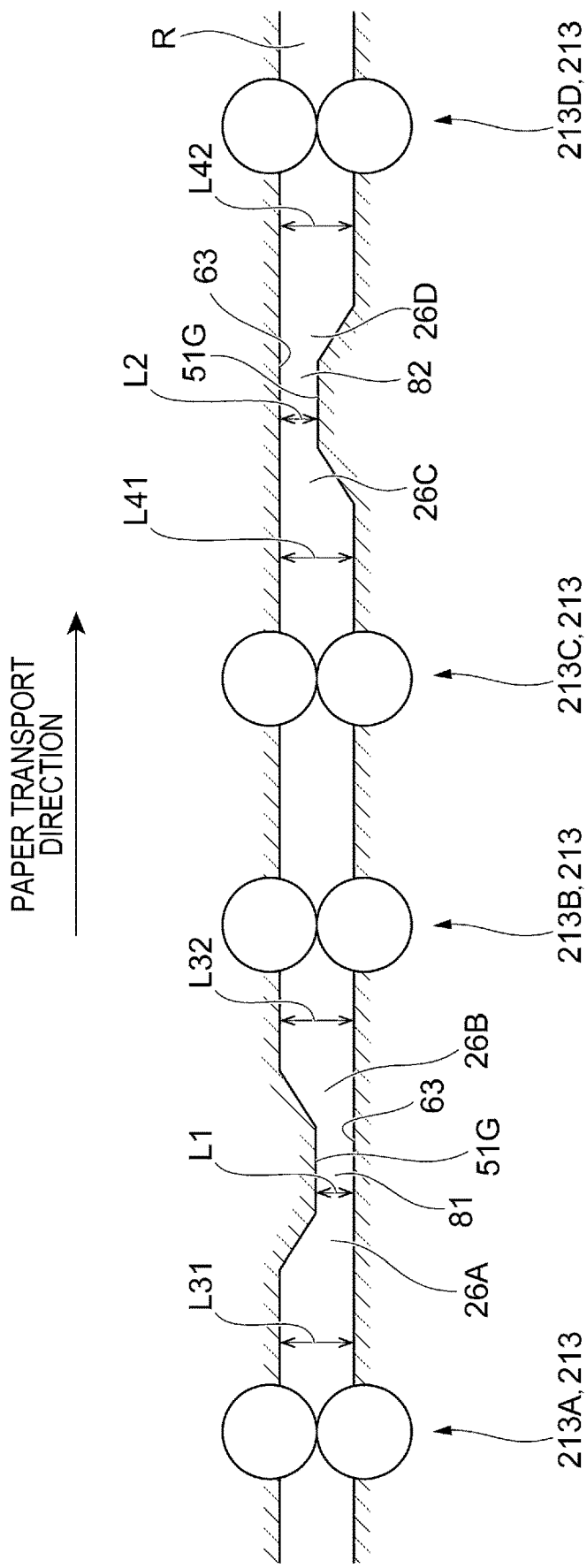
FIG. 26 illustrates a paper transport path in front of the inspection apparatus.

FIG. 26 illustrates the paper transport path R in front of the inspection apparatus 200.

More specifically, FIG. 26 illustrates the state of the paper transport path R with the paper guide portion 51G illustrated in FIG. 3 facing the optically transparent portion 63.

More specifically, FIG. 26 illustrates the state of the paper transport path R with the paper guide portion 51G that is included in the upper rotator 51 facing the optically transparent portion 63 and with the paper guide portion 51G that is included in the lower rotator 52 facing the optically transparent portion 63.

According to the present exemplary embodiment, the width (referred to bellow as a "first width L1") of the paper transport path R in the thickness direction of the paper P (not illustrated in FIG. 26) that passes along the paper transport path R and at the upstream location 81 that is an example of a specific location is less than an upstream width L31 that is the width of the paper transport path R at a position upstream of the upstream location 81.

According to the present exemplary embodiment, the first width L1 is less than a downstream width L32 that is the width of the paper transport path R at a position downstream of the upstream location 81.

According to the present exemplary embodiment, the paper transport path R is narrow at the upstream location 81, and the paper transport path R is wide at positions upstream and downstream of the upstream location 81.

In the present specification, the meaning of the "width" described below is the meaning of the width of the paper P on the paper transport path R in the thickness direction.

According to the present exemplary embodiment, the paper guide portion 51G that is included in the upper rotator 51 (not illustrated in FIG. 26) faces the optically transparent portion 63. Consequently, the width of the paper transport path R partly decreases, and the first width L1 is less than the upstream width L31 and is less than the downstream width L32.

Similarly, as for the downstream location 82 that is another example of the specific location, according to the present exemplary embodiment, the width (referred to below as a "second width L2") of the paper transport path R at the downstream location 82 is less than an upstream width L41 that is the width of the paper transport path R at a position upstream of the downstream location 82 and is less than a downstream width L42 that is the width of the paper transport path R at a position downstream of the downstream location 82.

According to the present exemplary embodiment, the paper guide portion 51G that is included in the lower rotator 52 (not illustrated in FIG. 26) faces the optically transparent portion 63. Consequently, the width of the paper transport path R partly decreases, and the second width L2 is less than the upstream width L41 and is less than the downstream width L42.

According to the present exemplary embodiment, the width of the paper transport path R at the positions of the upstream location 81 and the downstream location 82 is less than the upstream width and is less than the downstream width.

According to the present exemplary embodiment, the magnitude of the first width L1 is equal to the magnitude of the second width L2.

According to the present exemplary embodiment, as illustrated by using reference characters 26A in FIG. 26, a portion of the paper transport path R that is located upstream of the upstream location 81 has a width that gradually decreases as the position thereof is nearer to the most downstream position in the transport direction of the paper P.

According to the present exemplary embodiment, as illustrated by using reference characters 26B, a portion of the paper transport path R that is located downstream of the upstream location 81 has a width that gradually increases as the position thereof is nearer to the most downstream position in the transport direction of the paper P.

According to the present exemplary embodiment, as illustrated in FIG. 3, the upper rotator 51 includes the upstream guide portion 51H and the downstream guide portion 51K that incline with respect to the transport direction of the paper P.

According to the present exemplary embodiment, with the result that the upstream guide portion 51H is provided, a portion of the paper transport path R has a width that gradually decreases as the position thereof is nearer to the most downstream position in the transport direction of the paper P as described above.

According to the present exemplary embodiment, with the result that the downstream guide portion 51K is provided, a portion of the paper transport path R has a width that gradually increases as the position thereof is nearer to the most downstream position in the transport direction of the paper P.

Similarly, as for the downstream location 82, as illustrated by using reference characters 26C, a portion of the paper transport path R that is located upstream of the downstream location 82 has a width that gradually decreases as the position thereof is nearer to the most downstream position in the transport direction of the paper P.

As illustrated by using reference characters 26D, a portion of the paper transport path R that is located downstream of the downstream location 82 has a width that gradually increases as the position thereof is nearer to the most downstream position in the transport direction of the paper P.

Figure 27:
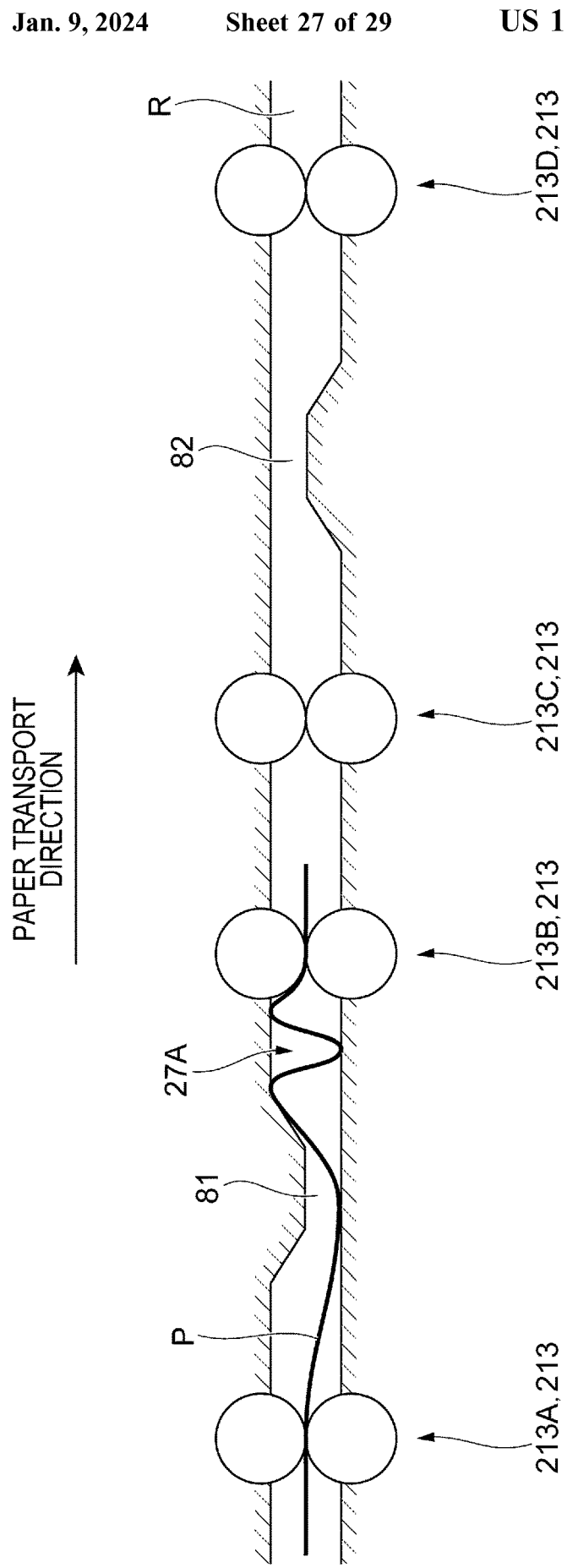
FIG. 27 illustrates a state of paper on the paper transport path.

FIG. 27 illustrates a state of the paper P on the paper transport path R.

According to the present exemplary embodiment, a portion of the paper transport path R is narrow, and a portion upstream or downstream of the narrow portion is wide. In this way, the precision with which the image is read may be inhibited from decreasing due to a cockle that the paper P has.

For example, when the speed at which the first intermediate transport roller 213B transports the paper P is lower than the speed at which the upstream transport roller 213A transports the paper P, there is a possibility that the paper P has a cockle between the upstream transport roller 213A and the first intermediate transport roller 213B.

In this case, according to the present exemplary embodiment in which the narrow portion and the wide portion are provided, as illustrated by using reference characters 27A, the wide portion is likely to have a cockle, whereas the narrow portion is inhibited from having a cockle.

In this way, the behavior of the paper P may be stabilized at the narrow portion, and the precision with which the image is read may be inhibited from decreasing. Specifically, the behavior of the paper P may be stabilized at the upstream location 81, and the precision with which the image is read may be inhibited from decreasing.

The same is true for the downstream location 82 although this is not illustrated. The wide portion is likely to have a cockle, whereas the narrow portion is inhibited from having a cockle.

In this way, the behavior of the paper P may be stabilized at the narrow portion, and the precision with which the image is read may be inhibited from decreasing as in the above description. Specifically, the behavior of the paper P may be stabilized also at the downstream location 82, and the precision with which the image is read may be inhibited from decreasing.

According to the present exemplary embodiment, the width of the paper transport path R increases at positions downstream and upstream of the upstream location 81. The width of the paper transport path R may increase at only downstream or upstream thereof.

The same is true for the downstream location 82. The width of the paper transport path R may increase at only downstream or upstream of the downstream location 82.

For example, the width of the paper transport path R may decrease in a region between the upstream location 81 and the downstream location 82, may increase at a position upstream of the upstream location 81, and may increase at a position downstream of the downstream location 82.

According to the present exemplary embodiment, the paper P on the paper transport path R is removable between multiple specific locations.

Specifically, according to the present exemplary embodiment, the user is able to access the paper transport path R between the upstream location 81 (see FIG. 15) and the downstream location 82 and is able to remove paper P on the paper transport path R between the upstream location 81 and the downstream location 82.

Specifically, according to the present exemplary embodiment, the intermediate guide member 72B (see FIG. 9) that is disposed between the upstream location 81 and the downstream location 82 is retracted from the paper transport path R. Consequently, the paper transport path R is accessible, and the paper P on the paper transport path R is removable between the upstream location 81 and the downstream location 82.

Figure 28:
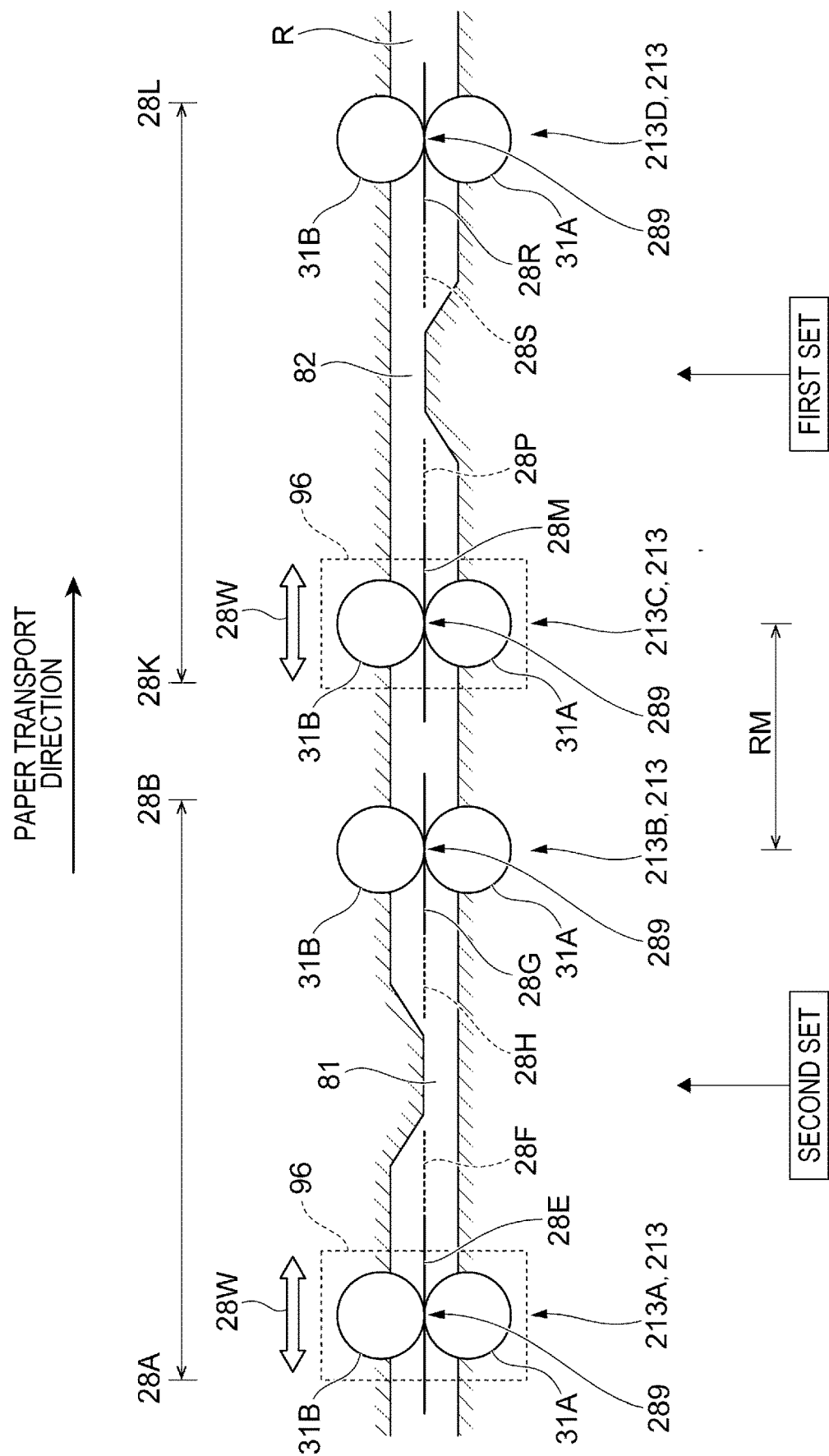
FIG. 28 illustrates the paper transport path.

According to the present exemplary embodiment, as illustrated in FIG. 28 (illustrating the paper transport path R), the paper transport path R is linear between a portion of the paper transport path R that is located upstream of the upstream location 81 in the transport direction of the paper P and a portion that is located downstream of the upstream location 81 in the transport direction of the paper P.

More specifically, the paper transport path R is linear between a portion of the paper transport path R that is located upstream of the upstream location 81 in the transport direction of the paper P and a portion that is located downstream of the upstream location 81 in the transport direction of the paper P and upstream of the downstream location 82 in the transport direction of the paper P.

More specifically, the paper transport path R is linear between a portion illustrated by using reference characters 28A in FIG. 28 and a portion illustrated by using reference characters 28B.

The meaning of the phrase the "paper transport path R is linear" is that an extension line 28F from a tangent line 28E to the upstream transport roller 213A that is located at an upstream position passes through a contact portion 289 of the first intermediate transport roller 213B that is located adjacent to and downstream of the upstream transport roller 213A, and an extension line 28H from a tangent line 28G to the first intermediate transport roller 213B that is located adjacent thereto and downstream thereof passes through a contact portion 289 of the upstream transport roller 213A that is located adjacent thereto and upstream thereof.

According to the present exemplary embodiment, the upstream transport roller 213A includes the contact portion 289 at which the drive roller 31A and the driven roller 31B are in contact with each other, and the first intermediate transport roller 213B includes the contact portions 289 at which the drive roller 31A and the driven roller 31B are in contact with each other.

According to the present exemplary embodiment, the contact portion 289 of the first intermediate transport roller 213B is located on the extension line 28F from the tangent line 28E that passes through the contact portion 289 of the upstream transport roller 213A, and the contact portion 289 of the upstream transport roller 213A is located on the extension line 28H from the tangent line 28G that passes through the contact portion 289 of the first intermediate transport roller 213B.

The tangent line 28E to the upstream transport roller 213A passes through the contact portion 289 at which the drive roller 31A and the driven roller 31B that are included in the upstream transport roller 213A are in contact with each other and is referred to as a common tangent line that is in contact with the drive roller 31A and the driven roller 31B.

The tangent line 28G to the first intermediate transport roller 213B passes through the contact portion 289 at which the drive roller 31A and the driven roller 31B that are included in the first intermediate transport roller 213B and is referred to as a common tangent line that is in contact with the drive roller 31A and the driven roller 31B.

According to the present exemplary embodiment, the contact portion 289 of the first intermediate transport roller 213B is located on the extension line 28F from the tangent line 28E to the upstream transport roller 213A, and the contact portion 289 of the upstream transport roller 213A is located on the extension line 28H from the tangent line 28G to the first intermediate transport roller 213B. Consequently, the paper P is unlikely to cause buckling.

Specifically, in this way, the paper P may be inhibited from hitting a side wall that is adjacent to the paper transport path R at an angle, and it may make the paper P unlikely to cause buckling.

Similarly, according to the present exemplary embodiment, the paper transport path R is linear between a portion of the paper transport path R that is located upstream of the downstream location 82 in the transport direction of the paper P and a portion that is located downstream of the downstream location 82 in the transport direction of the paper P.

More specifically, the paper transport path R is linear between a portion of the paper transport path R that is located upstream of the downstream location 82 in the transport direction of the paper P and downstream of the upstream location 81 in the transport direction of the paper P and a portion that is located downstream of the downstream location 82 in the transport direction of the paper P.

More specifically, the paper transport path R is linear between a portion illustrated by using reference characters 28K in FIG. 28 and a portion illustrated by using reference characters 28L.

More specifically, according to the present exemplary embodiment, the contact portion 289 of the downstream transport roller 213D is located on an extension line 28P from a tangent line 28M to the second intermediate transport roller 213C, and the contact portion 289 of the second intermediate transport roller 213C is located on an extension line 28S from a tangent line 28R to the downstream transport roller 213D as in the above description.

Also, in this way, the paper P may be inhibited from hitting a side wall that is adjacent to the paper transport path R at an angle, and it may make the paper P unlikely to cause buckling.

According to the present exemplary embodiment, a downstream transport unit that is located downstream of a specific location and that transports the paper P and an upstream transport unit that is located upstream of a specific location and that transports the paper P are provided for the multiple specific locations.

Specifically, according to the present exemplary embodiment, as illustrated in FIG. 28, the first intermediate transport roller 213B that is located downstream of the upstream location 81 and that transports the paper P and the upstream transport roller 213A that is located upstream of the upstream location 81 and that transports the paper P are provided for the upstream location 81.

According to the present exemplary embodiment, the downstream transport roller 213D that is located downstream of the downstream location 82 and that transports the paper P and the second intermediate transport roller 213C that is located upstream of the downstream location 82 and that transports the paper P are provided for the downstream location 82.

According to the present exemplary embodiment, adjustment mechanisms that adjust the inclination of at least the downstream transport unit or the upstream transport unit are provided for the respective multiple sets of the downstream transport units and the upstream transport units.

According to the present exemplary embodiment, the downstream transport roller 213D and the second intermediate transport roller 213C are provided as the first set of the downstream transport unit and the upstream transport unit.

According to the present exemplary embodiment, the first intermediate transport roller 213B and the upstream transport roller 213A are provided as the second set of the downstream transport unit and the upstream transport unit.

According to the present exemplary embodiment, the adjustment mechanisms that adjust the inclination of the transport rollers 213 are provided for the respective sets.

According to the present exemplary embodiment, the adjustment mechanisms that adjust the inclination of the upstream transport units are provided for the respective sets.

Specifically, according to the present exemplary embodiment, a set of the downstream transport roller 213D and the second intermediate transport roller 213C that are provided as the first set of the downstream transport unit and the upstream transport unit include an adjustment mechanism 96 that adjusts the inclination of the second intermediate transport roller 213C as illustrated in FIG. 28.

According to the present exemplary embodiment, a set of the first intermediate transport roller 213B and the upstream transport roller 213A that are provided as the second set of the downstream transport unit and the upstream transport unit include an adjustment mechanism 96 that adjusts the inclination of the upstream transport roller 213A.

According to the present exemplary embodiment, as for the transport rollers 213 that are adjusted by the adjustment mechanisms 96, as illustrated by using arrows 28W in FIG. 28, first end portions 213X (see FIG. 9) that are located at the front of the inspection apparatus 200 move toward an upstream or downstream position in the transport direction of the paper P.

More specifically, according to the present exemplary embodiment, the adjustment mechanisms 96 move the first end portions 213X of the drive rollers 31A that are included in the transport rollers 213 and the first end portions 213X of the driven rollers 31B toward an upstream or downstream position in the transport direction of the paper P.

The inclination of the transport rollers 213 may be adjusted by the adjustment mechanisms 96 such that the user manually operates the adjustment mechanisms 96. Alternatively, the inclination of the transport rollers 213 may be automatically adjusted by the adjustment mechanisms 96 that are actuated by using driving force from a drive source such as a motor.

According to the present exemplary embodiment, the multiple transport units that transport the paper P are disposed between the multiple specific locations.

Specifically, according to the present exemplary embodiment, the first intermediate transport roller 213B and the second intermediate transport roller 213C are disposed between the upstream location 81 and the downstream location 82 that are examples of the multiple specific locations, and the two transport rollers 213 are disposed between the multiple specific locations.

According to the present exemplary embodiment, the adjustment mechanisms 96 that adjust the inclination of at least the downstream transport unit or the upstream transport unit are provided for the respective multiple sets of the downstream transport units and the upstream transport units.

For example, as illustrated in FIG. 29 (illustrating another example of the structure of the paper transport path), it is supposed that the single transport roller 213 is disposed between the upstream location 81 and the downstream location 82, and the three transport rollers 213 are provided in total.

In this case, it is necessary to adjust the alignments of the three transport rollers 213 such that the alignments of the three transport rollers 213 become the same, which requires time and effort. In other words, in this case, it is necessary to adjust the three transport rollers 213 such that the inclination thereof becomes the same, which is requires time and effort.

For example, in the case where the alignment of the transport roller 213 that is illustrated by using reference characters 29A among the three transport rollers 213 and that is located in the middle differs from the alignments of the other two transport rollers 213, the paper P is twisted, and the precision with which the image is read consequently decreases.

In this case, in the case where the alignments are adjusted, it is necessary to adjust the alignments of the three transport rollers 213 such that the alignments become the same. This requires time and effort.

In the case where the adjustment mechanisms 96 are provided for the respective multiple sets of the downstream transport units and the upstream transport units as illustrated in FIG. 28, the alignment of one of the two transport rollers 213 that are included in the first set is adjusted, and the alignment of one of the two transport rollers 213 that are included in the second set is adjusted.

In this case, the alignments of the two transport rollers 213 are adjusted. In this way, work may be simplified unlike the case where the alignments of the three transport rollers 213 are adjusted as described above.

According to the present exemplary embodiment, in the case where the alignments are adjusted for every set, there is a possibility that the alignments of one of the sets differ from the alignments of the other set. Specifically, according to the present exemplary embodiment, there is a possibility that the orientation of the alignments of one of the sets differs from the orientation of the alignments of the other set.

According to the present exemplary embodiment, however, the alignments of the downstream transport unit and the upstream transport unit of one of the sets match, and the alignments of the downstream transport unit and the upstream transport unit of the other set match.

In this case, the paper P is not twisted in each set. In this way, the precision with which the image is read may be inhibited from decreasing due to a twist of the paper P.

In other words, in this case, there is a possibility that the paper P is twisted in a region RM between one of the sets and the other set, but the paper P is not twisted in each set. In this way, the precision with which the image is read may be inhibited from decreasing due to a twist of the paper P.

More specifically, in this case, there is a possibility that the paper P is twisted in the region RM between the first intermediate transport roller 213B and the second intermediate transport roller 213C, but the paper P is not twisted in each set. In this way, the precision with which the image is read may be inhibited from decreasing due to a twist of the paper P.

According to the present exemplary embodiment, the downstream transport unit and the upstream transport unit are provided for each set. In this case, the two transport rollers 213 are disposed between the upstream location 81 and the downstream location 82.

Specifically, according to the present exemplary embodiment, the two transport rollers 213 of the first intermediate transport roller 213B and the second intermediate transport roller 213C are disposed between the upstream location 81 and the downstream location 82.

In the case where the two transport rollers 213 are thus disposed between the upstream location 81 and the downstream location 82, the alignments are adjustable for every set as described above. In this way, work for adjusting the alignments may be simplified.

In the above description, the adjustment mechanisms 96 that adjust the inclination of the transport rollers 213 are provided for the respective upstream transport units of the sets. This is not a limitation. The adjustment mechanisms 96 that adjust the inclination of the respective downstream transport units of the sets may be provided.

Alternatively, the adjustment mechanism 96 that adjusts the inclination of the upstream transport unit of one of the sets may be provided, and the adjustment mechanism 96 that adjusts the downstream transport unit of the other set may be provided.

In the above description, the single housing 260 (see FIG. 25) that is shared supports the lower image-reading member 222, the upper image-reading member 221, the upstream transport roller 213A, the first intermediate transport roller 213B, the second intermediate transport roller 213C, the downstream transport roller 213D, the upper rotator 51, and the lower rotator 52.

An aspect in which the housing 260 supports various kinds of members is not limited thereto.

For example, a first housing that is one of housings may support the lower image-reading member 222, the upstream transport roller 213A, the first intermediate transport roller 213B, and the upper rotator 51, and a second housing that is the other housing may support the upper image-reading member 221, the second intermediate transport roller 213C, the downstream transport roller 213D, and the lower rotator 52.

In this way, misregistration of the transport units with respect to the reading units in each housing may be inhibited from occurring as in the above description, and the precision with which the image is read may be inhibited from decreasing.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image-reading apparatus comprising:
photo diodes that receive reflected light from a recording material on which an image is formed; and
a plurality of light-reflecting members that reflects the reflected light from the recording material toward the photo diodes, wherein
at least one light-reflecting member of the plurality of light-reflecting members reflects the reflected light a plurality of times, and
a plurality of other light-reflecting members other than the at least one light-reflecting member reflects the reflected light after the at least one light-reflecting member reflects the reflected light until the at least one light-reflecting member reflects the reflected light next.

2. The image-reading apparatus according to claim 1, wherein an even number of the other light-reflecting members reflect the reflected light after the at least one light-reflecting member reflects the reflected light until the at least one light-reflecting member reflects the reflected light next.

3. The image-reading apparatus according to claim 1, wherein
the at least one light-reflecting member reflects the reflected light for a second time at a second reflection location on the at least one light-reflecting member, and
the plurality of light-reflecting members is installed such that a position of the second reflection location changes when an inclination angle of the at least one light-reflecting member changes.

4. The image-reading apparatus according to claim 3, wherein
the photo diodes include a plurality of photo diodes arranged in a single direction,
the plurality of light-reflecting members extends in the single direction,
the at least one light-reflecting member includes a first end portion and a second end portion that are at different positions in a direction that intersects the single direction and a thickness direction of the at least one light-reflecting member,
the reflected light is incident on the at least one light-reflecting member from another light-reflecting member that is adjacent to and upstream of the at least one light-reflecting member in a direction in which the reflected light travels,
the reflected light is incident on the at least one light-reflecting member from the other light-reflecting member that is adjacent thereto and upstream thereof at a position nearer to the first end portion than a normal to a light reflection surface of the at least one light-reflecting member, the normal passing through the second reflection location, and
the plurality of light-reflecting members is installed such that the second reflection location moves toward the second end portion when the at least one light-reflecting member inclines such that the second end portion approaches the other light-reflecting member relative to the first end portion.

5. The image-reading apparatus according to claim 3, wherein
the photo diodes include a plurality of the photo diodes include arranged in a single direction,
the plurality of light-reflecting members extends in the single direction,
the at least one light-reflecting member includes a first end portion and a second end portion that are at different positions in a direction that intersects the single direction and a thickness direction of the at least one light-reflecting member,
the reflected light is incident on the at least one light-reflecting member from another light-reflecting member that is adjacent to and upstream of the at least one light-reflecting member in a direction in which the reflected light travels,
the reflected light is incident on the at least one light-reflecting member from the other light-reflecting member that is adjacent thereto and upstream thereof at a position nearer to the first end portion than a normal to a light reflection surface of the at least one light-reflecting member, the normal passing through the second reflection location, and
the plurality of light-reflecting members is installed such that the second reflection location moves toward the first end portion when the at least one light-reflecting member inclines such that the first end portion approaches the other light-reflecting member relative to the second end portion.

6. The image-reading apparatus according to claim 1, wherein
further comprising sets of the photo diodes and the pluralities of light-reflecting members,
a first set of the photo diodes and the plurality of light-reflecting members are at a position away from a transport path for the recording material in a first direction, and
a second set of the photo diodes and the plurality of light-reflecting members are at a position away from the transport path for the recording material in a second direction.

7. The image-reading apparatus according to claim 6, wherein
a first image-reading unit that reads an image that is on a first surface of the recording material includes the first set of the photo diodes and the plurality of light-reflecting members,
a second image-reading unit that reads an image that is on a second surface of the recording material includes the second set of the photo diodes and the plurality of light-reflecting members, and
the first image-reading unit and the second image-reading unit are point-symmetrical to each other.

8. The image-reading apparatus according to claim 6, wherein
a first image-reading unit that reads an image that is on a first surface of the recording material includes the first set of the photo diodes and the plurality of light-reflecting members,
a second image-reading unit that reads an image that is on a second surface of the recording material includes the second set of the photo diodes and the plurality of light-reflecting members, and
the first image-reading unit and the second image-reading unit are arranged such that the first image-reading unit and the second image-reading unit overlap the first image-reading unit and the second image-reading unit projected on a plane parallel to the transport path along which the recording material is transported.

9. An image-forming system comprising:
an image-forming apparatus that forms an image on a recording material;
photo diodes that receive reflected light from the recording material on which the image is formed; and
a plurality of light-reflecting members that reflects the reflected light from the recording material toward the photo diodes, wherein
at least one light-reflecting member of the plurality of light-reflecting members reflects the reflected light a plurality of times, and
a plurality of other light-reflecting members other than the at least one light-reflecting member reflects the reflected light after the at least one light-reflecting member reflects the reflected light until the at least one light-reflecting member reflects the reflected light next.

10. An image-reading apparatus comprising:
means for receiving reflected light from a recording material on which an image is formed; and
means for reflecting the reflected light from the recording material toward the means for receiving reflected light, wherein
the means for reflecting the reflected light reflects the reflected light a plurality of times, and
a plurality of other means for reflecting the reflected light reflects the reflected light after the means for reflecting the reflected light reflects the reflected light until the means for reflecting the reflected light reflects the reflected light next.

* * * * *